US012786614B2

(12) United States Patent
Hansen et al.

(10) Patent No.: US 12,786,614 B2
(45) Date of Patent: Nov. 3, 2026

(54) REAL-TIME AI CONVERSATION COACH WITH ADAPTIVE LEARNING

(71) Applicant: Viking Discoveries LLC, Irvine, CA (US)

(72) Inventors: Scott Robert Hansen, Irvine, CA (US); Louisa Marie Hansen, Elsah, IL (US); Robert Edwin Hansen, Bigfork, MT (US)

(73) Assignee: Viking Discoveries LLC, Irvine, CA (US)

(*) Notice: Subject to any disclaimer, the term of this patent is extended or adjusted under 35 U.S.C. 154(b) by 51 days.

(21) Appl. No.: 18/852,441

(22) PCT Filed: May 10, 2024

(86) PCT No.: PCT/US2024/028955
§ 371 (c)(1),
(2) Date: Sep. 28, 2024

(87) PCT Pub. No.: WO2024/233968
PCT Pub. Date: Nov. 14, 2024

(65) Prior Publication Data
US 2026/0089434 A1 Mar. 26, 2026

Related U.S. Application Data

(63) Continuation-in-part of application No. 18/215,834, filed on Jun. 29, 2023, now abandoned.
(Continued)

(51) Int. Cl.
*G10L 15/26* (2006.01)
*G10L 15/06* (2013.01)
(Continued)

(52) U.S. Cl.
CPC .......... *H04R 1/1091* (2013.01); *G10L 15/063* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 9,613,622 | B1 | 4/2017 | Melanson |
| 10,795,638 | B2 | 10/2020 | Sabin et al. |

(Continued)

FOREIGN PATENT DOCUMENTS

| | | | |
|---|---|---|---|
| CN | 113806512 B | 8/2024 | |
| GB | 2595390 A | 11/2021 | |

(Continued)

OTHER PUBLICATIONS

Yamashita, Natsuo; Horiguchi, Shota; Homma, Takeshi. "Improving the Naturalness of Simulated Conversations for End-to-End Neural Diarization." Proc. The Speaker and Language Recognition Workshop (Odyssey 2022), pp. 133-140. DOI: 10.21437/Odyssey.2022-19. arXiv:2204.11232 [eess.AS]. Published Jun. 2022. Available: https://arxiv.org/abs/2204.11232.

*Primary Examiner* — Neeraj Sharma
(74) *Attorney, Agent, or Firm* — Scott R. Hansen; Viking IP Law

(57) ABSTRACT

Embodiments of the present disclosure may include a method of training an electro-mechanical system that includes local trainable AI, the method including training a local AI for a controller of the electro-mechanical surgical device or system with simulated data. Embodiments may also include performing a task or set of tasks or operations with the device or system as controlled, instructed, influenced, or the like by the controller having the local AI system. Embodiments may also include collecting real-life data from the step of performing. Embodiments may also
(Continued)

include further training the local AI system and improving the AI simulated data generator with real-life data. Another embodiment relates to a system for providing a user with suggestions during social interactions. Embodiments of the invention may extend across many types of devices and systems, control systems, sensors, types of AI, and so forth, and combinations of the foregoing.

34 Claims, 14 Drawing Sheets

Related U.S. Application Data

(60) Provisional application No. 63/643,399, filed on May 6, 2024, provisional application No. 63/523,562, filed on Jun. 27, 2023, provisional application No. 63/470,281, filed on Jun. 1, 2023, provisional application No. 63/467,951, filed on May 20, 2023, provisional application No. 63/466,346, filed on May 14, 2023, provisional application No. 63/465,314, filed on May 10, 2023.

(51) Int. Cl.
*G10L 15/22* (2006.01)
*H04R 1/10* (2006.01)

(56) References Cited

U.S. PATENT DOCUMENTS

| | | | | |
|---|---|---|---|---|
| 10,885,899 | B2 | 1/2021 | Iyer et al. | |
| 10,984,034 | B1 | 4/2021 | Sandland et al. | |
| 10,997,970 | B1 * | 5/2021 | Rafii | G10L 21/013 |
| 11,431,660 | B1 * | 8/2022 | Leeds | H04L 51/02 |
| 11,861,315 | B2 | 1/2024 | Sethi | |
| 12,592,246 | B2 * | 3/2026 | Can | G06N 20/00 |
| 2014/0136187 | A1 * | 5/2014 | Wolverton | G10L 15/22 704/9 |
| 2018/0357047 | A1 * | 12/2018 | Brown | G06N 3/082 |
| 2019/0005021 | A1 * | 1/2019 | Miller | G06F 40/35 |
| 2019/0015033 | A1 | 1/2019 | Sahin et al. | |
| 2020/0005766 | A1 * | 1/2020 | Kim | G10L 15/02 |
| 2021/0144517 | A1 * | 5/2021 | Guim Bernat | H04L 41/0843 |
| 2022/0254367 | A1 * | 8/2022 | Georganti | H04R 25/00 |
| 2022/0301666 | A1 * | 9/2022 | Shluzas | A61B 5/7264 |
| 2022/0344049 | A1 * | 10/2022 | Hall | G06N 3/098 |
| 2023/0060676 | A1 * | 3/2023 | Darling | A61B 5/7267 |
| 2023/0229919 | A1 | 7/2023 | Karras et al. | |
| 2023/0240529 | A1 * | 8/2023 | Toth | G06F 11/3006 600/301 |
| 2024/0252048 | A1 | 8/2024 | Tran | |
| 2025/0054623 | A1 * | 2/2025 | Yellowlees | G06F 40/58 |

FOREIGN PATENT DOCUMENTS

| | | | |
|---|---|---|---|
| JP | 2015018174 | A | 1/2015 |
| JP | 2016024590 | A | 2/2016 |
| JP | 2016103081 | A | 6/2016 |

* cited by examiner

800

REAL-TIME AI CONVERSATION COACH WITH ADAPTIVE LEARNING

CROSS-REFERENCE TO RELATED APPLICATIONS

This application is a national stage entry under 35 U.S.C. § 371 of International Application No. PCT/US2024/028955, filed May 10, 2024, which claims priority from the following U.S. Provisional Patent Application Ser Nos.: 63/523,562 filed Jun. 27, 2023 and entitled "Method and System for Optimal Engineering Design," 63/470,281 filed Jun. 1, 2023 entitled "Method of Training an Electro-Mechanical Device with AI," 63/467,951 filed May 20, 2023 and entitled "Method of Training an Electro-Mechanical Device or System," 63/466,346 filed May 14, 2023 and entitled "Method of Training a Surgical Robot," 63/465,314 filed May 10, 2023 and entitled "Numerical Engineering Design Optimization Augmented With Generative Artificial Intelligence (AI)," and 63/643,399 filed May 6, 2024 and entitled "Method of Retraining a Device With Real-World Data," all of which are incorporated by reference herein in their entirety. International Application No. PCT/US2024/028955 is a continuation-in-part of U.S. patent application Ser. No. 18/215,834 filed Jun. 29, 2023 which is hereby incorporated by reference herein in its entirety.

BACKGROUND OF THE INVENTION

Generative AI and its Functionality

Generative AI refers to a class of algorithms and models that can generate synthetic data samples that resemble real-world data. These models are capable of learning the underlying patterns, structures, and characteristics of the training data and use this knowledge to create novel data samples. Generative AI employs techniques such as generative adversarial networks (GANs), variational autoencoders (VAEs), and deep reinforcement learning to achieve its objectives.

In some embodiments, Generative AI systems, including language models like GPT-3, create text, images, audio, and/or video content. Multimodal AI allows the combination of these different types of content to generate new content.

Here are some of the most commonly used methods and applications of generative AI:

- Generative Adversarial Networks (GANs): GANs consist of two parts, a generator and a discriminator. The generator creates samples and the discriminator evaluates them. The goal of the generator is to create samples that the discriminator can't distinguish from the real data.

GANs are often used to generate realistic images, but can also be used for generating other types of data.

- Variational Autoencoders (VAEs): VAEs are a type of autoencoder with a twist: instead of directly encoding input data to a fixed vector, they encode it to a distribution. When generating new samples, they sample from this distribution. VAEs are often used in applications that need a continuous, structured latent space, such as generating different styles of handwriting or interpolating between different images.
- Transformer Models: Transformer models, like GPT-3, are a type of AI model that use attention mechanisms to generate text. They're trained to predict the next word in a sentence and can generate coherent and contextually relevant sentences by stringing together these predictions. This technology is used to write articles, generate conversational agents, translate languages, and even write code.
- Recurrent Neural Networks (RNNs): RNNs are used for sequential data and are particularly well-suited for tasks that involve sequences, like time-series data, handwriting, and speech. They can generate new sequences that resemble the patterns in the input data.
- Evolutionary Generative Adversarial Networks (E-GANs): E-GANs are a variant of GANs that use evolutionary strategies to train the discriminator, which can lead to improved stability and quality of the generated samples.

Simulated Data Generation with Generative AI:

One of the key advantages of generative AI is its ability to create simulated data for training robots. By leveraging the learned patterns and structures from real-world data, generative AI models can generate synthetic data that closely mimic the characteristics and variations observed in the real world. Simulated data generated through generative AI techniques can provide a diverse and flexible training set, enabling robots to learn from a wide range of scenarios and optimize their performance across different tasks.

Examples of Generative AI for Simulated Data Generation:

Generative AI has already demonstrated its potential in providing simulated data to train robots effectively. In the field of autonomous driving, generative AI models have been employed to generate simulated traffic scenarios, allowing self-driving systems to learn and adapt to a wide range of driving conditions without the need for extensive real-world data collection. Similarly, in the domain of robotics manipulation, generative AI techniques have been utilized to simulate diverse object shapes, textures, and environments, enabling robots to acquire robust grasping and manipulation skills.

The Da Vinci Surgical System is a prominent example of robotic surgery systems that have transformed the field of minimally invasive surgery. This advanced platform combines robotic technology with precise instruments and high-definition visualization to enable surgeons to perform complex procedures with enhanced precision and control. The integration of artificial intelligence (AI) within the Da Vinci system further enhances its capabilities, providing intelligent assistance and optimizing surgical outcomes.

Overview of the Da Vinci Robotic Surgery System

The Da Vinci Surgical System consists of several key components. Firstly, a surgeon operates from a console equipped with hand and foot controls, offering a comfortable ergonomic interface. Secondly, robotic arms equipped with surgical instruments are inserted into the patient's body through small incisions. These instruments replicate the surgeon's movements and provide enhanced dexterity and range of motion. Finally, the system incorporates high-definition cameras that provide a magnified 3D view of the surgical site.

The Role of AI in the Da Vinci System

The Da Vinci Surgical System may utilize AI to enhance surgical procedures. AI algorithms may be designed to analyze large amounts of data and provide valuable insights and assistance to surgeons. By integrating AI into the system, it may become a powerful tool for decision support, real-time guidance, and improved surgical outcomes.

Intelligent Decision Support

AI within the Da Vinci system can analyze preoperative data, including medical images and patient records, to provide surgeons with valuable insights before and during the procedure. By leveraging machine learning algorithms, the system can identify critical anatomical structures, assist with surgical planning, and help surgeons make informed decisions based on previous cases and best practices.

Real-Time Guidance and Image Recognition

During surgery, AI algorithms can analyze the real-time video feed from the system's cameras, enabling the system to recognize and track anatomical structures and instruments accurately. This capability helps the system provide visual guidance to surgeons, facilitating precise instrument control, reducing the risk of errors, and improving the overall surgical precision.

Continuous Learning and Optimization

The Da Vinci system has the ability to learn and adapt over time using AI techniques. By continuously analyzing surgical data and outcomes, the system can improve its performance and offer increasingly accurate recommendations to surgeons. This iterative learning process allows the system to refine its decision-making capabilities, enhance procedural efficiency, and optimize patient outcomes.

Simulated Data

Artificial or simulated data sets can be used to train other AI systems, particularly when there is a lack of sufficient real-world data, or the available data is highly imbalanced, or when privacy concerns limit the usage of real-world data.

For instance, consider the case of autonomous vehicles. Collecting enough real-world driving data to cover all possible scenarios an autonomous vehicle might encounter is extremely challenging. This is where simulated data becomes beneficial. High-fidelity simulations can create a variety of driving conditions—like different weather scenarios, various lighting conditions, or unexpected obstacles—that help in training the AI models underpinning these vehicles.

Generative AI models, like Generative Adversarial Networks (GANs), have also been used to create synthetic data. GANs consist of two neural networks—a generator and a discriminator—that compete with each other. The generator tries to create fake data that looks like the real data, while the discriminator tries to differentiate the real data from the fake. This process improves the quality of the generated data over time.

In healthcare, where privacy concerns limit the availability of data, synthetic data can help. GANs, for example, can be used to generate synthetic medical images or electronic health records for training AI models. The synthetic data need not correspond to any real patient, thus maintaining privacy while allowing model training.

Actuator System With Mechanical Components

An actuator system for controlling multiple mechanical devices is a collection of machinery designed to convert input energy into motion. This system is typically composed of several key components, including the control unit, the power supply, the actuators themselves, sensors, and the mechanical devices being controlled. Each component plays a critical role in the system's operation.

- Control Unit: This is the brain of the actuator system. It receives input from the user or an automated system, processes it, and sends out the appropriate control signals to the actuators. In advanced systems, the control unit might also run algorithms to optimize the system's performance or manage complex tasks. The control unit often receives feedback from sensors to adjust its commands and ensure accurate, efficient operation.
- Power Supply: The power supply provides the energy needed for the actuators to function. This could be electricity, hydraulic fluid under pressure, or compressed air, depending on the type of actuator.
- Actuators: Actuators are the devices that convert the energy from the power supply into motion. They can be electric, hydraulic, or pneumatic, among others. Electric actuators convert electrical energy into mechanical motion, typically through a motor that drives a gearbox. Hydraulic actuators use the pressure of a fluid to create motion, while pneumatic actuators use compressed air.
- Sensors: Sensors provide feedback to the control unit about the state of the system. For example, they might measure the position or speed of an actuator, the pressure of a hydraulic system, or the load on a mechanical device. This information allows the control unit to adjust its commands to the actuators as needed.
- Mechanical Devices: These are the objects or systems that the actuators are controlling. They could be anything from valves in a water system, to structural members in a building, to robotic arms in a factory.

Some examples of actuator systems controlling multiple mechanical devices include:

- Irrigation System: An automated irrigation system might have actuators controlling valves to distribute water to different parts of a field or garden. The control unit would decide when and where to water based on input from moisture sensors in the soil and perhaps weather forecasts. The power supply might be an electric pump providing pressurized water to the actuators.
- Vibration Damping System: This system might use actuators to apply forces to different parts of a building or bridge to counteract vibrations from wind, traffic, or earthquakes. The control unit would command the actuators based on input from sensors measuring the structure's motion. The power supply might be a hydraulic system capable of delivering large forces.
- Manufacturing System: In a factory, a system of robotic arms might be used to assemble products. Each arm could have several actuators controlling its joints, and the control unit would coordinate their movements to carry out complex tasks. Feedback from position sensors in the joints would allow the control unit to ensure precise, consistent operation. The power supply could be a combination of electric motors and pneumatic systems.

Each of these examples illustrates how an actuator system can control multiple mechanical devices to carry out complex tasks in an automated, coordinated way. The specific components and their operation will depend on the requirements of the particular application.

More Examples

Further examples of actuator systems controlling multiple mechanical devices:

- Home Automation Systems: Actuators control lights, HVAC systems, window blinds, locks, and more based on input from sensors and user commands.
- Automated Greenhouse: Actuators control ventilation, watering, and lighting based on temperature, humidity, and light sensors.
- Traffic Light System: Actuators control the switching of lights based on timing or traffic sensor data.
- Automated Factory Conveyor System: Actuators control the movement of conveyor belts, gates, and lifts to direct products through the factory.
- Automated Parking Systems: Actuators move platforms to park and retrieve cars in compact spaces.

- Drones: Multiple actuators control the drone's propellers for maneuvering and maintaining stability.
- Automated Warehouses: Actuators control robotic arms and conveyor systems to sort and move goods.
- Satellites: Actuators control the orientation of the satellite and its solar panels, antenna, and other instruments.
- Medical Devices: In devices like surgical robots, actuators control the movement of the arms, tools, and cameras.
- Elevator Systems: Actuators control the movement of the elevator and the opening and closing of doors.
- Automated Door Systems: Actuators open and close doors in response to motion sensors or security systems.
- Automobile Systems: Actuators control various components such as throttle valves, brake systems, and power windows.
- Flight Control Systems: In aircraft, actuators control the position of flaps, ailerons, rudders, and other control surfaces.
- Spacecraft Docking Systems: Actuators control docking ports and latches for coupling spacecraft.
- Nuclear Power Plants: Actuators control the position of control rods, valves, and cooling systems.
- Oil and Gas Pipelines: Actuators control the opening and closing of valves to direct the flow of oil or gas.
- Power Grid Systems: Actuators control circuit breakers and switches to manage the flow of electricity.
- Submarines: Actuators control the rudder, dive planes, and ballast tanks to maneuver the submarine.
- Wind Turbines: Actuators control the pitch of the blades and the orientation of the turbine to maximize power generation.
- Automated Testing Equipment: Actuators control the movement of probes and devices to test electronic components.

These examples show a broad range of applications for actuator systems in different industries, from agriculture and manufacturing to transportation and energy. In each case, the actuator system controls multiple mechanical devices to carry out complex tasks in an automated, coordinated way. The specific components and their operation will depend on the requirements of the particular application.

- Automated Car Wash: Actuators control brushes, sprayers, and dryers to clean vehicles.
- Theme Park Rides: Actuators control the movement of ride vehicles, animatronics, and special effects.
- Mining Equipment: Actuators control drill bits, conveyor belts, and other machinery in mining operations.
- Printing Presses: Actuators control the movement of paper and the application of ink in commercial printing.
- Robotic Vacuum Cleaners: Actuators control the movement and functions of the vacuum, such as brushing and suction.
- Automated Textile Machines: Actuators control the movement of thread and needles in automated looms and sewing machines.
- Ship Loading and Unloading Systems: Actuators control cranes, conveyor belts, and hatches to load and unload cargo.
- Astronomical Telescopes: Actuators control the orientation of the telescope and the focus of the optics.
- Automated Farming Equipment: Actuators control plows, seeders, sprayers, and harvesters in automated farming systems.
- Automated Train Systems: Actuators control the movement of trains, track switches, and signals.
- Automated Food Processing Systems: Actuators control the movement of food products and the operation of cutting, cooking, and packaging machinery.
- Automated Laboratory Equipment: Actuators control the movement of samples and reagents in automated testing machines.
- Water Treatment Plants: Actuators control the opening and closing of valves and gates to manage the flow of water and waste.
- Automated Bakery Systems: Actuators control the mixing, shaping, baking, and packaging of bakery products.
- Automated Fishing Systems: Actuators control nets, winches, and other equipment on commercial fishing vessels.
- Photovoltaic Solar Trackers: Actuators control the orientation of solar panels to track the sun and maximize power generation.
- Automated Glass Manufacturing: Actuators control the movement of molten glass and the operation of molding and cutting machinery.
- Automated Painting Systems: Actuators control spray guns and the movement of objects to be painted.
- Automated Window Cleaning Systems: Actuators control the movement of cleaning tools on high-rise buildings.
- Automated Waste Sorting Systems: Actuators control conveyor belts and sorting machinery to separate recyclable materials.
- Automated Camera Systems: Actuators control the orientation and focus of cameras for security or broadcasting.
- Automated Cooking Appliances: Actuators control the temperature, stirring, and other cooking functions.
- Automated Paper Production: Actuators control the movement of pulp and the operation of cutting and rolling machinery.
- Automated Chemical Plants: Actuators control the flow of chemicals and the operation of reaction vessels and separators.
- Automated Ice Cream Machines: Actuators control the dispensing and mixing of ice cream and toppings.
- Automated Dairy Farms: Actuators control milking machines and the movement of cows in and out of the milking parlor.
- Automated Material Testing Equipment: Actuators apply forces or displacements to test the strength and durability of materials.
- Automated Packaging Systems: Actuators control the movement of products and the operation of wrapping, sealing, and labeling machinery.
- Automated Road Repair Systems: Actuators control the application of asphalt or other materials to repair road surfaces.
- Automated Coffee Machines: Actuators control the grinding of coffee beans, water temperature, and the flow rate to make the perfect cup of coffee.
- Automated Port Crane Systems: Actuators control the movement of containers between ships and trucks or trains.
- Automated Car Assembly Lines: Actuators control robotic arms and tools to assemble car parts.
- Automated Laser Cutting Machines: Actuators control the movement of the laser head and the material to be cut.
- Automated Metal Forming Machines: Actuators control the movement of metal sheets and the operation of bending and cutting machinery.

Automated Plastic Injection Molding Machines: Actuators control the movement of molten plastic and the operation of molding machinery.

Automated Pet Feeding Systems: Actuators control the dispensing of pet food at scheduled times.

Automated Microchip Fabrication: Actuators control the movement of silicon wafers and the operation of etching, doping, and testing machinery.

Automated Fire Suppression Systems: Actuators control the release of fire suppression agents based on fire sensor input.

Automated Public Transportation Systems: Actuators control the operation of buses, trams, and trains to maintain a schedule.

Automated Snow Removal Systems: Actuators control the movement of snowplows and snow blowers.

Automated Floodgate Systems: Actuators control the opening and closing of floodgates based on water level sensor input.

Automated Oil Refineries: Actuators control the flow of crude oil and the operation of distillation columns and other processing equipment.

Automated Forestry Equipment: Actuators control the operation of tree cutters, skidders, and loaders in logging operations.

Automated Postal Sorting Systems: Actuators control the movement of mail and the operation of sorting machinery.

Automated Cement Plants: Actuators control the flow of raw materials and the operation of kilns and grinding mills.

Automated Space Probes: Actuators control the orientation of the probe and the operation of scientific instruments.

Automated Beer Brewing Systems: Actuators control the flow of water and malt and the operation of brewing and fermentation vessels.

Automated Material Handling Systems: Actuators control the movement of goods in warehouses and distribution centers.

Automated Fertilizer Plants: Actuators control the flow of raw materials and the operation of reactors and separators.

Automated Power Plant Coal Feeders: Actuators control the flow of coal into the power plant's boilers.

Automated Brick Manufacturing: Actuators control the movement of clay and the operation of molding and firing machinery.

Automated Film Projectors: Actuators control the movement of film and the focus of the projector lens.

Automated Space Station Systems: Actuators control the orientation of the station and the operation of scientific instruments, airlocks, and robotic arms.

Automated Steel Mills: Actuators control the flow of molten steel and the operation of rolling and cutting machinery.

Automated Musical Instruments: In devices like player pianos, actuators control the movement of keys or strings to play music.

Automated Power Plant Cooling Towers: Actuators control the flow of water and air to cool the power plant's condenser.

Automated Airport Baggage Handling Systems: Actuators control conveyor belts, carousels, and sorting machinery to move bags to and from aircraft.

Automated Pharmaceutical Manufacturing: Actuators control the movement of ingredients and the operation of mixing, tablet pressing, and packaging machinery.

Automated Film Processing Machines: Actuators control the movement of film and the operation of developing, fixing, and drying machinery.

Automated Railway Switching Systems: Actuators control the position of railway switches to direct trains to different tracks.

Automated Lighthouse Systems: Actuators control the rotation of the light and the focus of the lens.

Automated Ship Steering Systems: Actuators control the ship's rudder and propellers to maneuver the ship.

Automated Tunnelling Machines: Actuators control the movement of the cutting head and the operation of conveyor belts and segment erectors.

Automated Wheelchair Systems: Actuators control the movement of the wheelchair based on user input or sensor data.

Automated Artillery Systems: Actuators control the elevation and rotation of the gun and the loading of ammunition.

Automated Sandblasting Systems: Actuators control the movement of the blasting nozzle and the flow of abrasive material.

Automated Underwater Vehicles: Actuators control the vehicle's thrusters and rudders to maneuver underwater.

Automated Paper Recycling Systems: Actuators control the movement of waste paper and the operation of pulping, cleaning, and drying machinery.

Automated Building Demolition Systems: Actuators control the operation of wrecking balls, shears, and other demolition equipment.

Automated Amusement Park Animatronics: Actuators control the movement of animatronic characters for entertainment.

Examples of Mass-Market Systems

Each of these examples provides a different perspective on the wide range of applications for actuator systems, from everyday appliances and services to specialized industrial machinery. The details of each system will vary based on the specific requirements of the application.

Smart Home Systems: Actuators control devices like lights, thermostats, blinds, locks, and more, often through a central hub or smartphone app.

Automobile Systems: Actuators in cars control a variety of functions, including the throttle, brakes, windshield wipers, and power windows.

Robotic Vacuum Cleaners: These devices use actuators to control the movement of the vacuum, as well as brushing and suction functions.

Drones: Drones use multiple actuators to control the rotation of the propellers, enabling maneuvering and maintaining stability.

Gaming Consoles: Actuators in controllers provide haptic feedback to the user, enhancing the gaming experience.

Printers: Actuators control the movement of the print head and the paper feed mechanism.

Washing Machines: Actuators control the drum's movement, water inlet and outlet valves, and detergent dispensers.

Dishwashers: Actuators control the movement of water sprayers, the detergent dispenser, and the drain valve.

Refrigerators: Actuators control the compressor and the defrost system to maintain the temperature.

- Microwave Ovens: Actuators control the turntable rotation and the opening and closing of the door.
- Electric Fans: Actuators control the rotation of the fan blades and the oscillation of the fan.
- Coffee Machines: Actuators control the grinding of coffee beans, water temperature, and flow rate.
- Blender Machines: Actuators control the rotation of the blade, enabling various blending speeds and modes.
- Electric Toothbrushes: Actuators control the rotation or vibration of the brush head.
- Automated Pet Feeders: Actuators control the dispensing of pet food at scheduled times.
- Automated Door Systems: Actuators open and close doors in response to motion sensors or security systems.
- Power Tools: In devices like drills and saws, actuators control the movement of the cutting or drilling bit.
- Electric Garage Door Openers: Actuators open and close the garage door in response to a remote control signal.
- Security Camera Systems: Actuators control the orientation and focus of cameras for security monitoring.
- Fitness Equipment: In devices like treadmills, actuators control the speed of the belt and the incline of the platform.

These examples cover a range of household products and appliances where actuators play a key role in enabling their operation and functionality.

Applications of Artificial Intelligence Into Such Systems

Artificial intelligence (AI) can be integrated into actuator systems to improve performance, enable new capabilities, and make the systems more user-friendly. Here's how AI could potentially improve each of the 20 mass-market systems I mentioned earlier:

- Smart Home Systems: AI can learn your daily routines and automatically adjust settings on your devices. For example, it could turn off lights when you usually leave the house or adjust the thermostat based on your typical schedule.
- Automobile Systems: AI can enhance safety features like collision avoidance and automatic braking. It's also the cornerstone of autonomous driving technologies.
- Robotic Vacuum Cleaners: AI can optimize cleaning paths for efficiency, learn the layout of your home, and even recognize and avoid obstacles or dangerous areas like stairs.
- Drones: AI can enable autonomous flight, obstacle avoidance, and advanced photography techniques like object tracking and scene recognition.
- Gaming Consoles: AI can create more realistic and challenging in-game opponents. It can also improve voice recognition for voice-controlled games and systems.
- Printers: AI can optimize print quality by automatically adjusting settings based on the type of document or image being printed.
- Washing Machines: AI can optimize wash cycles based on the type and amount of clothing, soil level, and even fabric care instructions.
- Dishwashers: AI can optimize washing and drying cycles based on the number of dishes and degree of soiling.
- Refrigerators: AI can monitor usage patterns and optimize energy use. It could also track expiry dates and even suggest recipes based on the ingredients you have.
- Microwave Ovens: AI can automatically adjust cooking times and power levels based on the type and quantity of food.
- Electric Fans: AI can adjust the fan speed based on the room temperature or even predict when you might need more or less airflow based on your patterns.
- Coffee Machines: AI can learn your coffee preferences and prepare your coffee at the exact time you want it.
- Blender Machines: AI can adjust speed and duration to achieve the perfect consistency based on the type of food and desired result.
- Electric Toothbrushes: AI can provide feedback on brushing techniques and track oral health over time.
- Automated Pet Feeders: AI can adjust feeding schedules and portions based on your pet's dietary needs and activity level.
- Automated Door Systems: AI can recognize authorized users for improved security and provide insights about usage patterns for energy efficiency.
- Power Tools: AI can optimize speed and power based on the material being worked on, improving safety and efficiency.
- Electric Garage Door Openers: AI can predict when you're likely to need the door open or closed, and can also enhance security by recognizing authorized vehicles.
- Security Camera Systems: AI can recognize people, vehicles, and other objects, and can send alerts based on specific detection criteria.
- Fitness Equipment: AI can personalize workout programs based on your fitness goals and progress, and can provide feedback on your form and technique.

In all these cases, AI enhances the functionality of these systems by adding the ability to learn from past data, make decisions, and adapt to changing conditions or requirements. The integration of AI with actuator systems is a key aspect of the ongoing trend towards smarter, more autonomous technology.

Further Examples

Here's a further list of various systems that may include multiple electromechanical devices that a controller can control:

- Elevator Systems
- Escalator Systems
- Automated Door Systems
- Heating, Ventilation, and Air Conditioning (HVAC) Systems
- Industrial Robot Systems
- Conveyor Belt Systems
- Automated Guided Vehicles (AGV)
- Automated Storage and Retrieval Systems (ASRS)
- Drone Swarm Systems
- Automated Greenhouse Systems
- Home Automation Systems
- Security and Surveillance Systems
- Traffic Light Control Systems
- Automated Car Parking Systems
- Automated Public Transit Systems
- Railway Signal Systems
- Power Grid Systems
- Water Supply Systems
- Wind Turbine Systems
- Solar Tracking Systems
- Hydroelectric Power Systems
- Nuclear Reactor Control Systems
- Automated Assembly Line Systems
- Automated Testing Systems
- Medical Imaging Systems
- Telemedicine Systems
- Automated Pharmacy Dispensing Systems
- Robotic Surgery Systems Hospital Bed Management Systems
Smart Classroom Systems
Library Automation Systems
Automated Broadcasting Systems
Satellite Control Systems
Telecommunication Network Systems
Internet Data Center Systems
Automated Shipping Container Systems
Oil and Gas Pipeline Systems
Mining Operation Systems
Automated Construction Equipment
Automated Farming Systems
Aquaculture Systems
Forest Fire Detection and Management Systems
Weather Monitoring and Prediction Systems
Earthquake Detection Systems
Tsunami Warning Systems
Flood Control Systems
Waste Management Systems
Smart Grid Systems
Port Management Systems
Air Traffic Control Systems Each of these systems consists of multiple devices working together, and a controller (potentially using AI) can manage these devices for optimal performance.

Local Systems Trained with Simulated Data that Further Train with Real-World Experience A "Local AI System" that initially trains on simulated data and then continues to learn from real-world data through use is a concept deeply rooted in the principles of machine learning and reinforcement learning. Here's a step-by-step explanation:

- Initial Training with Simulated Data: The system starts its learning process with a large amount of simulated data. This data is used to create a variety of hypothetical situations that the system may encounter. For example, in a robotic vacuum cleaner, the simulated data could include different room layouts, types of obstacles, dirt levels, and so on. The system uses this data to build a model that predicts the best action to take in each situation.
- Deployment and Data Collection: Once the initial training is complete, the system is deployed for real-world use. During its operation, the system continuously collects data about its performance and the environment. This might include data about how well it performed its task, what actions led to better outcomes, and any unexpected situations it encountered.
- Further Training with Real-Life Data: The real-world data collected is then used to further train the AI system. This process is often iterative, meaning the system periodically updates its model with new data. This further training allows the system to refine its predictions and improve its performance over time. For example, the robotic vacuum cleaner might learn that certain actions are more effective for cleaning corners, or that it needs to avoid certain types of obstacles that weren't included in the simulated data.
- Reinforcement Learning: The system may also use a technique called reinforcement learning, which involves learning from trial and error. In reinforcement learning, the system tries different actions, observes the results, and learns to favor the actions that lead to better outcomes. This can be particularly useful for adapting to new situations that weren't covered in the initial training data.

This kind of system has many benefits, including the ability to adapt to new situations, improve performance over time, and personalize its operation for individual users or environments. However, it also requires careful design and oversight to ensure that the learning process leads to desirable outcomes and that the system respects user privacy and safety guidelines.

More Systems That Can Have Actuators

The following books that identify systems that have actuators or could have actuators are incorporated by reference herein:

- Macaulay, David. (1988). The Way Things Work. Houghton Mifflin.
- Macaulay, David. (2016). The Way Things Work Now. DK Children.
- Macaulay, David. (1998). The New Way Things Work. Houghton Mifflin.
- Macaulay, David. (2010). Built to Last. HMH Books for Young Readers.
- Macaulay, David. (1976). Underground. Houghton Mifflin.
- Macaulay, David. (1980). Unbuilding. Houghton Mifflin.
- Macaulay, David. (1979). Motel of the Mysteries. Houghton Mifflin.
- Macaulay, David. (1993). Ship. Houghton Mifflin
- Macaulay, David. (2008). The Way We Work: Getting to Know the Amazing Human Body. Houghton Mifflin Harcourt (With respect to this book, consider that aspects of the human body are controlled in part by the brain. The brain can be trained to some extent with generalized knowledge learned from books, in school, other ways, etc. But then it further learns from actual experience with data it collects from the human senses and can improve over time relative to the generalized knowledge it learned from books, conversations with parents, from friends, etc. and such because its knowledge is expanded and refined through experience. This can be extended by analogy to mechanical systems controlled by an actuator system that has local AI that is trained initially by simulated data and then improved over time with further training from data collected from actual local experience. This can further analogized to learning in college from books and lectures that is then expanded by practical experience, so that the initial knowledge learned in college is expanded and improved over time.).
- Baumann, Anne-Sophie. (2016). The Ultimate Book of Cities. Twirl.
- Baumann, Anne-Sophie. (2015). The Ultimate Construction Site Book. Twirl.
- Baumann, Anne-Sophie. (2015). The Ultimate Book of Vehicles: From Around the World. Twirl.
- Baumann, Anne-Sophie. (2017). The Ultimate Book of Airplanes and Airports. Twirl Further Examples of Sensors that Gather Data that May be Used for Training of AI Systems, of Systems Controlled by Controllers, and Other Components Various types of sensors may be categorized by the kind of phenomena they detect. Note that some sensors can detect multiple types of phenomena.

Light Sensors

- Photodiodes: These are semiconductor devices that convert light into an electrical current. They are sensitive to different wavelengths of light depending on the specific type of photodiode.

- Phototransistors: These are similar to photodiodes but they provide amplification of the signal as well as detection.
- Photomultiplier Tubes (PMTs): These are extremely sensitive detectors of light in the ultraviolet, visible, and near-infrared ranges of the electromagnetic spectrum.
- Charge-Coupled Devices (CCDs): These are used to detect optical and ultraviolet light. They are commonly used in digital cameras and telescopes.
- Photonic Sensors: These include fiber-optic sensors that detect changes in the amount of light that's reflected back to the detector.
- Infrared Sensors: These can detect light in the infrared spectrum, often used for thermal imaging, night vision, and anemometry.

Sound Sensors

- Microphones: These are devices that convert sound waves into an electrical signal. They come in various types like dynamic microphones, condenser microphones, etc.
- Hydrophones: These are used for detecting sound underwater.
- Contact Microphones: These detect sound through solid materials.
- Ultrasonic Sensors: These detect sound in the ultrasonic frequency range, often used for distance measurement or obstacle detection.

Vibration Sensors

- Accelerometers: These are used to measure acceleration, which can be used to infer vibration.
- Piezoelectric Sensors: These generate an electrical charge in response to mechanical stress, which can be caused by vibration.
- Laser Doppler Vibrometers: These use a laser to measure the speed and displacement of vibrating objects.

Pressure Sensors

- Piezoresistive Pressure Sensors: These change resistance with pressure.
- Capacitive Pressure Sensors: These change capacitance with pressure.
- Optical Pressure Sensors: These use changes in light to measure pressure.
- Resonant Pressure Sensors: These use changes in resonance frequency to measure pressure.

Heat Sensors

- Thermocouples: These generate a voltage proportional to the temperature difference between two different types of metals.
- Resistance Temperature Detectors (RTDs): These change resistance with temperature.
- Thermistors: These are similar to RTDs but are typically more sensitive and less linear.
- Infrared Thermometers: These measure infrared radiation to infer temperature.
- Bolometers: These detect heat via changes in electrical resistance.

Examples of Other Sensors for Gathering Data

Motion sensors, or motion detectors, are devices that detect moving objects, particularly people. They are often used in security systems, automatic doors, lighting systems, and more. Here's a list of some common types:

- Passive Infrared (PIR) Sensors: These are the most widely used type of motion sensor. They detect body heat (infrared energy) and are often used in home security systems. They work by detecting changes in infrared radiation in their field of view, which can indicate the movement of a person or animal.
- Microwave Sensors: These emit microwave pulses and then measure the reflection off a moving object. They cover a larger area than PIR sensors, but they are more expensive and can be sensitive to electrical interference.
- Ultrasonic Sensors: These emit ultrasonic waves (sound waves at frequencies higher than humans can hear), which bounce off objects and return to the sensor. When an object moves, the time it takes for the waves to return changes. These sensors are often used in automatic doors and other applications where precise motion detection is necessary.
- Dual-Technology Motion Sensors: These combine two or more different types of sensors. For example, a sensor might use both PIR and microwave sensors to reduce false alarms, since both would need to be triggered for the sensor to activate.
- Area Reflective Type Sensors: These emit infrared rays from an LED. Using the reflection of these rays, the sensor measures the distance to the person or object, detecting if the object moves closer or further away.
- Vibration Sensors: These can detect motion by sensing vibrations. If something moves the object the sensor is attached to, the sensor will detect the vibration. They're often used in alarm systems to detect if someone is tampering with a window, for example.
- Video Motion Sensors: These use digital video cameras and image processing algorithms to detect movement. They can be used to trigger alarms or start recording when motion is detected.
- Laser Beam Sensors: These create a laser beam path that gets interrupted when a person or object moves through it. The sensor detects the interruption and sends a signal.
- Acoustic Sensors: These can detect sound changes in the environment. Any movement can cause a change in the sound pattern which can be detected by these sensors.

Medical Sensors

Medical sensors are used to monitor, diagnose, and treat a variety of health conditions. They can be used externally, implanted into the body, or even ingested. Here's a detailed list of some medical sensors:

- Electrocardiogram (ECG) Sensors: These sensors are used to measure the electrical activity of the heart to diagnose heart conditions.
- Blood Pressure Sensors: These are used to monitor a patient's blood pressure, providing vital information about the functioning of the cardiovascular system.
- Blood Glucose Sensors: Used by diabetics to monitor their blood sugar levels. This type of sensor is often part of a continuous glucose monitoring system.
- Oximeters: These sensors measure the oxygen saturation in a person's blood, which can be important in managing respiratory or cardiovascular conditions.
- Thermometers: Medical thermometers are used to measure body temperature, an essential parameter in diagnosing certain illnesses.
- Respiratory Rate Sensors: These monitor a patient's breathing rate. It can be critical in the management of patients with chronic respiratory diseases or acute respiratory distress.
- Pulse Rate Sensors: These measure the rate at which the heart beats.
- EEG Sensors: Electroencephalography (EEG) sensors measure electrical activity in the brain. They can be used to diagnose and monitor neurological conditions such as epilepsy.

EMG Sensors: Electromyography (EMG) sensors measure electrical activity produced by skeletal muscles. They can be used in the diagnosis of neuromuscular disorders.

Implantable Cardioverter Defibrillators (ICDs): These devices have built-in sensors that detect abnormal heart rhythms and deliver a therapeutic dose of electrical energy to restore a normal heartbeat.

Hearing Aids and Cochlear Implants: These devices have sensors that detect sound and convert it into electrical signals that can be interpreted by the brain.

Pacemakers: These devices have sensors that monitor the heart's natural rhythm and deliver electrical pulses to correct irregularities.

Wearable Fitness Trackers: These devices often include sensors to track steps, measure heart rate, and even monitor sleep patterns.

Neural Sensors: These are implanted into the brain to monitor neural activity. They can be used in the treatment of conditions like Parkinson's disease.

Force Sensors in Robotic Surgery: These sensors provide haptic feedback to surgeons, helping them guide their instruments more precisely.

Ultrasound Sensors: These are used in imaging applications, such as in prenatal care to monitor the development of a fetus.

CT and MRI Scanners: These imaging devices use a variety of sensors to create detailed images of the inside of the body.

Biosensors: These can detect a wide variety of biological materials, from glucose to DNA, and can be used in a wide variety of diagnostic tools.

Breath Analyzers: These detect substances in a patient's breath, which can be used to diagnose conditions like asthma, and to monitor the effectiveness of treatment.

Implantable Drug Delivery Systems: These devices have sensors that monitor specific health parameters and deliver medication accordingly.

These are merely examples. Medical sensors are rapidly evolving, with new devices and applications being developed and improved all the time.

Environmental Sensors

Environmental sensors are used to monitor various aspects of the natural environment. These sensors provide critical data for studying climate change, pollution levels, weather patterns, and more. Some examples:

Temperature Sensors: These measure the temperature of the environment. They're used in a variety of applications, from weather stations to climate research.

Humidity Sensors: These measure the amount of water vapor in the air. They're important for weather forecasting and climate studies.

Barometric Pressure Sensors: These measure atmospheric pressure, which is crucial for predicting weather patterns and studying climate change.

Wind Speed and Direction Sensors (Anemometers): These sensors measure how fast the wind is blowing and the direction it's coming from, essential for weather forecasting.

Rain Gauges: These sensors measure the amount of rainfall over a specific period.

Solar Radiation Sensors (Pyranometers): These sensors measure the solar radiation received from the entire hemisphere (or half sphere). They are used in meteorology, climatology, solar energy studies, and building physics.

Air Quality Sensors: These measure pollutants in the air, including particulate matter (PM2.5 and PM10), carbon monoxide, sulfur dioxide, nitrogen dioxide, and ozone. They're used to monitor air pollution and inform public health initiatives.

CO2 Sensors: These sensors measure the concentration of carbon dioxide in the air, which can be used to monitor indoor air quality or track greenhouse gas emissions.

Soil Moisture Sensors: These measure the water content in soil, which is critical for agriculture and irrigation planning, as well as flood prediction.

Soil pH Sensors: These sensors measure the pH level of soil, which affects the health and growth of plants.

Water Quality Sensors: These measure parameters like pH, dissolved oxygen, turbidity, and conductivity in water bodies. They're used to monitor the health of rivers, lakes, and oceans, as well as drinking water sources.

Seismometers: These sensors detect and measure seismic waves, helping scientists predict and track earthquakes.

Tide Gauges: These sensors measure the height of the ocean's surface relative to a specific point on land. They're used to monitor sea level rise and predict tides.

Snow Depth Sensors: These measure the amount of snowfall and the depth of snow on the ground, important for climate studies and weather forecasting.

Leaf Wetness Sensors: These sensors measure the wetness on leaves, which can help predict disease outbreaks in crops.

Gas Sensors: These sensors can detect various gases like methane, radon, and other greenhouse gases.

Noise Sensors: These sensors measure ambient noise levels, which can be used for studying the impact of noise pollution on ecosystems and human health.

Lightning Detectors: These sensors can detect and locate lightning strikes, which is useful for weather prediction and climate studies.

Ultraviolet (UV) Sensors: These sensors measure the intensity of UV radiation, which is important for understanding the effects of ozone depletion and climate change.

Flame Detectors: These sensors detect the presence of fire by monitoring for specific types of light (UV or IR) or changes in light intensity.

There are many other types of environmental sensors used for a variety of purposes in different fields.

Sensors Used in Structural Engineering and Testing of Structures

In structural engineering, various types of sensors are used to monitor and test the integrity and safety of buildings, bridges, dams, and other structures. Here's a list of some common types of sensors used in this field:

Strain Gauges: These sensors measure strain in a material caused by stress. They are often used in structural testing to detect potential failure points.

Accelerometers: These sensors measure the acceleration and vibration of structures, which can indicate movement or instability.

Displacement Sensors: These measure the movement of different parts of a structure relative to each other. They can help detect shifts or deformations in a structure that might indicate a problem.

Inclinometers (Tilt Sensors): These sensors measure the tilt or inclination of a structure. They can be used to monitor the stability of buildings, bridges, towers, and other structures.

- Piezometers: These sensors measure the pressure of fluids (usually water) in soil or rock, which can affect the stability of foundations and underground structures.
- Load Cells: These sensors measure force or load. In structural engineering, they can be used to measure the weight or pressure applied to a certain part of a structure.
- Thermocouples/RTDs: These sensors measure temperature changes in structures which can affect material properties and lead to thermal stress.
- Crack Meters: These sensors measure changes in crack width in structures, helping to detect potential structural failure.
- Corrosion Sensors: These sensors measure the rate of corrosion in metal structures, which can weaken the structure over time.
- Concrete Maturity Sensors: These sensors measure the temperature and time to estimate the strength of concrete.
- Fiber Optic Sensors: These sensors can measure various parameters like temperature, strain, and pressure. Their small size and immunity to electromagnetic interference can make them useful in certain structural monitoring applications.
- Ground-Penetrating Radar (GPR): This technology uses radar pulses to image the subsurface. This can be used to detect voids, cracks, or other structural issues in concrete and other materials.
- Ultrasonic Sensors: These sensors use high-frequency sound waves to detect flaws or cracks within structural materials.
- Laser Scanners: These sensors use laser light to measure distances and can create detailed 3D models of structures.
- Drones with Sensors: Drones can be equipped with a variety of sensors (like cameras, infrared sensors, LIDAR) to inspect hard-to-reach areas of large structures like bridges and skyscrapers.
- Structural Health Monitoring (SHM) Systems: These systems use a variety of sensor types to continuously monitor a structure for damage or changes in performance.
- Humidity and Moisture Sensors: These sensors can be used to detect water intrusion or high humidity levels in a building, which can lead to structural damage over time.
- Anemometers: These sensors measure wind speed and direction, which can be important in the design and monitoring of tall buildings and bridges.
- Seismometers: These sensors are used to measure the motion of the ground during an earthquake. They're often used in areas prone to seismic activity to design structures that can withstand earthquakes.
- Sound and Vibration Sensors: These sensors can be used to detect changes in the structural integrity of a building or other structure by monitoring for unusual sounds or vibrations.

Sensors in Audio Recording

Sensors in the music industry help in capturing, enhancing, and reproducing sound, for example. Here's a list of some common types of sensors used in this field:

- Microphones: These are the most essential sensors in music recording. They convert sound waves into an electrical signal. There are many types of microphones used in recording, including dynamic microphones, condenser microphones, ribbon microphones, lavalier microphones, and shotgun microphones.
- MIDI Controllers: These devices, including keyboards and drum pads, have sensors that detect the velocity of a musician's touch and convert it into MIDI data to control virtual instruments or other digital audio workstations (DAW).
- Pickups: These sensors are used on electric guitars and basses to convert the vibration of the strings into an electrical signal. There are several types, including single-coil, humbucker, and piezoelectric pickups.
- Contact Microphones: These are a type of microphone that pick up vibrations directly from a solid material, such as the body of a musical instrument. They can be used to capture unique tonal qualities that aren't always picked up by traditional air microphones.
- Capacitive Touch Sensors: These sensors are used in some modern music equipment, like touch-sensitive MIDI controllers, to sense the musician's touch.
- Optical Sensors: These are used in devices like optical compressors, where they detect the level of the input signal and use that information to control the level of the output signal.
- Proximity Sensors: In some musical instruments or devices, these sensors can detect the presence of the musician's hand or finger without physical contact.
- Infrared Sensors: These sensors can detect motion and are used in some electronic musical instruments to control parameters like volume or pitch.
- Foot Pedal Sensors: These are used in various musical equipment like sustain pedals for keyboards, expression pedals for guitar effects, and kick drum triggers for electronic drum kits.
- Vibration Sensors/Piezoelectric Sensors: These can be attached to acoustic instruments to pick up the vibrations of the instrument, converting them into an electrical signal.
- Pressure Sensors: These are used in some wind MIDI controllers to detect the pressure of the breath.
- Magnetic Sensors: In some musical devices, these sensors can detect the movement of a magnetic field to control certain parameters.
- Theremin Antennas: The theremin, an early electronic musical instrument, uses two antennas to sense the position of the player's hands. One antenna controls pitch, and the other controls volume.
- Accelerometers: These sensors can be used in wearable musical technology to detect the movement of the musician.
- Humidity and Temperature Sensors: These aren't directly involved in the recording process, but they're important in maintaining the condition of musical instruments, especially acoustic ones like guitars, violins, and pianos.
- Sound Level Meters: These devices use a microphone to measure sound pressure levels. They're important in setting up a recording environment and maintaining safe listening levels.

Actuators in Electro-Mechanical Systems that a Control System Controls

Actuators are devices that convert energy into motion. They play a crucial role in electromechanical systems, which are often under the control of some type of control system. Here is a list of various types of actuators that you might find in such systems:

- Electric Motors: These convert electrical energy into mechanical motion. There are many types of electric motors used in electromechanical systems, including DC motors, AC motors, stepper motors, and servo motors.

Solenoids: These are a type of electromagnetic actuator that converts electrical energy into linear motion. They're often used in applications like valves, switches, and relays.

Relays: These are electrically operated switches. They use an electromagnet to mechanically operate a switch, allowing a lower-power circuit to control a higher-power circuit.

Linear Actuators: These devices convert rotational motion (often from an electric motor) into linear motion. They're used in a wide range of applications, from industrial machines to consumer products like electric adjustable beds.

Hydraulic Actuators: These use the pressure of a liquid to create motion. They're often used in applications that require a lot of force, like heavy machinery and aircraft controls.

Pneumatic Actuators: These use the pressure of a gas (often air) to create motion. They're often used in applications that require a high speed of operation, like some types of industrial machinery.

Piezoelectric Actuators: These use the piezoelectric effect (where certain materials generate an electric charge in response to mechanical stress) to create precise, small-scale motion. They're often used in applications like precision machinery and optical equipment.

Thermal Actuators: These use the expansion and contraction of materials in response to temperature changes to create motion. They're often used in applications like thermostats and temperature-controlled valves.

Shape Memory Alloys (SMA): These materials change shape in response to changes in temperature, and can be used to create motion in various applications.

Magnetic Actuators: These use the attractive or repulsive forces of magnets to create motion. They're often used in applications like magnetic levitation and certain types of motors and generators.

Light-Driven Actuators: These use the energy of light to create motion. While still relatively rare, they're being researched for potential applications in areas like robotics and nanotechnology.

Electrostatic Actuators: These use the attractive or repulsive forces generated by electric fields to create motion. They're often used in micro- and nano-scale applications.

Servomechanisms (Servos): These are a type of actuator that can provide precise control of position, velocity, or acceleration. They're used in a wide range of applications, from robotics to aircraft control systems.

Switches and Buttons: These are simple types of actuators that can be used to control electrical circuits.

LEDs: While not an actuator in the traditional sense, LEDs (Light Emitting Diodes) are often used in control systems as indicators or display elements.

Vibration Motors: These are used in many handheld devices to provide haptic feedback to the user.

Electromechanical Systems with a Control System, Actuators, and Feedback

Electromechanical systems are widely used in many industries, ranging from manufacturing to transportation, healthcare, and consumer electronics. These systems often include a control system, various types of actuators, and feedback devices. Here are some examples:

Industrial Robots: These machines perform tasks in manufacturing and production lines. They often use servo motors as actuators, various types of sensors (such as position and force sensors) for feedback, and a programmable logic controller (PLC) or industrial PC as the control system.

CNC Machines: Computer Numerical Control (CNC) machines, like mills, lathes, and routers, use electric motors as actuators, encoders for position feedback, and a computer-based control system.

Elevators: These systems use an electric motor as the actuator to move the elevator car, sensors to provide feedback on the car's position, and a control system to manage the operation based on user input and safety conditions.

Drones: Drones use brushless motors to control propellers, various sensors (like gyroscopes, accelerometers, GPS, and cameras) for feedback, and an embedded control system to maintain stability and follow commands.

Electric Cars: These vehicles use electric motors to drive the wheels, various sensors (like speed sensors, temperature sensors, and battery monitors) for feedback, and a complex control system to manage the propulsion, battery management, and other systems.

HVAC Systems: Heating, Ventilation, and Air Conditioning systems use various types of actuators (like motors and valves), sensors (like temperature and humidity sensors) for feedback, and a control system to maintain the desired environmental conditions.

Automated Guided Vehicles (AGVs): These are mobile robots used in warehouses and factories for material handling. They use electric motors for movement, various sensors (like Lidar, encoders, cameras) for feedback and navigation, and a control system to follow predetermined routes or make decisions based on sensor input.

3D Printers: These machines use stepper motors or servo motors for precise movement of the print head, sensors (like temperature sensors and limit switches) for feedback, and a control system to follow the 3D print instructions.

Medical Devices: Devices like insulin pumps and ventilators use various types of actuators (like pumps and valves), sensors (like glucose sensors and pressure sensors) for feedback, and a control system to provide the appropriate medical treatment. As an illustration, an infusion system may have an electro-mechanical device for putting medications, saliene, and/or other fluids into a human body, for example. The infusion system also has a control system. Local AI can be trained with initial data. But then over time with a group of patients or a single patient, gather local real-world data about the patient(s). For example, how patient vital signs or brainwaves or other measurable parameters react to medication and/or to the rate at which medication is delivered and/or other parameters. The patient's condition over time may also be monitored. The infusion system can then be trained on the real-world data it collects from the patient or patients and/or the infusion or other system. Optionally, real-world data gathered may be provided to a system that generates initial data on which infusion systems are trained, to improve that system for generating initial training data for other devices. Such data may be provided in batches or in real-time. This concept can be extended to a wide variety of other medical and other devices.

Wind Turbines: These systems use electric motors for adjusting the blade pitch and orientation, sensors (like wind speed and direction sensors, and power output sensors) for feedback, and a control system to maximize power generation and protect the system in extreme conditions.

Automated Doors: These systems use electric motors or pneumatic actuators to open and close the door, sensors (like infrared sensors or pressure mats) to detect the presence of people, and a control system to manage the operation.

Washing Machines: These appliances use electric motors for agitation and spinning, various sensors (like water level and temperature sensors) for feedback, and a control system to manage the washing cycles.

Dishwashers: Similar to washing machines, dishwashers use motors for spraying water and rotating the dish rack, sensors (like water level and temperature sensors) for feedback, and a control system to manage the washing cycles.

Servo Systems in Photography and Filmmaking: Servo systems are used in camera stabilization systems, camera sliders, and focus pulling systems. They use servo motors for movement, encoders or potentiometers for position feedback, and a control system to follow the desired motion profile.

Train Control: Trains use electric motors for propulsion, various sensors (like speed sensors, and track occupancy detectors) for feedback, and a control system to manage the operation based on timetable, safety conditions, and operator input.

Spacecraft Systems: Spacecraft use various types of actuators (like thrusters, and reaction wheels), sensors (like gyroscopes, star trackers, and altitude sensors) for feedback, and a control system to manage the mission.

Prosthetic Limbs: Modern prosthetic limbs use electric motors or pneumatic actuators to mimic natural movements, sensors (like position and force sensors) for feedback, and a control system to interpret the user's intent based on sensor data and provide the appropriate response.

Automated Greenhouses: These systems use various types of actuators (like motors, pumps, and valves) to control the environment, sensors (like temperature, humidity, and light sensors) for feedback, and a control system to maintain the optimal conditions for plant growth.

Home Automation Systems: These systems use various types of actuators (like motors, relays, and solenoids) to control home devices, sensors (like motion sensors, door/window sensors, and environmental sensors) for feedback, and a control system to manage the operation based on user input and predefined rules.

Industrial Process Control Systems: These systems use various types of actuators (like motors, pumps, valves, and relays) to control the process, sensors (like temperature, pressure, and flow sensors) for feedback, and a control system to maintain the process within the desired parameters.

Train Control Systems: Trains use electric motors for propulsion, various sensors (like speed sensors, and track occupancy detectors) for feedback, and a control system to manage the operation based on timetable, safety conditions, and operator input.

Spacecraft Systems: Spacecraft use various types of actuators (like thrusters, and reaction wheels), sensors (like gyroscopes, star trackers, and altitude sensors) for feedback, and a control system to manage the mission.

Prosthetic Limbs: Modern prosthetic limbs use electric motors or pneumatic actuators to mimic natural movements, sensors (like position and force sensors) for feedback, and a control system to interpret the user's intent based on sensor data and provide the appropriate response.

Automated Greenhouses: These systems use various types of actuators (like motors, pumps, and valves) to control the environment, sensors (like temperature, humidity, and light sensors) for feedback, and a control system to maintain the optimal conditions for plant growth.

Home Automation Systems: These systems use various types of actuators (like motors, relays, and solenoids) to control home devices, sensors (like motion sensors, door/window sensors, and environmental sensors) for feedback, and a control system to manage the operation based on user input and predefined rules.

Industrial Process Control Systems: These systems use various types of actuators (like motors, pumps, valves, and relays) to control the process, sensors (like temperature, pressure, and flow sensors) for feedback, and a control system to maintain the process within the desired parameters.

Electromechanical Systems with a Control System, Actuators, and Feedback Devices Autonomous Vehicles: Autonomous vehicles use various actuators (such as electric motors for propulsion and steering), a multitude of sensors (like Lidar, cameras, radar, and ultrasonic sensors) for feedback, and a complex control system (often incorporating AI algorithms) for autonomous navigation.

Surgical Robots: These systems use precise actuators for movement, sensors to provide detailed feedback (such as force sensors, visual sensors), and a control system to ensure accurate and safe operation.

Electric Bicycles: E-bikes use electric motors for propulsion, sensors (like speed and pedal torque sensors) for feedback, and a control system to provide the right amount of electric assist based on rider input and conditions.

Automated Teller Machines (ATMs): These machines use various actuators (like motors and solenoids) to handle cash and cards, sensors (like magnetic card readers and cash detectors) for feedback, and a control system to carry out transactions based on user input.

Flight Control Systems: These systems in aircraft use various actuators (like servo valves and motors) to control the aircraft's flight surfaces, sensors (like gyroscopes, accelerometers, and airspeed sensors) for feedback, and a control system to maintain flight stability and control.

Industrial Ovens and Furnaces: These systems use actuators (like gas valves and fans), sensors (like temperature and pressure sensors) for feedback, and a control system to maintain the desired temperature and operating conditions.

Automated Drilling Machines: These machines use electric motors for drilling, sensors (like force and depth sensors) for feedback, and a control system to ensure accurate and safe operation.

Automated Test Equipment (ATE): ATE systems use various actuators (like relays and switches) to connect to the device under test, sensors (like voltage and current meters) for feedback, and a control system to carry out the test procedures and evaluate the results.

Power Grid Systems: These systems use actuators (like circuit breakers and transformers), sensors (like voltage and current sensors) for feedback, and a control system to maintain stable and efficient operation of the power grid.

Water Treatment Plants: These systems use various actuators (like pumps and valves), sensors (like pH, temperature, and flow sensors) for feedback, and a control system to ensure the water is treated to the required standards.

Fitness Equipment: Devices like treadmills and stationary bikes use electric motors for resistance, sensors (like speed and heart rate sensors) for feedback, and a control system to adjust the workout based on user input and conditions.

Arcade Games: These games use various actuators (like motors and solenoids) to create game effects, sensors (like buttons and joysticks) for feedback, and a control system to manage the game play.

Traffic Control Systems: These systems use actuators (like traffic lights), sensors (like vehicle detectors and cameras) for feedback, and a control system to manage traffic flow and safety.

Automated Laboratory Equipment: Devices like automated pipettes and microplate readers use various actuators for operation, sensors for feedback, and a control system to carry out laboratory procedures.

3D Scanners: These devices use actuators (like motors) to move the scanner or the object, sensors (like cameras and lasers) for feedback, and a control system to create a 3D model of the scanned object.

Autonomous Underwater Vehicles (AUVs): These vehicles use various actuators (like thrusters), sensors (like sonar, pressure sensors, and cameras) for feedback, and a control system to carry out the mission.

Farm Automation Equipment: These systems, like automated milking machines and crop sprayers, use various actuators (like motors and pumps), sensors (like position and volume sensors) for feedback, and a control system to manage the operation.

Security Systems: These systems use various actuators (like alarms and locks), sensors (like motion detectors and door/window sensors) for feedback, and a control system to detect and respond to security threats.

Weather Stations: These systems use various sensors (like temperature, humidity, wind speed/direction, and rainfall sensors) for feedback, and a control system to record and transmit the weather data.

Automated Guided Missile Systems: These systems use various actuators (like rocket engines and control fins), sensors (like radar, infrared, and GPS) for feedback, and a control system to guide the missile to the target.

Electric Wheelchairs: These devices use electric motors for propulsion and steering, sensors (like joystick and tilt sensors) for feedback, and a control system to ensure safe and convenient mobility for the user.

Vending Machines: These machines use various actuators (like motors and solenoids) to dispense products, sensors (like coin/bill acceptors and product detectors) for feedback, and a control system to manage the vending operation.

Automatic Sliding Doors: These doors use electric motors for opening and closing, sensors (like infrared or microwave motion detectors) for feedback, and a control system to manage the operation.

Cranes and Hoists: These machines use electric motors for lifting and moving loads, sensors (like position and load sensors) for feedback, and a control system to ensure safe and efficient operation.

Solar Tracking Systems: These systems use electric motors to adjust the orientation of the solar panels, sensors (like light sensors) for feedback, and a control system to maximize the solar energy capture.

Telecommunication Systems: These systems use various actuators (like switches and amplifiers), sensors (like signal strength and quality sensors) for feedback, and a control system to manage the communication network.

Automatic Car Wash Systems: These systems use various actuators (like motors, pumps, and valves), sensors (like position and vehicle detectors) for feedback, and a control system to manage the car wash operation.

Printing Presses: These machines use various actuators (like motors and cylinders) to print on paper, sensors (like paper detectors and color sensors) for feedback, and a control system to manage the printing process.

Automated Assembly Systems: These systems use various actuators (like motors, pneumatic cylinders, and grippers), sensors (like position, force, and vision sensors) for feedback, and a control system to assemble products.

Railway Signalling Systems: These systems use various actuators (like signals and point machines), sensors (like train detectors and track circuits) for feedback, and a control system to ensure safe and efficient railway operation.

Farm Automation Equipment: These systems, like automated milking machines and crop sprayers, use various actuators (like motors and pumps), sensors (like position and volume sensors) for feedback, and a control system to manage the operation.

Security Systems: These systems use various actuators (like alarms and locks), sensors (like motion detectors and door/window sensors) for feedback, and a control system to detect and respond to security threats.

Weather Stations: These systems use various sensors (like temperature, humidity, wind speed/direction, and rainfall sensors) for feedback, and a control system to record and transmit the weather data.

Automated Guided Missile Systems: These systems use various actuators (like rocket engines and control fins), sensors (like radar, infrared, and GPS) for feedback, and a control system to guide the missile to the target.

Electric Wheelchairs: These devices use electric motors for propulsion and steering, sensors (like joystick and tilt sensors) for feedback, and a control system to ensure safe and convenient mobility for the user.

Vending Machines: These machines use various actuators (like motors and solenoids) to dispense products, sensors (like coin/bill acceptors and product detectors) for feedback, and a control system to manage the vending operation.

Automatic Sliding Doors: These doors use electric motors for opening and closing, sensors (like infrared or microwave motion detectors) for feedback, and a control system to manage the operation.

Cranes and Hoists: These machines use electric motors for lifting and moving loads, sensors (like position and load sensors) for feedback, and a control system to ensure safe and efficient operation.

Solar Tracking Systems: These systems use electric motors to adjust the orientation of the solar panels, sensors (like light sensors) for feedback, and a control system to maximize the solar energy capture.

Telecommunication Systems: These systems use various actuators (like switches and amplifiers), sensors (like signal strength and quality sensors) for feedback, and a control system to manage the communication network.

Automatic Car Wash Systems: These systems use various actuators (like motors, pumps, and valves), sensors (like position and vehicle detectors) for feedback, and a control system to manage the car wash operation.

Printing Presses: These machines use various actuators (like motors and cylinders) to print on paper, sensors (like paper detectors and color sensors) for feedback, and a control system to manage the printing process.

Automated Assembly Systems: These systems use various actuators (like motors, pneumatic cylinders, and grippers), sensors (like position, force, and vision sensors) for feedback, and a control system to assemble products.

Railway Signaling Systems: These systems use various actuators (like signals and point machines), sensors (like train detectors and track circuits) for feedback, and a control system to ensure safe and efficient railway operation.

Automatic Brewing Systems: These systems use various actuators (like pumps, valves, and heaters), sensors (like temperature, pressure, and flow sensors) for feedback, and a control system to manage the brewing process.

Robotic Vacuum Cleaners: These devices use electric motors for propulsion and cleaning, sensors (like bump, cliff, and dirt sensors) for feedback, and a control system to navigate and clean the area.

Elevator Systems: These systems use electric motors to move the elevator, sensors (like position and load sensors) for feedback, and a control system to manage the operation.

Household Appliances: Devices like dishwashers, refrigerators, and vacuum cleaners use various actuators (like motors and solenoids) to carry out their functions, sensors (like temperature, humidity, and dirt sensors) for feedback, and a control system to manage the operation Trains and Trams: These transportation systems use electric motors for propulsion and various auxiliary systems, sensors (like speed, position, and obstacle detectors) for feedback, and a control system to ensure safe and efficient operation Automobile Industry: Devices like alternators and electric motors in cars use actuators (like motors and solenoids) to generate electricity and provide power to various systems, sensors (like voltage, current, and temperature sensors) for feedback, and a control system to manage the operation CD and DVD Players: These devices use actuators (like motors and lasers) to read the disc, sensors (like photodetectors) for feedback, and a control system to manage the playback operation Electric Motors in Various Appliances: Devices like fans, blenders, and power window regulators use electric motors as actuators, sensors (like speed, position, and load sensors) for feedback, and a control system to manage the operation Solenoid-based Devices: Devices like car keys, doorbells, and various automated industrial systems use solenoids as actuators, sensors (like position and current sensors) for feedback, and a control system to manage the operation Mechatronic Devices: Systems like anti-lock brakes in cars and digital SLR cameras use various actuators (like motors and solenoids), sensors (like speed, position, and light sensors) for feedback, and a control system to manage the operation Cardiac Defibrillators: These medical devices use actuators (like capacitors and electrodes) to deliver electric shocks, sensors (like ECG electrodes) for feedback, and a control system to manage the defibrillation operation Pacemakers: These medical devices use actuators (like electrodes) to deliver electrical pulses, sensors (like voltage and current sensors) for feedback, and a control system to regulate the heart rhythm Ventilators: These medical devices use actuators (like motors and valves) to provide respiratory support, sensors (like pressure, flow, and oxygen sensors) for feedback, and a control system to manage the ventilation operation IV Pumps: These medical devices use actuators (like motors and valves) to deliver fluids, sensors (like flow and pressure sensors) for feedback, and a control system to manage the infusion operation Insulin Pumps: These medical devices use actuators (like motors and valves) to deliver insulin, sensors (like glucose sensors and insulin level sensors) for feedback, and a control system to manage the insulin delivery operation Heart Rate Monitors and Pulse Oximeters: These medical devices use actuators (like LEDs) to emit light, sensors (like photodetectors) for feedback, and a control system to calculate and display the heart rate and blood oxygen saturation MRI Machines, CT Scanners, and Ultrasound Machines: These medical devices use various actuators (like magnets, X-ray tubes, and piezoelectric crystals) to generate imaging signals, sensors (like RF coils etc.)

Examples of Electromechanical Devices and Systems

Electric motors: These convert electrical energy into mechanical energy using gears and magnetic fields. They are found in everyday products like fans, blenders, and power window regulators.

Solenoids: These are cylindrical objects that generate a magnetic field when a current flows through their wire to create linear motion. They are useful as switches or valves and can be found in products like car keys and doorbells.

Mechatronics: This is a field that combines mechanical, control systems and algorithms, sensors, actuators, and system integration. A few non-limiting examples include robotics, automotive, medical devices, manufacturing, and consumer items such as digital SLR cameras and such.

Cardiac defibrillators: These are medical devices that restore a normal heartbeat by sending an electric pulse or shock to the heart.

Pacemakers: These are small devices that are placed under the skin in your chest to help control your heartbeat.

Ventilators: These are machines that move breathable air into and out of the lungs to deliver breaths to a patient who is physically unable to breathe or breathing insufficiently.

IV pumps: These are devices that deliver fluids, such as nutrients and medications, into a patient's body in controlled amounts.

Insulin pumps: These are small devices that deliver insulin in a continuous, controlled manner, helping to manage blood glucose levels in people with diabetes.

Monitoring equipment like heart rate monitors and pulse oximeters: These devices monitor various aspects of patient health and vital signs.

Diagnostic equipment such as MRI machines, CT scanners, and ultrasound machines: These devices use different imaging technologies to view the inside of the body in diagnosing or monitoring medical conditions.

Medical lasers: These are lasers used for surgery, cosmetic procedures, and eye treatment, among other applications.

Infant incubators: These are devices that provide a controlled and protective environment for newborn infants who are in critical condition.

Wearable medical devices and other connected devices.

Surveillance Drones: These systems use electric motors for propulsion, sensors (like cameras and Lidar) for feedback, and a control system to manage flight and surveillance operations.

Surgical Robots: These systems use various types of actuators (like motors and pneumatic devices) to perform precise movements, sensors (like force sensors and vision systems) for feedback, and a control system to guide the surgery based on the surgeon's input.

Autonomous Underwater Vehicles (AUVs): These systems use electric motors for propulsion and control of movement, sensors (like sonar and pressure sensors) for feedback, and a control system to manage the mission.

Building Automation Systems: These systems use various types of actuators (like motors, pumps, and valves) to control building facilities, sensors (like temperature, humidity, and occupancy sensors) for feedback, and a control system to manage the operation for energy efficiency and comfort.

Traffic Control Systems: These systems use actuators (like traffic lights and variable message signs), sensors (like vehicle detectors and cameras) for feedback, and a control system to manage traffic flow.

Automated Test Equipment (ATE): These systems use various types of actuators (like motors and switches) to handle and test devices, sensors (like voltmeters and oscilloscopes) for feedback, and a control system to manage the testing process.

Autonomous Mobile Robots (AMRs): These systems use electric motors for movement, various sensors (like cameras, Lidar, and encoders) for feedback, and a control system to navigate and perform tasks autonomously.

Artificial Heart Devices: These systems use various types of actuators (like pumps), sensors (like pressure sensors and flow sensors) for feedback, and a control system to mimic the function of the heart.

Factory Automation Systems: These systems use various types of actuators (like motors, conveyors, and robotic arms) to perform tasks, sensors (like vision systems and position sensors) for feedback, and a control system to manage the production process.

Flight Control Systems: These systems use various types of actuators (like servo motors and hydraulic systems) to control aircraft movements, sensors (like gyroscopes, accelerometers, and airspeed sensors) for feedback, and a control system to manage the flight.

Automatic Door Systems: These systems use electric motors to open and close doors, sensors (like infrared sensors) for feedback, and a control system to manage the operation based on user presence and safety conditions.

Self-Driving Cars: These vehicles use electric motors for propulsion and control, various sensors (like Lidar, radar, cameras, and ultrasonic sensors) for feedback, and a control system to manage the driving.

Power Grid Control Systems: These systems use various types of actuators (like circuit breakers and transformers), sensors (like current transformers and voltage transformers) for feedback, and a control system to manage the power distribution.

Automated Guided Vehicle (AGV) Systems: These systems use electric motors for movement, various sensors (like Lidar and encoders) for feedback, and a control system to follow predetermined routes or make decisions based on sensor input.

Robotic Arm Systems: These systems use electric motors or hydraulic systems for movement, various sensors (like force sensors and encoders) for feedback, and a control system to manage the operation based on the task.

Irrigation Control Systems: These systems use various types of actuators (like pumps and valves) to control water distribution, sensors (like soil moisture sensors and weather stations) for feedback, and a control system to manage irrigation based on crop needs and weather conditions.

Automated Parking Systems: These systems use various types of actuators (like motors, conveyors, and lifts) to move cars, sensors (like position sensors and cameras) for feedback, and a control system to manage the parking process.

Vending Machines: These machines use electric motors to dispense products, sensors (like optical sensors and coin/bill detectors) for feedback, and a control system to manage the operation based on user input.

Fire Suppression Systems: These systems use various types of actuators (like valves and pumps) to control the suppression agents, sensors (like smoke detectors and heat detectors) for feedback, and a control system to activate the system when a fire is detected.

Flight Simulators: These systems use various types of actuators (like servo motors and hydraulic systems) to mimic aircraft movements, sensors (like encoders and accelerometers) for feedback, and a control system to manage the simulation based on the scenario.

Water Treatment Plants: These systems use various types of actuators (like pumps and valves) to control the treatment process, sensors (like pH sensors and turbidity sensors) for feedback, and a control system to manage the process to ensure water quality.

Automated Telescope Systems: These systems use electric motors for movement, various sensors (like cameras and position sensors) for feedback, and a control system to point the telescope based on the observation plan.

Automated Warehouses: These systems use various types of actuators (like motors, conveyors, and robotic arms) to move goods, sensors (like barcode scanners and cameras) for feedback, and a control system to manage the storage and retrieval process.

- Oil and Gas Pipeline Control Systems: These systems use various types of actuators (like pumps and valves) to control the flow, sensors (like pressure sensors and flow meters) for feedback, and a control system to manage the operation based on demand and safety conditions.
- Automated Sorting Systems: These systems use various types of actuators (like motors, conveyors, and sorters) to move and sort items, sensors (like barcode scanners and cameras) for feedback, and a control system to manage the sorting process.
- Automated Microscope Systems: These systems use electric motors for movement, various sensors (like cameras and position sensors) for feedback, and a control system to manage the observation based on the user's input.
- Substation Automation Systems: These systems use various types of actuators (like circuit breakers and switches), sensors (like current transformers and voltage transformers) for feedback, and a control system to manage the operation for reliability and efficiency of the power distribution.
- Automated Packaging Machines: These machines use various types of actuators (like motors, conveyors, and robotic arms) to package products, sensors (like vision systems and position sensors) for feedback, and a control system to manage the packaging process.
- Automated Metro Systems: These systems use electric motors for propulsion, various sensors (like speed sensors and door sensors) for feedback, and a control system to manage the operation based on timetable and safety conditions.
- Sewage Treatment Plants: These systems use various types of actuators (like pumps and blowers) to control the treatment process, sensors (like pH sensors and dissolved oxygen sensors) for feedback, and a control system to manage the process to ensure the treated water and valves to control water distribution, sensors (like soil moisture sensors and weather stations) for feedback, and a control system to manage irrigation based on crop needs and weather conditions.
- Automated Parking Systems: These systems use various types of actuators (like motors, conveyors, and lifts) to move cars, sensors (like position sensors and cameras) for feedback, and a control system to manage the parking process.
- Vending Machines: These machines use electric motors to dispense products, sensors (like optical sensors and coin/bill detectors) for feedback, and a control system to manage the operation based on user input.
- Fire Suppression Systems: These systems use various types of actuators (like valves and pumps) to control the suppression agents, sensors (like smoke detectors and heat detectors) for feedback, and a control system to activate the system when a fire is detected.
- Flight Simulators: These systems use various types of actuators (like servo motors and hydraulic systems) to mimic aircraft movements, sensors (like encoders and accelerometers) for feedback, and a control system to manage the simulation based on the scenario.
- Water Treatment Plants: These systems use various types of actuators (like pumps and valves) to control the treatment process, sensors (like pH sensors and turbidity sensors) for feedback, and a control system to manage the process to ensure water quality.
- Automated Telescope Systems: These systems use electric motors for movement, various sensors (like cameras and position sensors) for feedback, and a control system to point the telescope based on the observation plan.
- Automated Warehouses: These systems use various types of actuators (like motors, conveyors, and robotic arms) to move goods, sensors (like barcode scanners and cameras) for feedback, and a control system to manage the storage and retrieval process.
- Oil and Gas Pipeline Control Systems: These systems use various types of actuators (like pumps and valves) to control the flow, sensors (like pressure sensors and flow meters) for feedback, and a control system to manage the operation based on demand and safety conditions.
- Automated Sorting Systems: These systems use various types of actuators (like motors, conveyors, and sorters) to move and sort items, sensors (like barcode scanners and cameras) for feedback, and a control system to manage the sorting process.
- Automated Microscope Systems: These systems use electric motors for movement, various sensors (like cameras and position sensors) for feedback, and a control system to manage the observation based on the user's input.
- Substation Automation Systems: These systems use various types of actuators (like circuit breakers and switches), sensors (like current transformers and voltage transformers) for feedback, and a control system to manage the operation for reliability and efficiency of the power distribution.
- Automated Packaging Machines: These machines use various types of actuators (like motors, conveyors, and robotic arms) to package products, sensors (like vision systems and position sensors) for feedback, and a control system to manage the packaging process.
- Automated Metro Systems: These systems use electric motors for propulsion, various sensors (like speed sensors and door sensors) for feedback, and a control system to manage the operation based on timetable and safety conditions.
- Sewage Treatment Plants: These systems use various types of actuators (like pumps and blowers) to control the treatment process, sensors (like pH sensors and dissolved oxygen sensors) for feedback, and a control system to manage the process to ensure the treated water
- Sewage Treatment Plants: These systems use various types of actuators (like pumps and blowers) to control the treatment process, sensors (like pH sensors and dissolved oxygen sensors) for feedback, and a control system to manage the process to ensure the treated water quality.
- Automated Library Systems: These systems use various types of actuators (like motors and robotic arms) to move and sort books, sensors (like RFID readers and barcode scanners) for feedback, and a control system to manage the operation.
- Air Traffic Control Systems: These systems use various types of actuators (like radios and displays), sensors (like radar and ADS-B receivers) for feedback, and a control system to manage air traffic.
- Automated Weather Stations: These systems use various types of actuators (like motors and switches) to control the observation devices, sensors (like anemometers, thermometers, and hygrometers) for feedback, and a control system to manage the observation and data collection.

Automated Farming Systems: These systems use various types of actuators (like motors, pumps, and valves) to control farming operations, sensors (like soil sensors and weather stations) for feedback, and a control system to manage the farming based on crop needs and weather conditions.

Automated Material Handling Systems: These systems use various types of actuators (like motors, conveyors, and robotic arms) to move materials, sensors (like barcode scanners and cameras) for feedback, and a control system to manage the operation.

Elevator Control Systems: These systems use electric motors to move the elevator, sensors (like position sensors and door sensors) for feedback, and a control system to manage the operation based on user input and safety conditions.

Automated Cooking Systems: These systems use various types of actuators (like motors, heaters, and valves) to control cooking operations, sensors (like temperature sensors and timers) for feedback, and a control system to manage the cooking based on the recipe.

Security Systems: These systems use various types of actuators (like alarms and locks), sensors (like motion detectors and cameras) for feedback, and a control system to manage the security based on detected threats and user input.

Wind Turbine Control Systems: These systems use various types of actuators (like motors and brakes) to control the turbine operation, sensors (like wind speed sensors and power meters) for feedback, and a control system to maximize the energy production and ensure safety.

Ship Control Systems: These systems use various types of actuators (like motors and valves) to control the ship operation, sensors (like gyroscopes, GPS, and depth sounders) for feedback, and a control system to manage the navigation and safety.

Automated Laboratory Equipment: These systems use various types of actuators (like motors, pumps, and valves) to control the experiment, sensors (like spectrometers and pH meters) for feedback, and a control system to manage the experiment based on the protocol.

Automated Laundry Machines: These machines use electric motors to wash and dry clothes, sensors (like water level sensors and temperature sensors) for feedback, and a control system to manage the operation based on user input.

Automated Assembly Systems: These systems use various types of actuators (like motors, conveyors, and robotic arms) to assemble products, sensors (like vision systems and position sensors) for feedback, and a control system to manage the assembly process.

Digital Camera Systems: These systems use electric motors for zoom and focus, various sensors (like image sensors and light sensors) for feedback, and a control system to manage the operation based on user input.

Spacecraft Control Systems: These systems use various types of actuators (like thrusters and reaction wheels) to control the spacecraft, sensors (like star trackers and accelerometers) for feedback, and a control system to manage the mission.

Automated Greenhouse Systems: These systems use various types of actuators (like motors, pumps, and valves) to control the greenhouse conditions, sensors (like temperature sensors and humidity sensors) for feedback, and a control system to manage the conditions based on plant needs.

Robotic Vacuum Cleaners: These systems use electric motors for movement and vacuuming, various sensors (like cameras, bump sensors, and dust sensors) for feedback, and a control system to manage the cleaning.

Train Control Systems: These systems use electric motors for propulsion, various sensors (like speed sensors and door sensors) for feedback, and a control system to manage the operation based on timetable and safety conditions.

Automated Film Processing Machines: These machines use various types of actuators (like motors, pumps, and heaters) to process film, sensors (like timers and temperature sensors) for feedback, and a control system to manage the processing based on the film type.

Automated Painting Machines: These machines use various types of actuators (like motors, pumps, and valves) to paint products, sensors (like vision systems and pressure sensors) for feedback, and a control system to manage the painting process.

Automated Car Wash Systems: These systems use various types of actuators (like motors, pumps, and brushes) to wash cars, sensors (like optical sensors and pressure sensors) for feedback, and a control system to manage the washing process.

Power Plant Control Systems: These systems use various types of actuators (like valves and pumps), sensors (like temperature sensors and pressure sensors) for feedback, and a control system to manage the operation for energy production and safety.

Automated Fish Farming Systems: These systems use various types of actuators (like feeders and pumps), sensors (like water quality sensors and fish weight sensors) for feedback, and a control system to manage the farming based on fish needs and water conditions.

Automated Mining Machines: These machines use various types of actuators (like motors, conveyors, and drills) to mine minerals, sensors (like cameras and position sensors) for feedback, and a control system to manage the mining operation.

Automated Teller Machines (ATMs): These machines use various types of actuators (like motors and switches) to dispense cash and process transactions, sensors (like card readers and keypads) for feedback, and a control system to manage the operation based on user input.

Automated Drilling Systems: These systems use various types of actuators (like motors and valves) to control the drilling operation, sensors (like pressure sensors and position sensors) for feedback, and a control system to manage the drilling based on the plan and safety conditions.

Space Station Control Systems: These systems use various types of actuators (like thrusters and valves), sensors (like cameras, accelerometers, and air quality sensors) for feedback, and a control system to manage the station's operation and safety.

Automated Sterilization Machines: These machines use various types of actuators (like heaters and valves) to sterilize medical instruments, sensors (like temperature sensors and timers) for feedback, and a control system to manage like image sensors and light sensors) for feedback, and a control system to manage the operation based on user input.

Spacecraft Control Systems: These systems use various types of actuators (like thrusters and reaction wheels) to control the spacecraft, sensors (like star trackers and accelerometers) for feedback, and a control system to manage the mission.

Automated Greenhouse Systems: These systems use various types of actuators (like motors, pumps, and valves) to control the greenhouse conditions, sensors (like temperature sensors and humidity sensors) for feedback, and a control system to manage the conditions based on plant needs.

Robotic Vacuum Cleaners: These systems use electric motors for movement and vacuuming, various sensors (like cameras, bump sensors, and dust sensors) for feedback, and a control system to manage the cleaning.

Train Control Systems: These systems use electric motors for propulsion, various sensors (like speed sensors and door sensors) for feedback, and a control system to manage the operation based on timetable and safety conditions.

Automated Film Processing Machines: These machines use various types of actuators (like motors, pumps, and heaters) to process film, sensors (like timers and temperature sensors) for feedback, and a control system to manage the processing based on the film type.

Automated Painting Machines: These machines use various types of actuators (like motors, pumps, and valves) to paint products, sensors (like vision systems and pressure sensors) for feedback, and a control system to manage the painting process.

Automated Car Wash Systems: These systems use various types of actuators (like motors, pumps, and brushes) to wash cars, sensors (like optical sensors and pressure sensors) for feedback, and a control system to manage the washing process.

Power Plant Control Systems: These systems use various types of actuators (like valves and pumps), sensors (like temperature sensors and pressure sensors) for feedback, and a control system to manage the operation for energy production and safety.

Automated Fish Farming Systems: These systems use various types of actuators (like feeders and pumps), sensors (like water quality sensors and fish weight sensors) for feedback, and a control system to manage the farming based on fish needs and water conditions.

Automated Mining Machines: These machines use various types of actuators (like motors, conveyors, and drills) to mine minerals, sensors (like cameras and position sensors) for feedback, and a control system to manage the mining operation.

Automated Teller Machines (ATMs): These machines use various types of actuators (like motors and switches) to dispense cash and process transactions, sensors (like card readers and keypads) for feedback, and a control system to manage the operation based on user input.

Automated Drilling Systems: These systems use various types of actuators (like motors and valves) to control the drilling operation, sensors (like pressure sensors and position sensors) for feedback, and a control system to manage the drilling based on the plan and safety conditions.

Space Station Control Systems: These systems use various types of actuators (like thrusters and valves), sensors (like cameras, accelerometers, and air quality sensors) for feedback, and a control system to manage the station's operation and safety.

Automated Sterilization Machines: These machines use various types of actuators (like heaters and valves) to sterilize medical instruments, sensors (like temperature sensors and timers) for feedback, and a control system to manage Digital Camera Systems: These systems use electric motors for zoom and focus, various sensors (like image sensors and light sensors) for feedback, and a control system to manage the operation based on user input.

Spacecraft Control Systems: These systems use various types of actuators (like thrusters and reaction wheels) to control the spacecraft, sensors (like star trackers and accelerometers) for feedback, and a control system to manage the mission.

Automated Greenhouse Systems: These systems use various types of actuators (like motors, pumps, and valves) to control the greenhouse conditions, sensors (like temperature sensors and humidity sensors) for feedback, and a control system to manage the conditions based on plant needs.

Robotic Vacuum Cleaners: These systems use electric motors for movement and vacuuming, various sensors (like cameras, bump sensors, and dust sensors) for feedback, and a control system to manage the cleaning.

Train Control Systems: These systems use electric motors for propulsion, various sensors (like speed sensors and door sensors) for feedback, and a control system to manage the operation based on timetable and safety conditions.

Automated Film Processing Machines: These machines use various types of actuators (like motors, pumps, and heaters) to process film, sensors (like timers and temperature sensors) for feedback, and a control system to manage the processing based on the film type.

Automated Painting Machines: These machines use various types of actuators (like motors, pumps, and valves) to paint products, sensors (like vision systems and pressure sensors) for feedback, and a control system to manage the painting process.

Automated Car Wash Systems: These systems use various types of actuators (like motors, pumps, and brushes) to wash cars, sensors (like optical sensors and pressure sensors) for feedback, and a control system to manage the washing process.

Power Plant Control Systems: These systems use various types of actuators (like valves and pumps), sensors (like temperature sensors and pressure sensors) for feedback, and a control system to manage the operation for energy production and safety.

Automated Fish Farming Systems: These systems use various types of actuators (like feeders and pumps), sensors (like water quality sensors and fish weight sensors) for feedback, and a control system to manage the farming based on fish needs and water conditions.

Automated Mining Machines: These machines use various types of actuators (like motors, conveyors, and drills) to mine minerals, sensors (like cameras and position sensors) for feedback, and a control system to manage the mining operation.

Automated Teller Machines (ATMs): These machines use various types of actuators (like motors and switches) to dispense cash and process transactions, sensors (like card readers and keypads) for feedback, and a control system to manage the operation based on user input.

Automated Drilling Systems: These systems use various types of actuators (like motors and valves) to control the drilling operation, sensors Wearable Sensors Wearable technology incorporates a variety of sensors to track and monitor different aspects of our health, fitness, and location. Here is a list of some common sensors found in wearable devices:

- Accelerometers: These sensors measure acceleration and can track activities like running speed and sleep patterns. They can also record movements such as gravity and linear acceleration.
- Gyroscopes: Gyroscopes record angular accelerations and can increase the precision of the data tracked. They are often used alongside accelerometers for more precise readings and to filter out errors.
- Magnetometers: These are often combined with accelerometers and gyroscopes to create an inertial measurement unit (IMU). They function like a compass and help improve balance and motion orientation.
- Global Positioning System (GPS): This sensor is used to provide location data. It sends information to a satellite to determine the exact location and time.
- Heart Rate Sensors: These sensors measure heart rate using various techniques such as capacitive sensing and photoplethysmography. Photoplethysmography uses light to track changes in blood flow volume and calculate pulse.
- Pedometers: These sensors count the user's steps while running or walking. Modern pedometers are electronic and rely on MEMS technology, but they still operate on the principles of mechanical pedometers.
- Pressure Sensors: These sensors measure pressure changes and convert them into electronic measurements. They are often used in equipment that needs to monitor contact with a ball, for example.
- Inertial Measurement Units (IMUs): IMUs are common in fitness trackers and collect data about sleep patterns, activity levels, and location. They are one of the most commoditized types of sensors in wearable devices.
- Electrochemical Biosensors: These sensors transform chemical information into analytical information that can lead to diagnoses or treatment developments. They are often used in medical wearable devices to monitor the presence or concentration of certain chemicals in the wearer.
- Wearable Electrodes: These are used to read electric pulses from the heart and can provide constant EEG, EKG, or EMG readings. Some wearable devices with electrodes can also automatically defibrillate if they sense that the pulse has stopped Additional sensors that are common in wearable devices include skin temperature sensors, galvanic skin response sensors, UV sensors, and ambient light sensors.

Structural Optimization

In various engineering fields, the design and construction of structures require optimization of shapes and dimensions to meet specific performance requirements, constraints, and objectives. Conventional optimization methods often rely on manual trial-and-error or deterministic approaches in order to formulate an initial pre-optimization structure that the optimization platform will then optimize, which can be time-consuming and might not always yield optimal results. This applies to both structural systems with and without control systems or local AI.

SUMMARY OF THE INVENTION

Some embodiments of the present invention relate to methods and systems for training and optimizing control systems of electro-mechanical devices using artificial intelligence (AI). Specifically, some embodiments focus on enhancing the performance, efficiency, and adaptability of electro-mechanical devices through a combination of initial training with simulated data and subsequent retraining with real-world data collected during device operation. Some embodiments aim to leverage the strengths of both simulated and real-world data to continuously improve the control systems of such devices, making them more responsive, accurate, and efficient across a variety of operational conditions.

One aspect of some embodiments of the invention includes a method for training a local control system of an electro-mechanical device, where the local control system comprises a trainable AI. The training begins with a simulated data set generated by an AI simulated data generation system, which is located remotely from the local control system. The method proceeds with the device performing a task or a set of tasks under the command of the local control system. During this operational phase, real-life data is collected by one or more sensors integrated into or associated with the device. This real-life data, which includes performance metrics of the control system among other operational data, is then used to retrain the local AI system. Furthermore, this real-life data is also transmitted to the remote AI simulated data generation system to refine its future simulated data sets, thereby creating a feedback loop that continuously enhances the training process.

Another aspect of some embodiments of the invention outlines the use of advanced technologies, including but not limited to extended reality (XR) for training simulations, blockchain for data integrity and sharing, Internet of Things (IoT) connectivity for extensive data collection, and quantum computing for processing AI algorithms and handling data. These technologies contribute to some embodiments' objective of creating a robust, adaptable, and efficient control system for electro-mechanical devices.

Additionally, some embodiments incorporate methods for employing bio-inspired and evolutionary algorithms for AI optimization, adaptive and self-learning systems for real-time learning and adaptation, and human-AI collaboration frameworks to facilitate cooperative decision-making between human operators and AI systems. Some embodiments include environmental and ethical considerations in AI development and cross-domain generalization to enable the application of the AI system across various types of electro-mechanical devices, optionally without extensive retraining.

Considering now a method of some embodiments, a method of training a local control system for controlling an electro-mechanical device. The method also includes training the trainable AI of the local control system for an electro-mechanical device with a simulated data set generated by the AI simulated data generation system. The method also includes performing a task with the device as controlled by the local control system. The method also includes during the step of performing a task, collecting real-life data with one or more sensors from the device as the local control system controls the device. The method also includes retraining the local AI system with the real-life data. The method also includes retraining the AI simulated data generation system on the real life data to improve performance of the AI simulated data generation system in generating simulated data sets. The method also includes where the local AI system is trained initially on a simulated data set and then subsequently retrained iteratively over time with real-world data, and the AI simulated data generation system that is located remotely to the local control system is also retrained with the real-world data to improve simulated data sets the AI simulated data generation system generates.

Other embodiments of this aspect include corresponding computer systems, apparatus, and computer programs recorded on one or more computer storage devices, each configured to perform the actions of the methods.

Implementations may include one or more of the following features, either alone or in various combinations of other such features as desired. A method as described where electro-mechanical device is a surgical robot, and the local control system controls the surgical robot, and at least one sensor gathers the real-world data during surgery. The local trainable AI of the surgical robot is trained on the real-world data which is collected from a unique local patient population over time, such that the surgical robot is customized to serve the unique local patient population. The surgical robot is trained to remove at least one kidney, the real-world data being collected during kidney-removal surgery.

A method as described further relating to making social interaction suggestions to a user wearing an earpiece having a speaker and microphone and having a trainable local AI system that is trained with simulated data, the method may include the steps of: listening to a conversation in which the user is engaged; making ai-generated suggestions from the local AI system to the user about the conversation in real-time during the conversation via the earpiece speaker; gathering real-world data about the conversation during the conversation; and using the real-world data to retrain the local AI system to improve local conversational performance and to retrain the AI simulated data generation system to improve simulated data sets about conversation.

The device may include an actuation system controlled by a controller with trainable AI. The simulated data set is provided to multiple devices and the local device retrains on the real world data that is generated locally, thereby customizing the local device to specific local real-world conditions. The device may be used in, as just one specific example, construction. The tool may be a power saw and the real-life data may include data gathered from the power saw during sawing.

The electro-mechanical device may be a veterinarian device. The electro-mechanical device may include an irrigation system for growing plants, crops, and/or trees.

Machine vision, as one option, may provide at least some of the real-world data.

There may be a plurality of electro-mechanical devices, at least some of them in communication with others of them, each with its own local AI system and own local real-world data. In this embodiment, at least one of the plurality of devices retrains at least in part its local AI system with real-world data from at least one of the other plurality of electro-mechanical devices.

The method as claimed may include generating a conversational agent that communicates with a user in a human-like manner to discuss at least one of the local device, the local AI system, the system for generating simulated data, the retraining steps, the simulated data, the real-world data, collection of the real-world data, and any devices with which the local device communicates. The simulated data set generated by the AI simulated data generation system may include a variety of scenarios and conditions to train the local trainable AI different operating conditions of the electro-mechanical device.

The real-life data collected during the step of performing a task may include sensor data related to the performance, operation, or behavior of the electro-mechanical device. Retraining of the local AI system with the real-life data further may include adjusting weights, parameters, and/or algorithms of the local trainable AI based on collected real-life data. Retraining of the AI simulated data generation system on the real-life data may include updating the simulation models, algorithms, and/or parameters of the AI simulated data generation system to better reflect the behavior and characteristics of the electro-mechanical device in real-world scenarios.

The AI simulated data generation system may generate simulated data sets by incorporating feedback or input from the local control system or the local trainable AI to improve the accuracy and relevance of the simulated data. The retraining of the local AI system and the AI simulated data generation system is performed periodically or in response to specific events or triggers, such as changes in the operating conditions of the electro-mechanical device or the availability of new real-world data.

The local control system further may include a data storage and retrieval system that stores and organizes the simulated data sets generated by the AI simulated data generation system and the real-life data collected during the step of performing a task for future reference and analysis. The retraining of the local AI system employs federated learning techniques, allowing for the local AI system to learn from decentralized data collected across multiple devices without transferring the data itself.

The method may include employing reinforcement learning techniques for the local AI system. The local AI system incorporates explainable AI techniques, where decision-making processes are transparent. The AI simulated data generation system utilizes generative adversarial networks (gans). The method may include integrating neurosymbolic AI into the local AI system.

The method may include processing the real-life data and performing retraining of the local AI system using edge computing principles. The training and retraining processes of the local AI system or the AI simulated data generation system incorporate quantum machine learning techniques. The local AI system may adapt to new data or situations in real-time.

The method may include utilizing extended reality (xr) technologies including virtual reality (vr), augmented reality (ar), and mixed reality (mr) for training the local AI system in simulated environments that mimic real-world conditions of the electro-mechanical device operation. The collection, storage, and sharing of real-life data and training datasets for the local AI system are secured using blockchain technology.

The method may include integrating internet of things (iot) connectivity to extend collection of real-life data across a network of interconnected devices. The method further incorporating the use of 5g or beyond wireless technologies to facilitate data transmission between the electro-mechanical device and the local AI system. Quantum computing is employed for processing AI algorithms and/or managing data.

The local AI system may be integrated within a human-AI collaboration framework, allowing collaborative learning and decision-making between human operators and the AI system. The method may be further characterized by implementing environmental considerations into the AI system's design. The method may incorporate ethical guidelines in AI-driven control processes.

The local AI system may be designed for cross-domain generalization.

One specific embodiment relates to Microelectromechanical Systems (MEMS) in which inventive concepts herein apply to a microsystem.

The electro-mechanical device may include a control system, and at least a portion of the real-world data collected during the step of performing a task relates to at least one of performance, efficiency, and operational metrics of the control system.

Another embodiment relates to a method of training a local control system for controlling an electro-mechanical device. The method also includes training the trainable AI of the local control system for an electro-mechanical device with a simulated data set generated by the AI simulated data generation system. The method also includes performing a task with the device as controlled by the local control system. The method also includes during the step of performing a task, collecting real-life data with one or more sensors from the device as the local control system controls the device. The method also includes retraining the local AI system with the real-life data. The method also includes providing real life data to the AI simulated data generation system and improving performance of the AI simulated data generation system in generating simulated data sets through one or more of data assimilation, model refinement, feedback loops, generative model retraining, incorporation of real-world variability, domain expert involvement, benchmarking and validation, and adaptive simulations. The method also includes where the local AI system is trained initially on a simulated data set and then subsequently retrained iteratively over time with real-world data, and the AI simulated data generation system that is located remotely to the local control system is also provided with the real-world data to improve simulated data sets the AI simulated data generation system generates.

Embodiments of a related invention pertaining to structural optimization may be included. One general aspect includes a method for optimizing the design of a simulated structure using an artificial intelligence (aI) system that has been trained with real-world data obtained from real-world physical structures built according to optimal designs optimized in simulated space. The method also includes first, initiating a structural optimization with an initial simulated structural design that an aI system generated. The method also includes after the step of initiating a structural optimization, utilizing a structural optimization system to optimize thea structure from the initial simulated structural design to reach an optimal simulated structural design that maximizes or minimizes a property subject to at least one constraint. The method also includes after the step of utilizing a structural optimization system to optimize the structure, constructing a physical structure that is a physical version of the optimal simulated structural design. The method also includes after the step of constructing a physical structure, collecting real-world data about the physical structure including at least one of deflection, stress, strain, buckling, fatigue, manufacturability, cost, and natural frequency from the physical structure under real-world use conditions. The method also includes after the step of collecting real-world data, retraining the aI system with the collected real world data to make a retrained aI system in order to reduce differences between optimal structural designs determined in simulated space and corresponding optimal real world structural designs. The method also includes after the step of retraining the aI system with the collected real-world data, initiating a second structural optimization on a different, second structure with a second simulated structural design that the retrained aI system generated. Other embodiments of this aspect include corresponding computer systems, apparatus, and computer programs recorded on one or more computer storage devices, each configured to perform the actions of the methods.

Implementations may include one or more of the following features. The method where the method further may include 3d printing the physical structure. The physical structure is a scale model of the optimal simulated structural design. The step of collecting real-world data from the physical structure under real-world use conditions further may include communicating the real-world data collected from the physical structure via the internet. The step of constructing a physical structure based on the optimal structural design includes incorporating into or attaching to the real-world structure an rfid tag onto each of a plurality of structural members. The structure is an antenna for tracking animals. The structure is a hand tool used while constructing a building. The structure is a trailer for transporting a vehicle. During the optimization process, the structure is modeled with finite element analysis using one or more standard finite elements. The optimization minimizes structural weight, subject to constraints may include at least one of stress, buckling, deflection, natural frequency, thermal considerations, fluid considerations, balance, leverage and/or other constraints known to be used in structural optimization. The method further may include a blockchain transaction. The aI system may include generative design artificial intelligence. Implementations of the described techniques may include hardware, a method or process, or computer software on a computer-accessible medium.

One general aspect includes a method for optimizing an engineering design using a generative design artificial intelligence (ai) system that improves itself over time to reduce differences between optimal designs in simulated space and optimal real-world designs. The method also includes first, utilizing a generative design artificial intelligence (aI) system to propose an initial simulated engineering design. The method also includes after the step of proposing an initial simulated design, employing a design optimization system to optimize the initial simulated engineering design, the optimization being an iterative process that uses computational modeling to reach an optimal simulated design that maximizes or minimizes a property subject to at least one constraint. The method also includes after the step of optimizing the initial simulated engineering design, constructing a physical object based on the optimal simulated design. The method also includes after the step of constructing a physical object, collecting real-world data about performance of the physical object from the physical object under real-world use conditions. The method also includes retraining the generative design al system using the collected real-world data about performance of the physical object to make a retrained generative design aI system. The method also includes after the step of retraining the generative aI design system with the collected real-world data about performance of the physical object in order to reduce differences between optimal designs that are determined in simulated space and corresponding optimal real world designs, initiating an optimization on a different, second design with a second initial simulated design that the retrained generative al design system generated. Other embodiments of this aspect include corresponding computer systems, apparatus, and computer programs recorded on one or more computer storage devices, each configured to perform the actions of the methods.

One general aspect includes a method of engineering design of a structure. The method also includes first, initiating a structural design optimization with an initial simulated structural design proposed by an aI system. The method also includes after the step of initiating a structural design optimization, optimizing the initial simulated structural design with an iterative numerical structural design optimization system to attain an optimal simulated structural design. The method also includes after the step of optimizing the initial simulated structural optimization, constructing a physical structure based on the optimal simulated structural design. The method also includes after the step of constructing a physical structure, collecting real-world data from the physical structure. The method also includes retraining the al system with the real-world data in order to reduce differences between optimal structural designs determined in simulated space and corresponding real-world optimal structural designs. The method also includes having a conversation with a transformer al model about at least one of the initial simulated structural design, the optimal simulated structural design, and the [real-world] physical structure, and the real-world data collected from the physical structure. Other embodiments of this aspect include corresponding computer systems, apparatus, and computer programs recorded on one or more computer storage devices, each configured to perform the actions of the methods.

One general aspect includes a method of engineering design of a structure. The method also includes optimizing an initial simulated structural design with an iterative numerical structural design optimization system to attain an optimal simulated structural design in simulated space. The method also includes constructing a physical structure based on the optimal simulated structural design. The method also includes collecting real-world data from the physical structure including at least one of deflection, stress, strain, buckling, fatigue, and natural frequency. The method also includes retraining the al system with the real-world data in order to reduce differences between optimal structural designs determined in simulated space and corresponding real-world optimal structural designs. Other embodiments of this aspect include corresponding computer systems, apparatus, and computer programs recorded on one or more computer storage devices, each configured to perform the actions of the methods.

Implementations may include one or more of the following features. The method further including the step of having a conversation with a transformer aI model about at least one of the optimal simulated structural design, the physical structure, the real-world data collected from the physical structure, and alternative structural designs. The step of retraining the al system may include retraining the ai system for a particular set of real-world circumstances, and where the ai system is trained over time on other particular sets of real-world circumstances, such that differences between optimal designs in simulated space and real-world optimized designs can be tailored to specific real-world circumstances. The initial simulated structural design is at least partially ai generated.

Implementations of the described techniques may optionally include hardware, a method or process, or computer software on a computer-accessible medium.

It is to be understood that many examples of electro-mechanical devices, sensors, control systems, actuators, and the like are presented in this patent application. The invention primarily relates to general approaches. Consequently, various combinations of devices, systems, actuators, controllers, sensors, particular types of AI, and such may be made within the scope of the invention.

That is, the specific combinations identified in this Summary, for example, are simply examples. Other sections herein describe a large number of different devices, systems, actuators, types of AI, and such, with a great many features, configurations, and options too numerous to list in this Summary. Features, configurations, and options may be mixed and matched in different embodiments, all within the scope of the invention. As just one example, one system may use one type of sensor to gather real-life data. The same system may be modified to use a different type of sensor, or an additional sensor, and still fall within the scope of the invention. By analogy, the same is true of different combinations of actuators, controllers, specific electro-mechanical devices, systems, applications and such. Thus, the invention is not limited to specific combinations of electro-mechanical devices, sensors, control systems, actuators, specific types of AI, or the like, unless so stated.

More generally, it should be understood that the features and embodiments described herein are not mutually exclusive and can be combined in various configurations. The scope of the invention is not restricted to the specific combinations of elements disclosed but extends to any innovative combination of the features detailed within this application, as would be apparent to those skilled in the art. Also, with reference to FIGS. 1 and 2, discussed further below, embodiments may include approaches in which a local electro-mechanical device or system is given an initial simulated data set, then local AI is retained on real-world data it receives over time, but doesn't necessarily send the real-world data back to an AI simulated data generator for improvement.

DETAILED DESCRIPTION OF THE INVENTION

Figure 1:
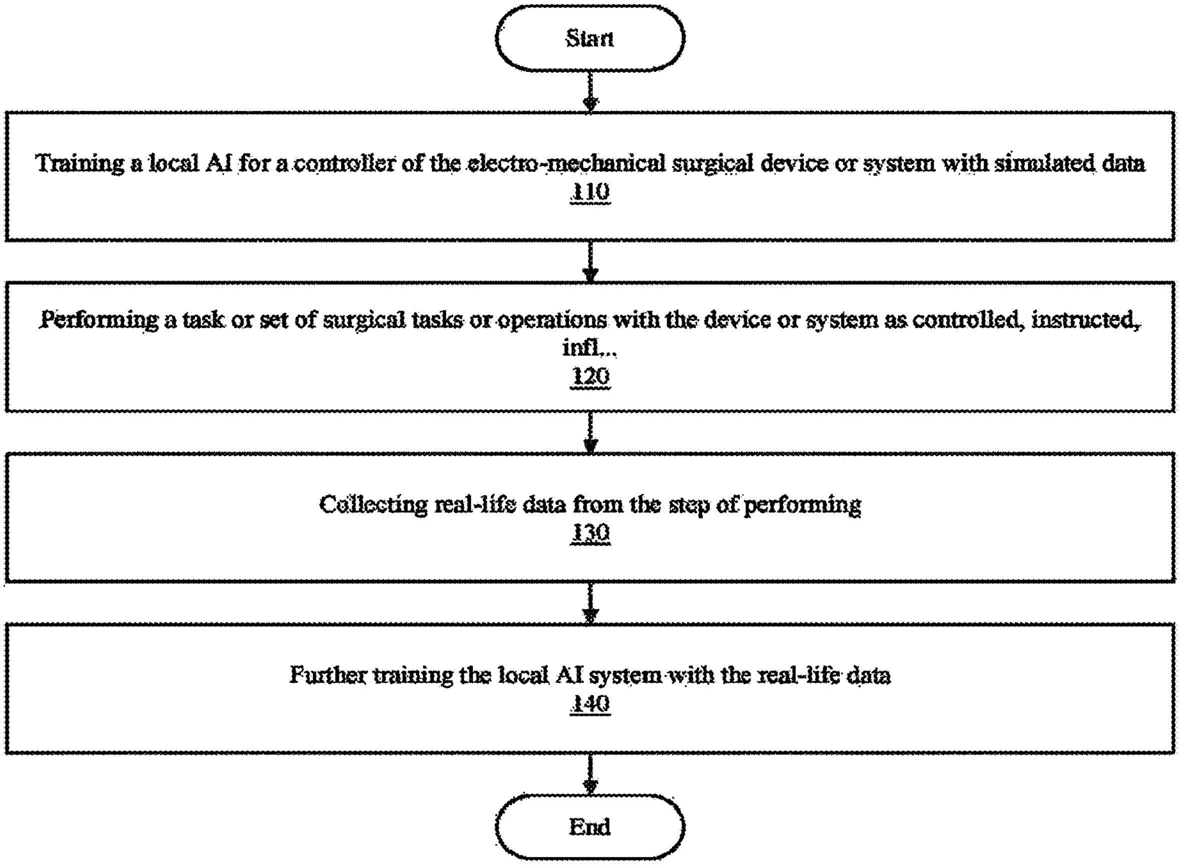
FIG. 1 is a flowchart illustrating a method embodiment of training an electro-mechanical surgical device or system, according to some embodiments of the present disclosure.

FIG. 1 is a flowchart that describes a method of training an electro-mechanical surgical device or system, according to some embodiments of the present disclosure. In some embodiments, at 110, the method may include training a local AI for a controller of the electro-mechanical surgical device or system with simulated data. At 120, the method may include performing a task or set of surgical tasks or operations with the device or system as controlled, instructed, influenced, or the like by the controller having the local AI system. At 130, the method may include collecting real-life data from the step of performing. At 140, the method may include further training the local AI system with the real-life data. Local trainable AI.

Figure 2:
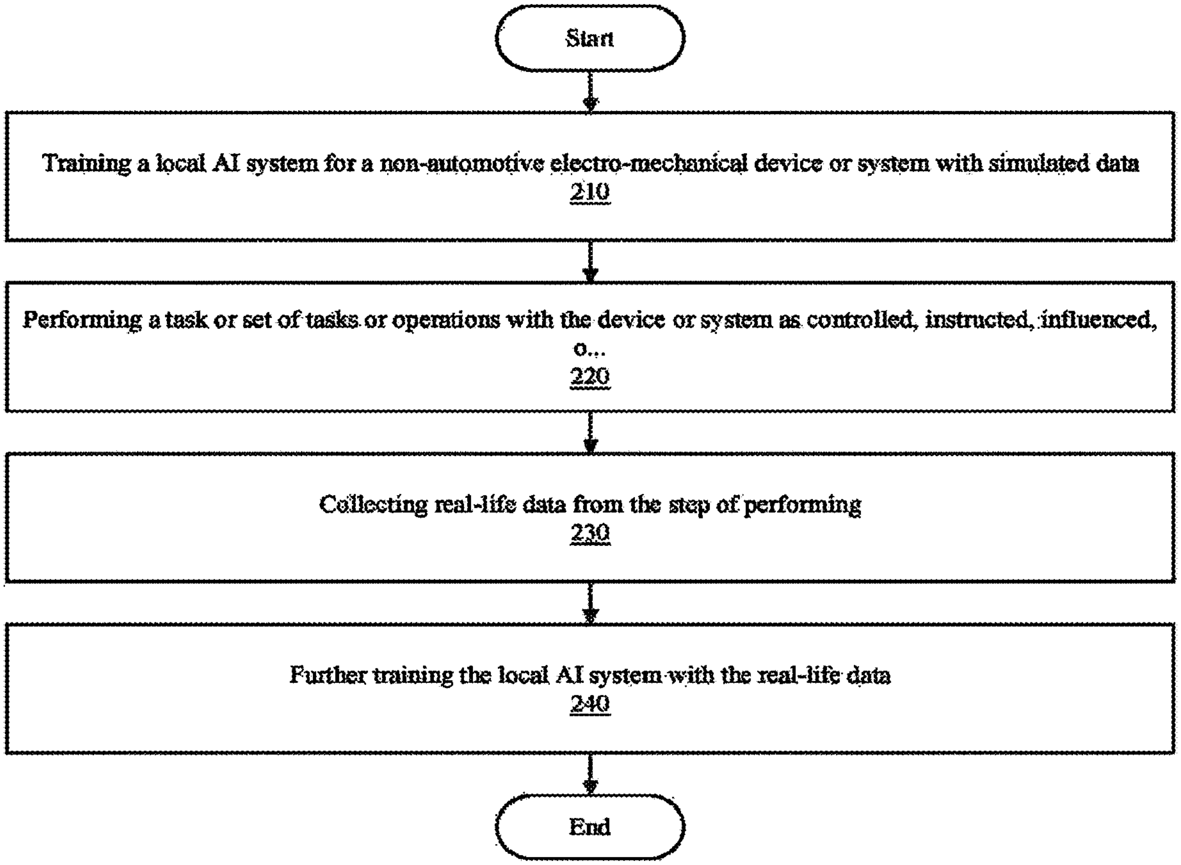
FIG. 2 is a flowchart illustrating a method embodiment of training a device or system, according to some embodiments of the present disclosure.

FIG. 2 is a flowchart that describes a method of training a device or system, according to some embodiments of the present disclosure. In some embodiments, at 210, the method may include training a local AI system for a non-automotive electro-mechanical device or system with simulated data. At 220, the method may include performing a task or set of tasks or operations with the device or system as controlled, instructed, influenced, or the like by the local AI system. At 230, the method may include collecting real-life data from the step of performing. At 240, the method may include further training the local AI system with the real-life data. Trainable AI.

In some embodiments, the local AI system may relate to parking automobiles in a parking garages. Devices/items in a bathroom. Laundry systems, including adapting laundry equipment to particular users, types of clothing, and such. AI to manage physical money in a store or other setting. Controlling devices or collections of devices or other electro-mechanical systems typically found in a doctor's office, hospital, operating room, and/or psychiatric facility. In game arcades, in prisons, classrooms, stadiums, school busses, gyms, dentist's offices, boating or shipping docks, coffee shops, bridges, construction sites, cafeterias, museums, car washes, digital advertising boards and billboards. In some embodiments, the AI may be trained initially on simulated data and further trained over time with the real-world data, and the real-world data may be also provided to a system that generates the simulated data set to improve future simulated data sets.

Figure 3:
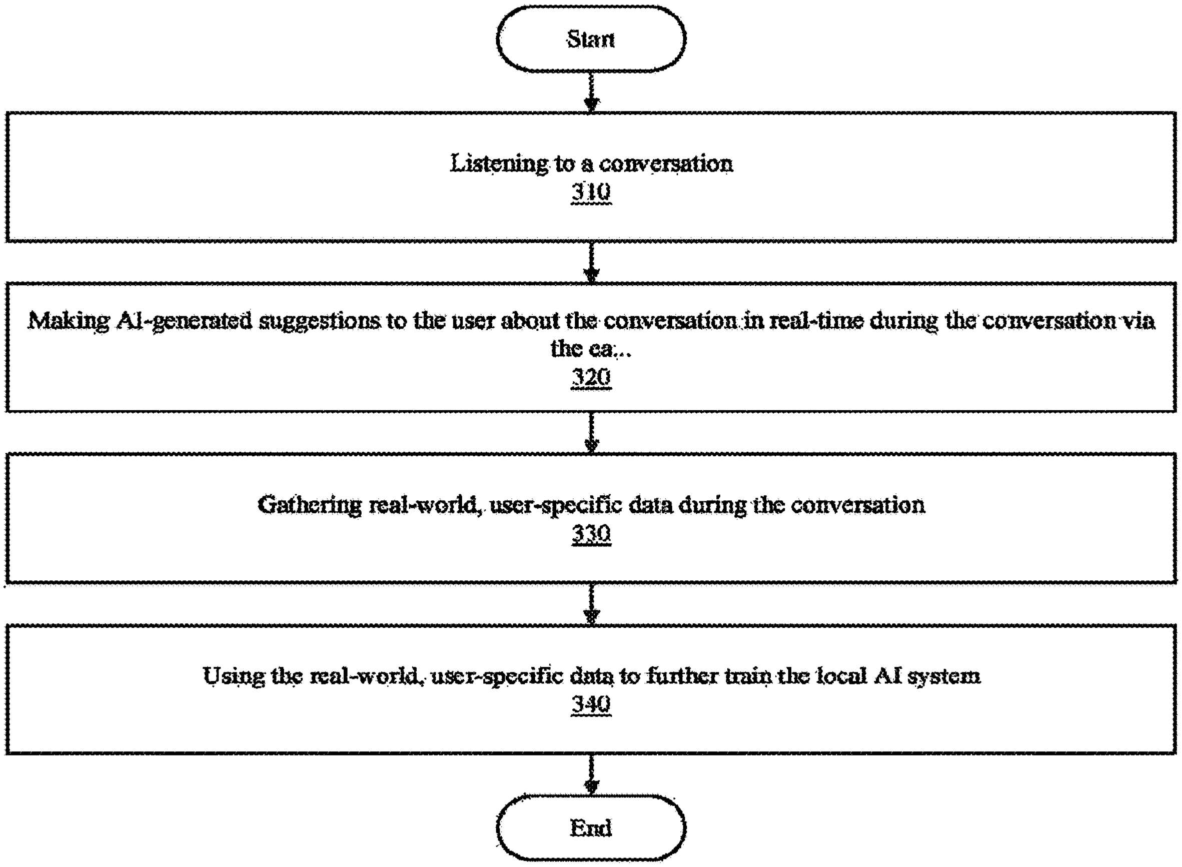
FIG. 3 is a flowchart illustrating a method embodiment of making social interaction suggestions to a user, according to some embodiments of the present disclosure.

FIG. 3 is a flowchart that describes a method of making social interaction suggestions to a user, according to some embodiments of the present disclosure. In some embodiments, at 310, the method may include listening to a conversation. At 320, the method may include making AI-generated suggestions to the user about the conversation in real-time during the conversation via the earpiece speaker. At 330, the method may include gathering real-world, user-specific data during the conversation. At 340, the method may include using the real-world, user-specific data to further train the local AI system.

Figure 4:
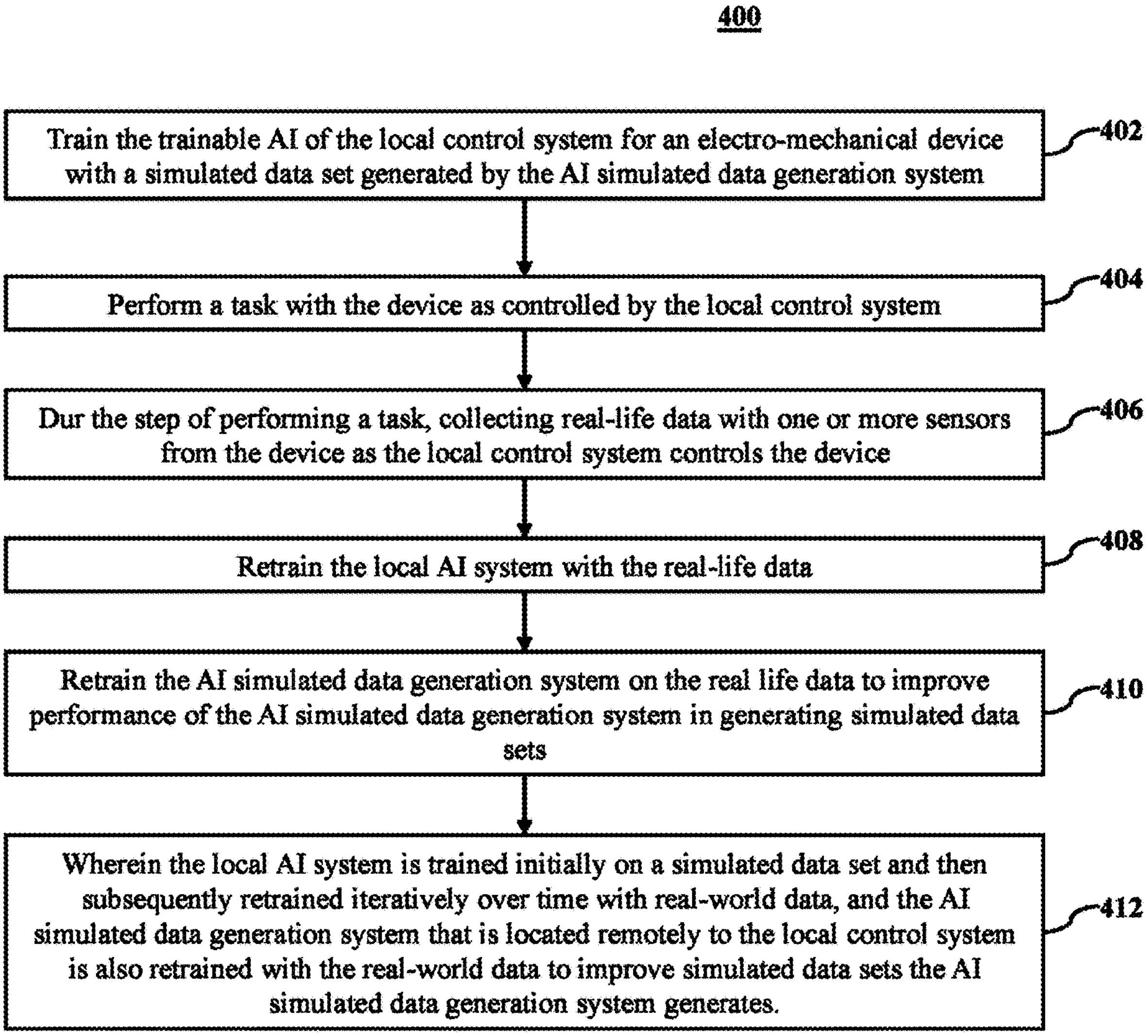
FIG. 4 is a flowchart illustrating a method embodiment according to an embodiment of the invention.

FIG. 4 is a flowchart that describes a method of using real-world data to improve both local AI and systems for generating synthetic AI data sets. Reference numeral step 402 relates to training AI of the local control system. At step 404, a task is performed with the device. At step 406, real-life data is collected with one or more sensors. At step 408, the local AI system is retrained with the real-life data. At step 410, the AI simulated data generation system is retrained (or otherwise provided) with the real life data for the purpose of improving subsequent simulated data sets. Step 412 explains a "wherein" summary of one intention of this embodiment of FIG. 4.

Figure 5:
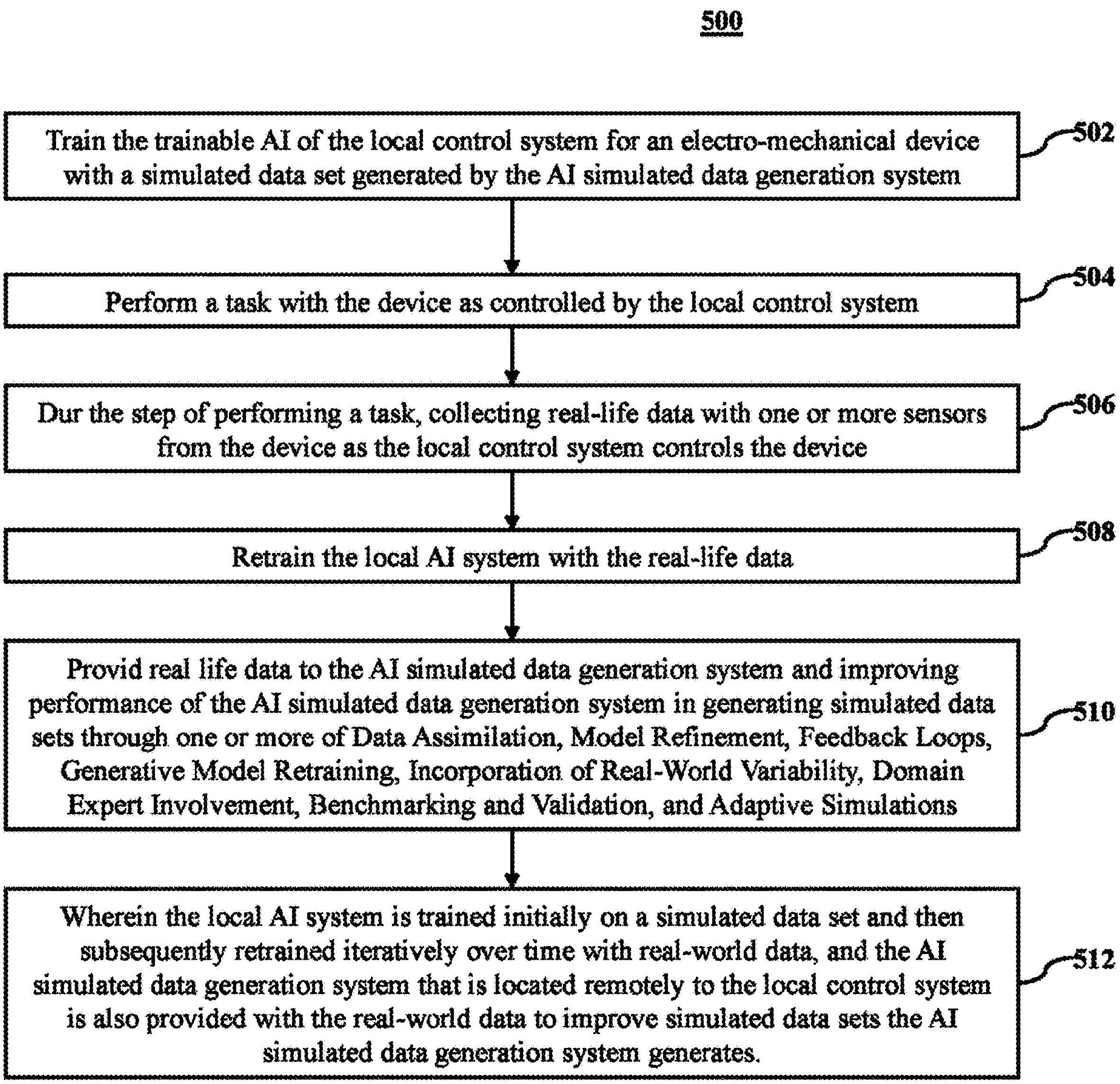
FIG. 5 is a flowchart illustrating a method embodiment according to an embodiment of the invention.
Figure 6:
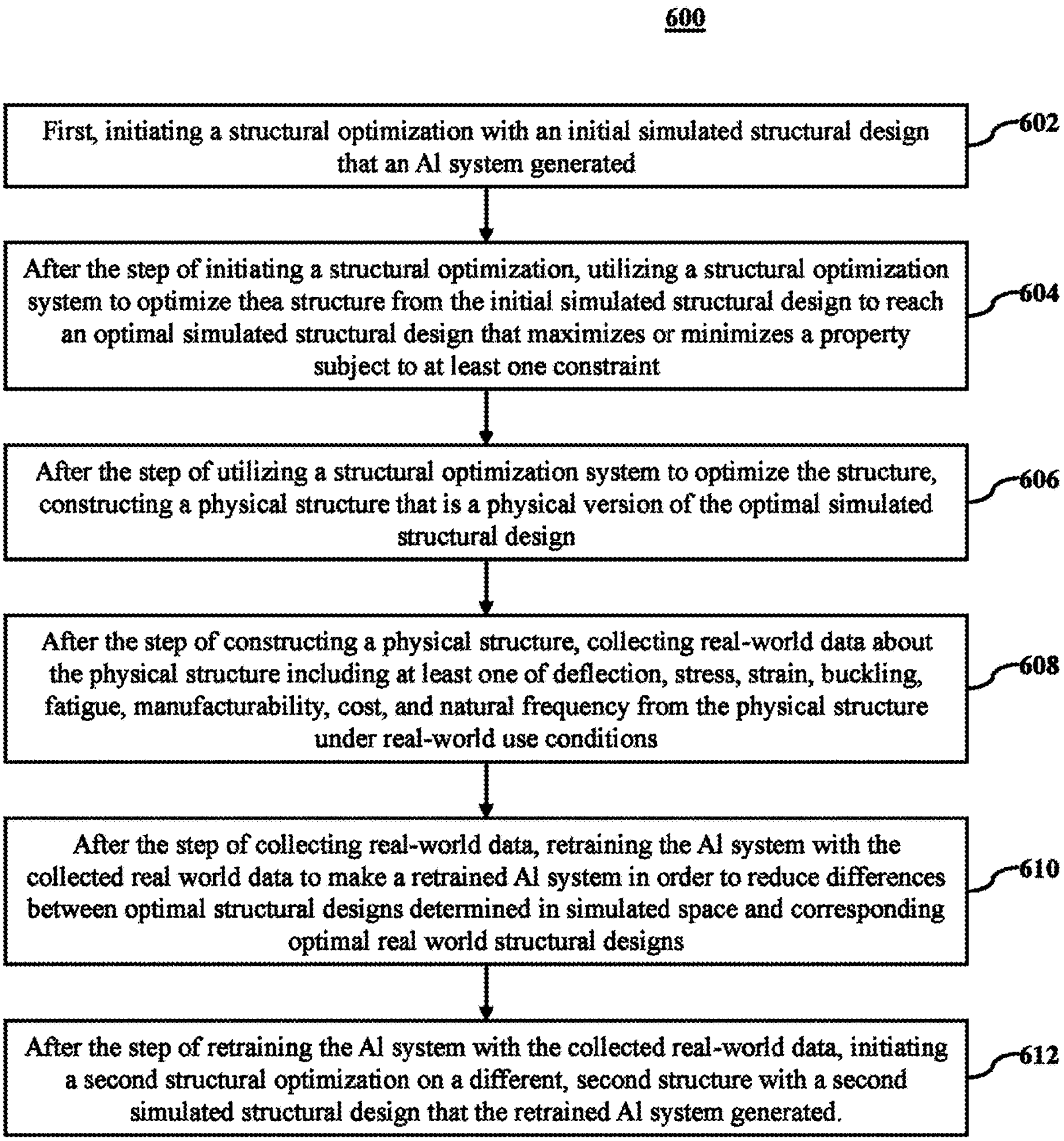
FIG. 6 is a flowchart illustrating a method embodiment according to an embodiment of the invention.
Figure 7:
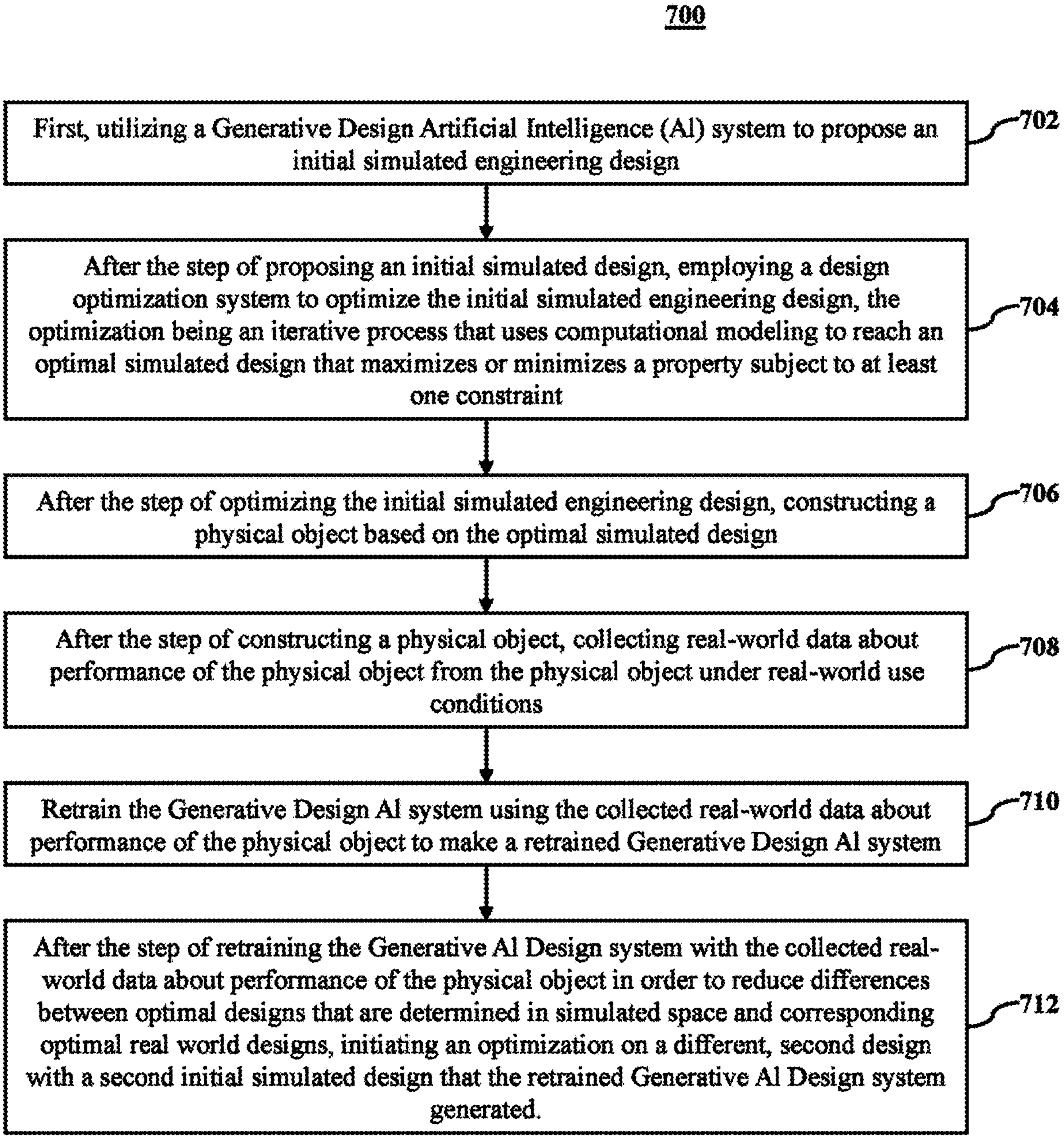
FIG. 7 is a flowchart illustrating a method embodiment according to an embodiment of the invention.
Figure 8:
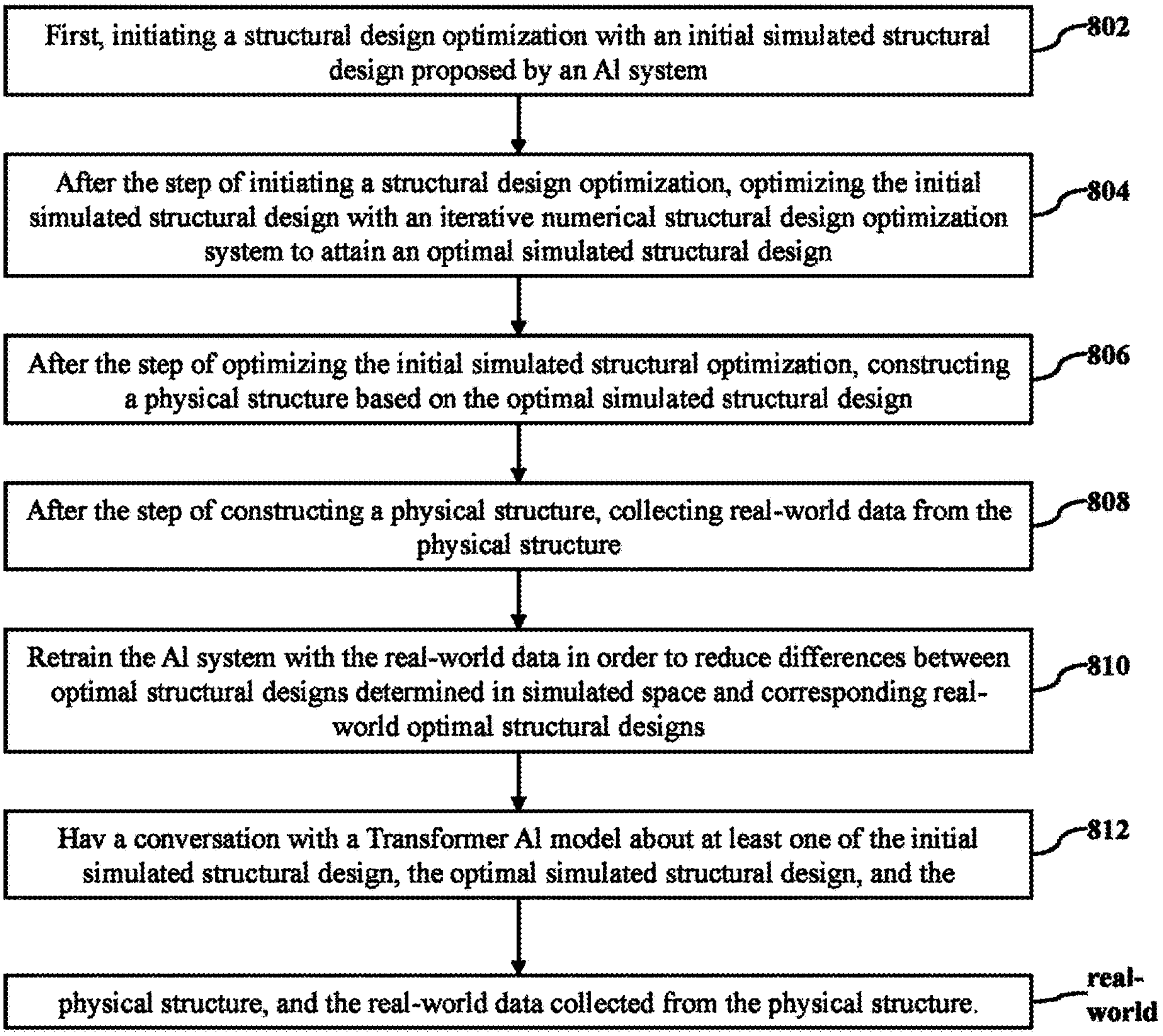
FIG. 8 is a flowchart illustrating a method embodiment according to an embodiment of the invention.
Figure 9:
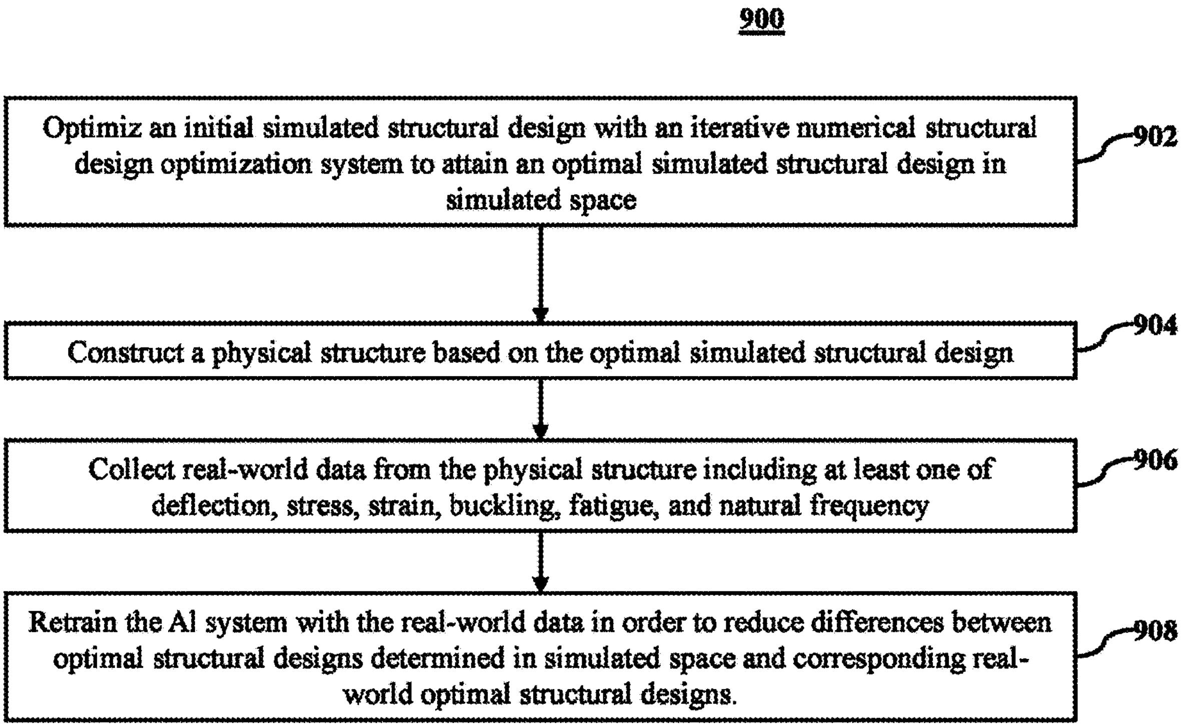
FIG. 9 is a flowchart illustrating a method embodiment according to an embodiment of the invention.

FIG. 5 is a flowchart illustrating another method as an embodiment of the present invention. At step 502, the trainable AI of the local control system is trained on simulated data. At step 504, a task is performed by the device. At step 506, during the step of performing a task, real-life data is collected. At step 508, the local AI system is retrained with real-life data. At step 510, real-life data is provided to the AI simulated data generation system to improve the AI simulated data generation system. At step 512, a summary of some aspects of the claim is presented.

FIGS. 6-9 illustrate example methods according to the present invention.

Figure 10:
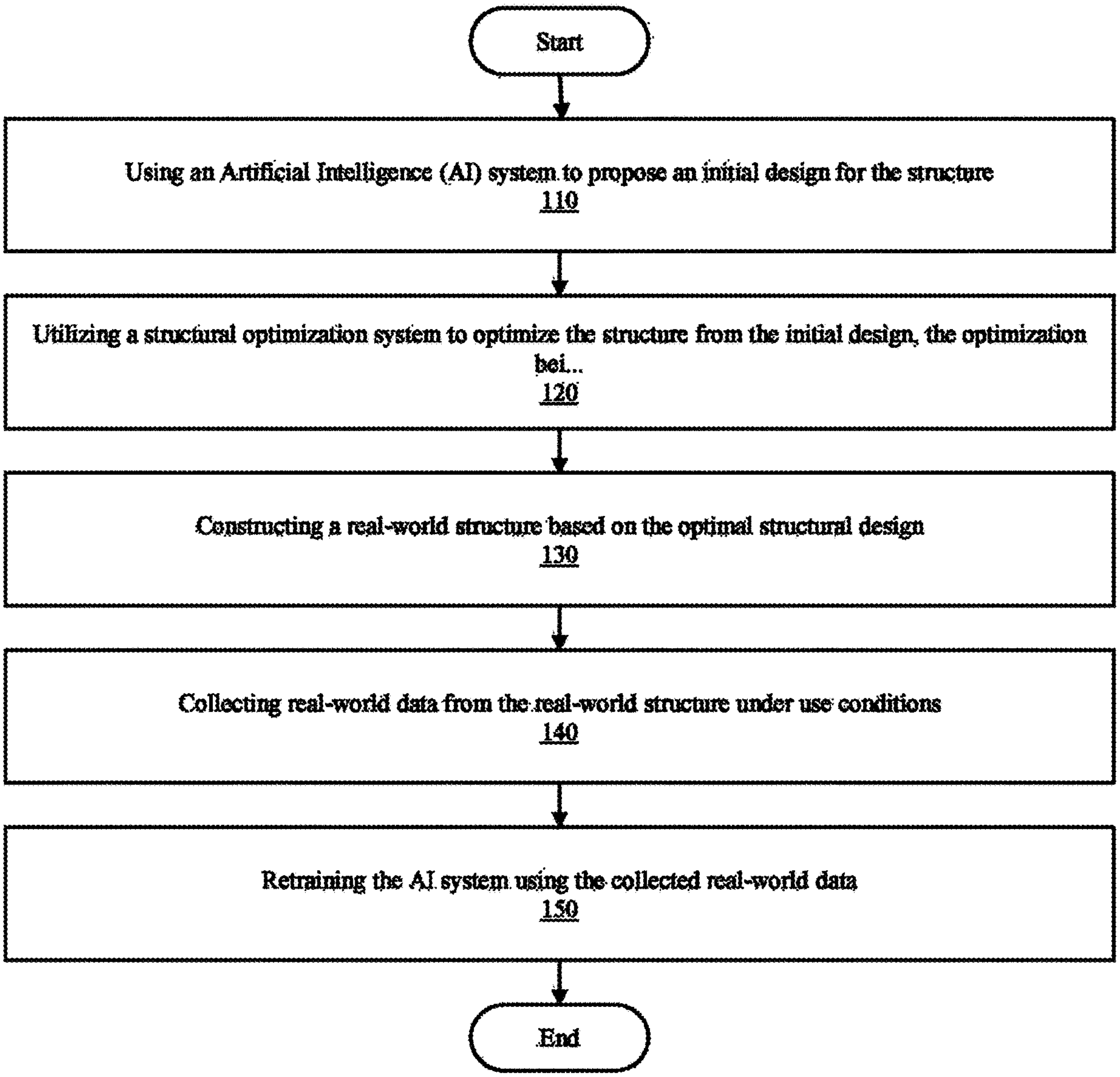
FIG. 10 is a flowchart illustrating a method embodiment according to an embodiment of the invention.

FIG. 10 is a flowchart that describes a method for optimizing the design of a structure, according to some embodiments of the present disclosure. In some embodiments, at 110, the method may include using an Artificial Intelligence (AI) system to propose an initial design for the structure. At 120, the method may include utilizing a structural optimization system to optimize the structure from the initial design, the optimization being an iterative process to reach an optimal structural design that maximizes or minimizes a property subject to at least one constraint. At 130, the method may include constructing a real-world structure based on the optimal structural design. At 140, the method may include collecting real-world data from the real-world structure under use conditions. At 150, the method may include retraining the AI system using the collected real-world data. [00110] In some embodiments, the structure may be at least a component of a biomedical device. In some embodiments, the structure may be at least a component of a cardiac device. In some embodiments, the method may include implanting the biomedical device into a human or animal body. In some embodiments, 3D printing the real-world structure. In some embodiments, the real-world structure may be a scale model of the optimal structural design.

In some embodiments, the real-world structure may be a component of an Internet of Things (IOT) device. In some embodiments, the step of collecting real-world data from the real-world structure under use conditions further comprises communicating real-world data via the internet. In some embodiments, the step of constructing a real-world structure based on the optimal structural design may include incorporating into or attaching to the real-world structure at least one RFID tag.

In some embodiments, the structure may be a civil structure. In some embodiments, the structure may be an antenna for tracking animals. In some embodiments, the structure may be a hand tool used while constructing a building. In some embodiments, the structure may be a trailer for transporting a vehicle. In some embodiments, during the optimization process, the structure may be modeled with Finite Element Analysis using one or more standard finite elements.

In some embodiments, the standard finite elements may include truss, plate, solid, shell, or other standard finite elements. In some embodiments, the optimization may minimize structural weight, subject to constraints comprising at least one of stress, buckling, deflection, natural frequency, thermal considerations, fluid considerations, balance, leverage and/or other constraints known to be used in structural optimization. In some embodiments, the optimization may be topology optimization. In some embodiments, the real-world structure may include one or more RFID tags. In some embodiments, the real-world structure may be an Internet of Things (IoT) device. In some embodiments, the AI system may comprise Generative Design Artificial Intelligence.

Figure 11:
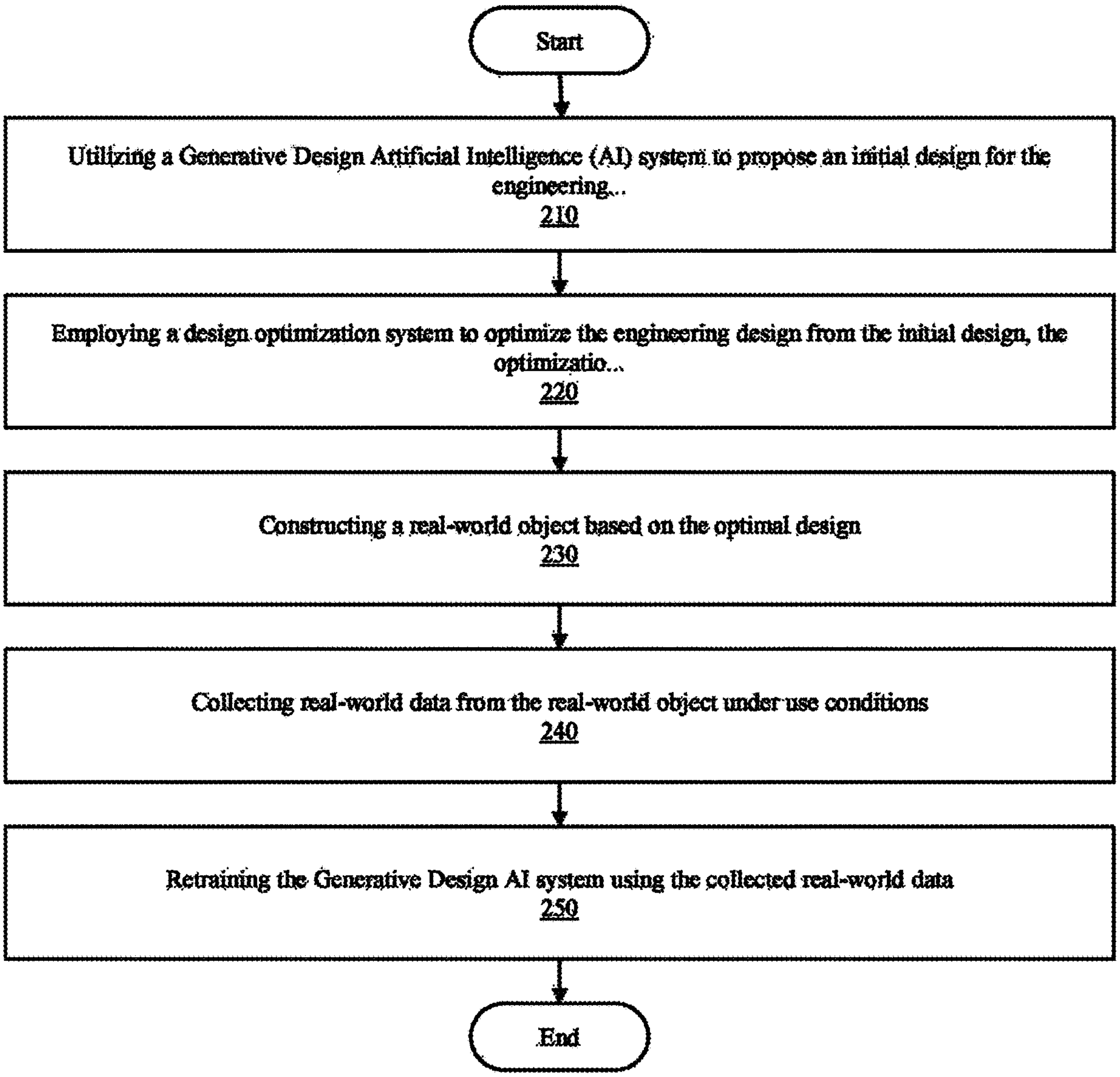
FIG. 11 is a flowchart illustrating a method embodiment according to an embodiment of the invention.

FIG. 11 is a flowchart that describes a method for optimizing an engineering design, according to some embodiments of the present disclosure. In some embodiments, at 210, the method may include utilizing a Generative Design Artificial Intelligence (AI) system to propose an initial design for the engineering design. At 220, the method may include employing a design optimization system to optimize the engineering design from the initial design, the optimization being an iterative process that uses computational modeling to reach an optimal design that maximizes or minimizes a property subject to at least one constraint. At 230, the method may include constructing a real-world object based on the optimal design. At 240, the method may include collecting real-world data from the real-world object under use conditions. At 250, the method may include retraining the Generative Design AI system using the collected real-world data.

In some embodiments, the method may include optimizing the shape of a structure. In some embodiments, the engineering design may be for a component of a civil infrastructure structure. In some embodiments, the engineering design may be for a structural component of a mechanical system. In some embodiments, the engineering design may be for an electronic device. In some embodiments, the optimization may minimize resource usage, subject to constraints on system performance, robustness, resilience and/or other constraints known to be used in engineering design optimization.

In some embodiments, the real-world object may include one or more sensors for collecting real-world data. In some embodiments, the real-world object may be an Internet of Things (IoT) device. The method may include transmitting the real-world data via the Internet. In some embodiments, the method may include optimizing a performance characteristic of a replacement heart valve. In some embodiments, the step of training the generative AI on the collected real-life data further comprises training the generative AI such that the model may be trained for one or more specific users, use cases, or locales.

Figure 12:
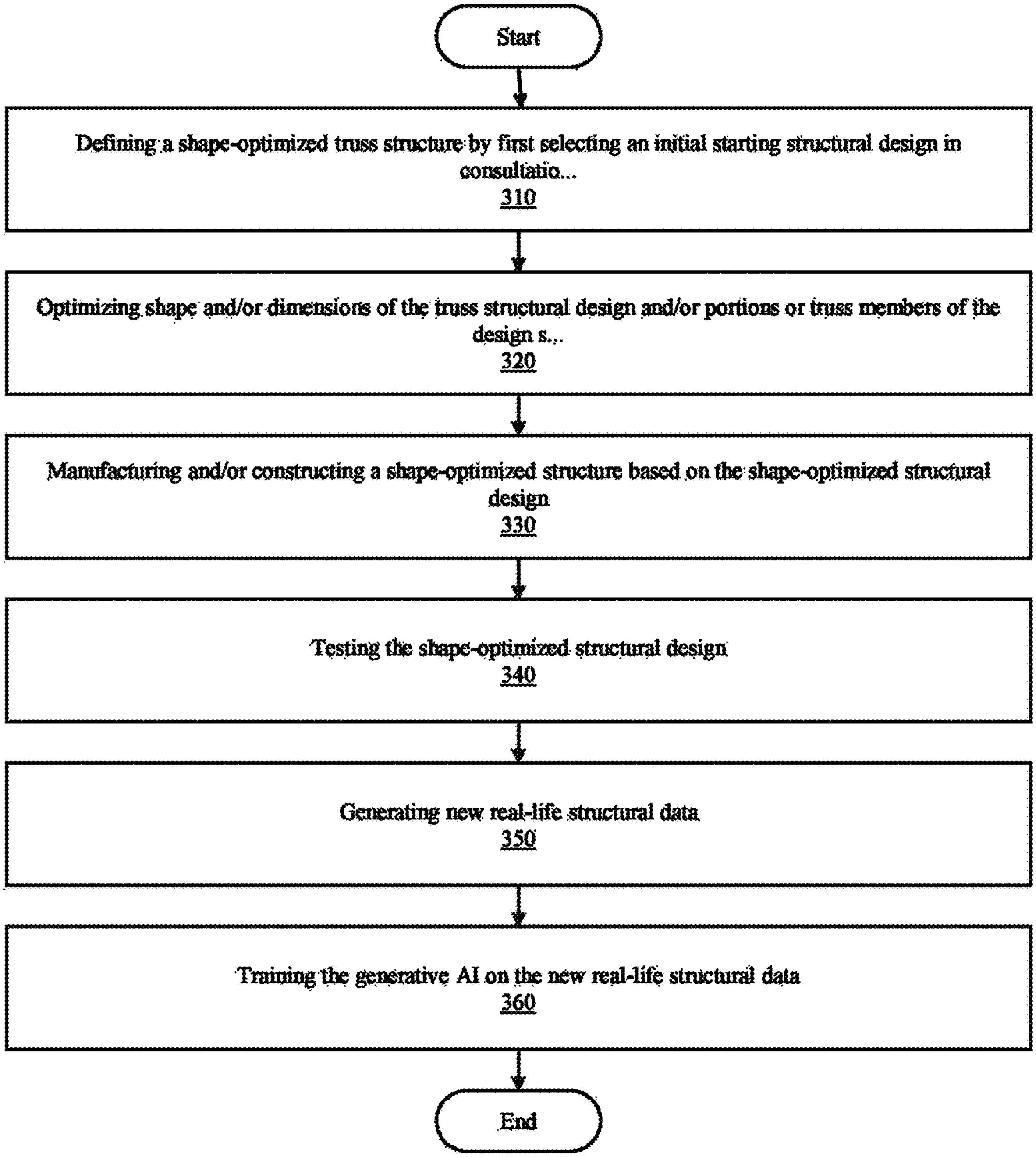
FIG. 12 is a flowchart illustrating a method embodiment according to an embodiment of the invention.

FIG. 12 is a flowchart that describes a method of constructing a shape-optimized truss structure, according to some embodiments of the present disclosure. In some embodiments, at 310, the method may include defining a shape-optimized truss structure by first selecting an initial starting structural design in consultation with generative artificial intelligence. At 320, the method may include optimizing shape and/or dimensions of the truss structural design and/or portions or truss members of the design subject to pre-defined constraints using a numerical structural design optimization technique to create a shape-optimized structural design. At 330, the method may include manufacturing and/or constructing a shape-optimized structure based on the shape-optimized structural design. At 340, the method may include testing the shape-optimized structural design. At 350, the method may include generating new real-life structural data. At 360, the method may include training the generative AI on the new real-life structural data. The method may include the steps 310 to 360.

Figure 13:
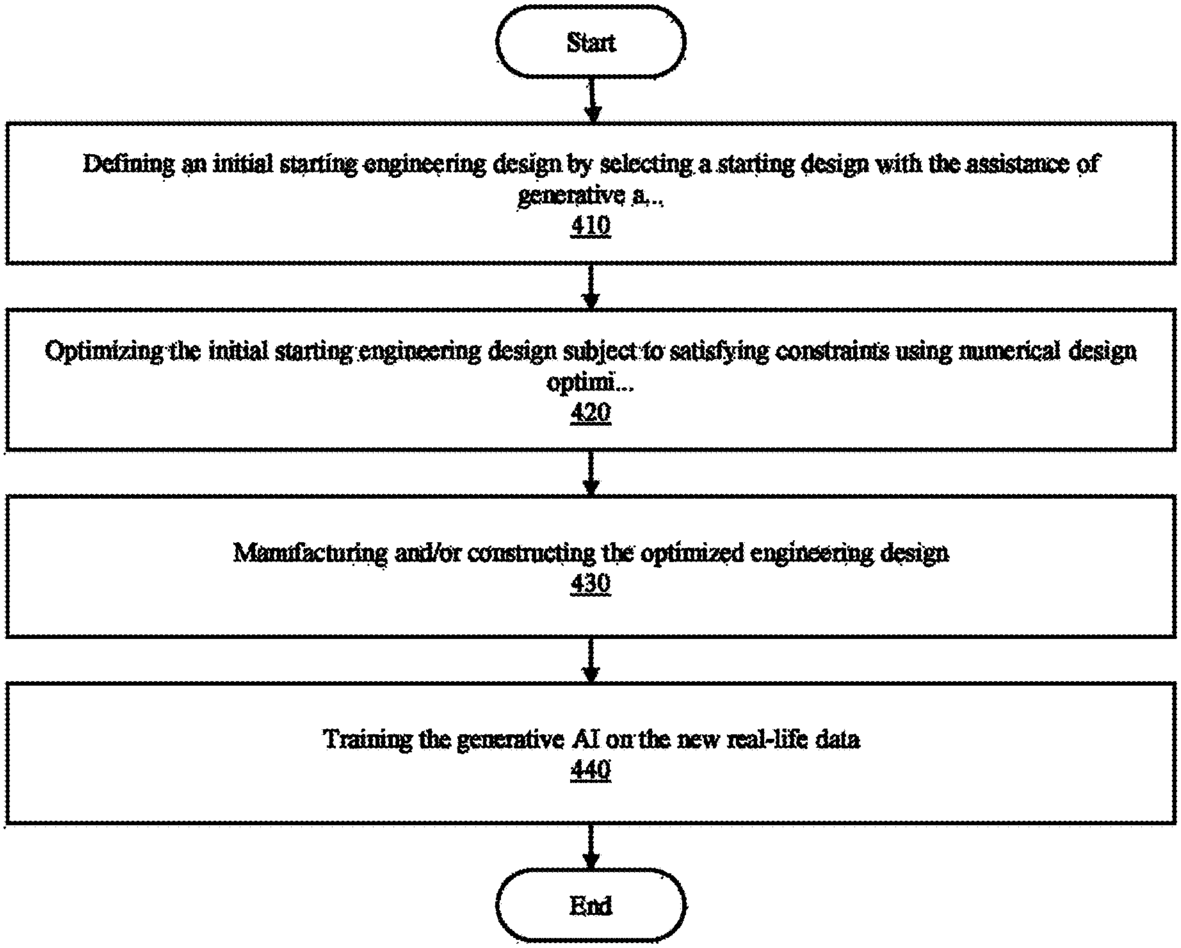
FIG. 13 is a flowchart illustrating a method embodiment according to an embodiment of the invention.

FIG. 13 is a flowchart that describes a method of constructing an optimized engineering design, according to some embodiments of the present disclosure. In some embodiments, at 410, the method may include defining an initial starting engineering design by selecting a starting design with the assistance of generative artificial intelligence. At 420, the method may include optimizing the initial starting engineering design subject to satisfying constraints using numerical design optimization to create at least one optimized engineering design. At 430, the method may include manufacturing and/or constructing the optimized engineering design. At 440, the method may include training the generative AI on the new real-life data. The steps of, the method may include 410 to 440. Testing or using the optimized engineering design and gathering real-life data about it. In some embodiments, the step of training the generative AI on the new real-life data further comprises training the generative AI such that the model may be trained for one or more specific users, use cases, or locales.

Figure 14:
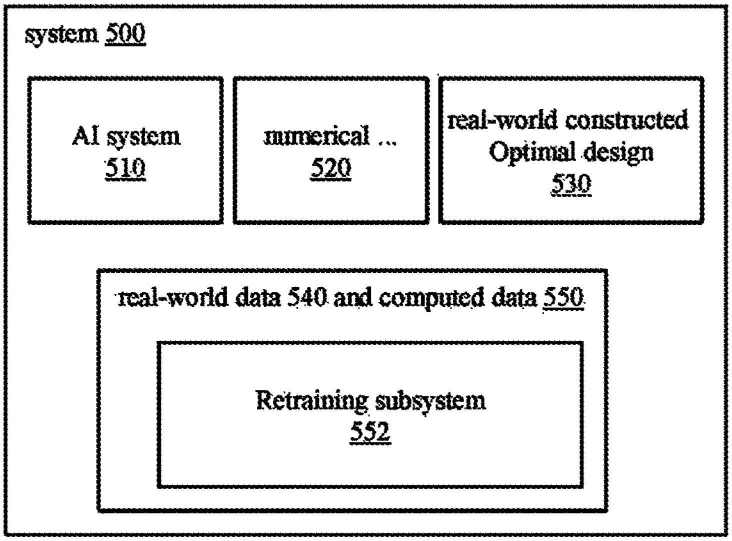
FIG. 14 illustrates components according to one embodiment of a numerical optimization system.

FIG. 14 is a block diagram that describes a system 500, according to some embodiments of the present disclosure. In some embodiments, the system 500 may include an AI system 510 to propose an initial engineering design, a numerical design optimizer 520 that optimizes the initial engineering design into an optimal engineering design, and a subsystem 540 to train the AI system 510 on at least some of at least one of the real-world data and computed data. The system 500 may also include a real-world 530, constructed optimal engineering design. At least one of real-world data from the constructed optimal engineering design and computed data generated from or during the optimization process of the optimized engineering design.

The approaches discussed herein may be used with other systems and devices that are trainable. These systems and/or devices may include AI systems that can be trained with artificial and/or simulated data. Non-limiting examples may include, for instance:

Home Appliances: ovens, dishwashers, toasters, sewing machines

Gardening Tools: Devices like lawnmowers, sprinklers, or automated plant care systems Hand Tools: Power drills, saws Fitness Equipment: weight machines, rowing machines Construction Equipment: excavators, cement mixers, cranes, some electrical control panels; automatic compression machines; substation control/monitoring systems; scissor lifts; light towers; carry deck cranes; electric rollers; compact equipment, power saws and drills, systems to add metal fibers to concrete, as examples only of equipment/systems that have a local control system with which a local AI system can be a part Medical Devices: blood pressure monitors, glucose meters, MRI machines, X-ray, CTScan, defibrillators, In Vitro Diagnostics (IVD) devices, Cardiovascular Devices, pacemakers, stents, defibrillators; Diagnostic Imaging Equipment, Orthopedic Devices, Hip and knee implants, spine devices, trauma fixation devices; Minimally Invasive Surgical Devices, laparoscopic instruments, robotic surgical systems, Respiratory Devices, sleep apnea devices, ventilators, nebulizers, positive airway pressure (PAP) machines, Diabetes Care Devices, insulin pumps, glucose monitors, and continuous glucose monitoring (CGM) systems; Neurological Devices: neurostimulators, epilepsy devices; Wound Care Devices: negative pressure wound therapy (NPWT) devices; Dental Devices and Supplies: Dental implants, orthodontics, endodontic devices, blood testing devices and systems, blood pressure monitors, glucose monitors, pulse oximeters Ophthalmic devices: Ophthalmoscope, Slit lamp, Tonometer, Retinoscope, Ophthalmic ultrasound, Glaucoma drainage implant, Intraocular lens, Refractive surgery, Ocular prosthesis Orthopedic devices: Arthritis braces, Casts, Knee braces, Orthotics, Prosthetics, Spinal implants, Total joint replacements Musical Instruments such as: Electric Piano, Electric Guitar, Organ, Electric Bass, and other aspects relating to performance, such as microphone, speaker, audience monitoring systems (e.g. for detecting audience-response detecting systems). As just one of a great many examples, an audience monitoring system might use microphones and/or cameras (including computer vision) and/or other sensors and systems to sense audience response to songs or genres of music. Then suggest to a musician in real time songs and/or styles of music to play to suit a specific audience, or over time to help the musician choose optimal song lists to improve audience response to performances. This can extend to dancers, special effects, wardrobe, instrument selection, and other aspects of live and/or recorded performances. That is, an AI system may make initial suggestions, then real-life data about performances or the like obtained, then retrain or otherwise update one or more AI or other systems with the real-life data for improved performance in the future. As one example, it may be that audiences in Australia might respond differently to performances and/or have different preferences than audiences in Cleveland or elsewhere. Using real-world data, the system may learn audience preferences and tailor aspects of performances and/or playlists etc. to different audiences, as one example. Other examples within this framework can be imagined. It is noted that, in this context, a person singing might possibly be considered an electro-mechanical device, with the human brain serving as a controller and the breathing/vocal cord/etc. aspects of the human body being bio-electro-mechanical systems.

Automotive Tools: car jacks, tire inflators, or diagnostic tools

Kitchen Utensils, welding machines, home appliances, thermostats, refrigerators, vacuum cleaners Devices for treating psychiatric disorders: Deep brain stimulation (DBS) device; Vagus nerve stimulation (VNS) device; Repetitive transcranial magnetic stimulation (rTMS) devices; Light therapy systems, Sleep deprivation systems; Automated Psychotherapy systems, Medication dispensers; pill dispensers; music headphones; sound generators Devices in the home: thermostats, heaters, air conditioners, water heaters, natural gas and water meters and systems, bathroom devices and fixtures, beds, watering systems, shades, fans, televisions, music systems, lighting systems, alarm/securing systems, door bells, garage door openers, washers/driers, windows, roof, furniture, flooring, showers, lighting, stove, refrigerator, mailboxes, computers, laptops, printers, pianos, fountains, solar lights, solar-powered devices and systems, swimming pools and related equipment and devices, adjustable chairs Sports equipment, gym equipment, shoes, clothing, inflatable balls Sex equipment: prosthetic sex organs, vibrators, sexual stimulators, sex dolls, etc.

Gaming: board games, VR headsets, games generally, devices used in conjunction with a game, costumes, dolls, puzzles Military: guns, artillery, tanks, armored cars, missiles, artillery, drones Roads, railroad tracks, shipping lanes, various structural aspects of buildings, civil engineering structures, dams, locks, levies, wind turbines, solar farms, telescopes, antennas, car frames, actuators, adaptive structures, vibration dampers, systems to keep structures stable during earthquakes, unusual loads, impacts, heat exchangers, thermodynamics systems, fluid mechanic systems, chemical reactors, distilleries, eye glasses, massagers, artificial fish, artificial animals, greenhouses, grain silos, toilets, outhouses, camping equipment, ice rinks, freezers, bows, crossbows, gun optics, drones, hot air and/or passenger balloons, kites, washers, driers, microwaves, air friers, coffee makers, can openers, ice makers, dog houses, litter boxes, irrigation systems, lawn and plant waterers, animal food dispensers, air guns, paint sprayers, street lights, vacuum cleaners Art: art display devices, paintings, sculptures, mosaics IOT devices, which may be any or all of the foregoing. Optionally, device may transmit data for use in training AI.

Computer keyboards, mouses, speakers, displays

Batteries, on-demand water heaters

Manufacturing: automated assembly lines, welding arms, CNC machines, conveyor systems Devices may have sensors, cameras, microphones, bio-authentication, etc. on board. Or, there can be a single camera/microphone/sensor providing info that a group of devices use (e.g. wall-mounted camera or other sensor for every device in a room, etc.)

One AI System Serving Multiple Devices

There can be a central system that controls multiple devices. It may be that the computing power needed for a device is too much to put on just one device. The AI control etc. may be centralized, with multiple devices or systems in communication with the centralized AI. The centralized AI may be trained with artificial data sets for one or more of the devices the centralized AI is in communication with. For example, a centralized local AI system in a home may be in communication with a vacuum, an stove, dishwasher, drier, lawn watering system, lighting system, water heaters, fountains, bbq grills, air conditioners, heaters, lighting, and/or other devices and systems. The centralized AI may be trained with artificial datasets for the specific devices. So, for instance, the centralized AI may be trained with an artificial data set for a vacuum. It may be trained with another artificial data set for a dishwasher, and so on. The devices in communication may transmit real-world data back to the centralized AI during use. The real-world data may then be used subsequently for training the centralized local AI and/or other AI.

The local devices may be IOT. And/or in communication with the centralized AI in other ways, such as via a local network, radio, digital broadcast, or other known method for communicating between a device and a central local hub, which may help increase security and privacy or the like.

Car washes—recognize the car, adjust the various devices and processes to wash that specific car (make, model, year, color, etc.).

Other Examples by Analogy to 2006 Patent Application

Further examples of systems that have or could have actuators are found in my US20060180647A1 entitled RFID APPLICATIONS by inventor Scott R. Hansen, which is incorporated by reference herein. Examples of systems identified in that patent application that may be adapted for control by an AI system initially trained on simulated data may include, for example, systems relating to parking automobiles in a parking garages; AI controller of devices/items in a bathroom; laundry systems, including adapting laundry equipment to particular users, types of clothing, and such; AI to manage physical money in a store or other setting; Controlling devices or collections of devices or other electro-mechanical systems typically found in a doctor's office, hospital, operating room, and/or psychiatric facility; in game arcades, in prisons, classrooms, stadiums, school busses, gyms, dentist's offices, boating or shipping docks, coffee shops, bridges, construction sites, cafeterias, museums, car washes, digital advertising boards and billboards, and other settings that I identify in my US20060180647 patent application.

This may include, for example only, control systems that include AI that is trained initially on simulated data and further trained over time with real-world data. Optionally, the real-world data may be provided to the system that generates the simulated data set to improve future simulated data sets. As one example only, a control system in a dentist's office may utilize AI to control a machine(s) or systems used on a specific patient. Over time, the system may be trained with real-world data collected during that patient's visits, or the visits of similar patients, or patients of that dentist's office, and/or other real-world data collected in the course of treating patients in the dentist's office. This is extended by analogy to the other specific settings identified in this paragraph, as examples, and diverse other settings.

Artificial Data Set Training for Groups

Neural implants w/central AI directing multiple people: choirs, sports teams, activities where individuals must act together as a group. Artificial data sets used to train the local central AI, supplemented by real-world data generated by the group. To improve and optimize teamwork, group behavior, effectiveness of crowds of people, etc.

Different ways: direct control of device; display on device that gives instructions or information to a human user. Device should have a way to communicate back to the central local AI with real-world data that can improve the training model.

Herds of animals, schools of fish/dolphins, flocks of birds. Groups of drones, aircraft, automobiles (ai-driven car races or demonstrations). Groups of devices that need simultaneous direction w/o onboard AI computing power.

Law firms, companies, legal teams, business teams. IT systems that use centralized AI to help large #'s of users but also learn about individual users and groups.

Groups of lights reacting to something. All the street lights, traffic signals in a city.

Updating Simulated Data

Simulations can better model the real world with a variety of techniques. Some examples include:

Data Assimilation

Data assimilation is a process that combines real-world observations with theoretical models to produce more accurate simulations. This technique is particularly useful in fields like oceanography and meteorology, where it helps to create simulations that closely match observed patterns of ocean circulation or weather conditions at specific times and places. Data assimilation can be performed intermittently or continuously, with new data being gradually introduced to the model over time.

Model Refinement

Model refinement involves iterative improvement of a simulation model by incorporating new data and adjusting the model parameters to better fit observed data. This can be done through various updating schemes, such as the Extended Kalman Filter, which is used to update model predictions in real-time. The goal is to reduce the discrepancy between the model and reality, thereby increasing the predictive power of the simulation.

Feedback Loops

Feedback loops in simulation refer to the dynamic where model predictions influence future data, which can lead to model degradation if not properly managed. In software engineering, feedback loops are used to drive projects towards correctness by consistently adding regression tests when bugs are fixed Generative Model Retraining Generative models can be retrained to update simulated data by incorporating new observations and refining the model's ability to generate new data points that are representative of the real-world variability. This retraining process ensures that the model remains relevant and accurate over time as new data becomes available.

Incorporation of Real-World Variability

Incorporating real-world variability into simulations is crucial for creating realistic models. This can be done by using appropriate sampling methods, error models, or data augmentation techniques that reflect the uncertainty and variability of the problem being modeled.

Domain Expert Involvement

Involving domain experts in the simulation process is essential for ensuring that the model accurately represents the complexity of the real-world system. Experts can provide insights into the key variables and processes that should be included in the model and help interpret the results of the simulation.

Benchmarking and Validation

Benchmarking and validation involve comparing the simulation results against known benchmarks or real-world data to assess the accuracy and reliability of the model. This helps to identify any discrepancies and areas for improvement in the simulation.

Adaptive Simulations

Adaptive simulations are those that can adjust their parameters and behaviors in response to changing conditions or new data. This allows the simulation to remain relevant and accurate over time, even as the system it represents evolves.

Further Options: AI-Generated Suggestions for Social Interactions

In one example, an earpiece listens to a conversation, makes suggestions about what to say to the user. Trained generally by simulated data, trained over time by real world conversations, reactions by other persons talking with, comments others make back to the speaker when they use the AI generated suggestion for conversation. Adapts to the style, speaking approach, personality, usual audiences of the speaker, etc. to personalize the conversation-suggester system.

The earpiece can have a local AI that is trained with both simulated data generated elsewhere as well as local data gained over time in actual conversations. OR the earpiece can be in communication with a remote AI system that does this. The earpiece would transmit the conversations, other data such as audio, video or other data that can be gained through real-time sensors etc., back to the remote AI, which generates conversations back to the earpiece to communicate to the user. And the remote AI is trained over time with the real world data collected.

ALTERNATIVES: data transmitted back to the remote AI includes video of the room including information such as e.g. what people are wearing, how old they are, their apparent gender, possibly enough data to determine their identities, other demographics of those in the room and/or the other person(s) in the specific conversation of the user; time of day, lighting, etc.; audio of the conversation and possibility of the room generally, possibly other information gathered from the room. The AI takes all this into account when giving suggestions and also uses it to do the local and/or personalized training for the user to improve future suggestions. May have applications to helping autistic people who might have challenges in social interactions, giving an autistic person suggestions for successful conversations, possibly giving the user feedback on how the conversation is going and suggestions for improvement.

Could transmit statistics or other information about the conversation. Could transmit statistics or other information about all conversations the user has been in for the event. Could transmit statistics or information about conversations in the room generally. Could be running regression analysis or other calculations from the data it is gathering, etc.

Structural Optimization

Numerical structural optimization refers to the process of finding the best design for a structure based on mathematical models and computer simulations. Here are some types of numerical structural optimization:

- Topology optimization—This approach optimizes the layout of material in a structure. For example, in some structures it may determine which regions should be solid and which should be void, to meet specified performance objectives. As another non-limiting example, and with one particular class of structures, topology optimization finds optimum member sizes and joint positions (e.g., as in the Hansen and Vanderplaats AIAA publication identified above), but also determines the number of joints and how members connect the joints.
- Shape optimization—This method optimizes the shape of a structure, altering its geometry to achieve specific performance goals.
- Size optimization—This approach optimizes the size of components within a structure, adjusting the dimensions of various elements to meet performance criteria.
- Material optimization—This method optimizes the choice of material for a structure, selecting the best material properties for each component based on the required performance characteristics.
- Multi-objective optimization—This approach simultaneously optimizes several performance criteria, such as weight, stiffness, and cost, to find a design that achieves the best overall balance of these factors.
- Sensitivity analysis—This method evaluates the sensitivity of a structure's performance to various design parameters, helping to identify critical features that must be optimized to achieve the desired performance.
- Stochastic Optimization—This involves optimizing designs in the presence of uncertainties.
- Composite Optimization—optimizes, for example, orientation, thickness, and sequence of layers in a composite laminate for a desired objective function.
- Robust optimization—This approach optimizes a design to be robust to variations in material properties, loading conditions, or other uncertainties, ensuring that the structure performs well under a range of possible conditions.

These are some of the main types of numerical structural optimization that are used in engineering and design to create optimal structures that meet specific performance criteria.

Iterative structural optimization is a process in which a structure's design is gradually improved through repeated cycles of analysis and modification. The goal of the process is to arrive at an optimal design that meets specified performance criteria and constraints. Here's a general description of how it might work:

- Initial Design: The process starts with an initial design. This could be a simple, arbitrary design or a more complex design based on engineering intuition, previous designs, or suggestions from a generative artificial intelligence system.
- Analysis: The initial design is then analyzed to assess its performance. This might involve calculating structural attributes such as stress, strain, displacement, or natural frequency. Finite element analysis (FEA) is a common tool used for this purpose.
- Evaluation: The results of the analysis are evaluated against the performance criteria and constraints. This could involve checking whether the stress in any part of the structure exceeds a certain limit, whether the structure can support a specified load, or whether the natural frequency of the structure avoids a certain range.
- Modification: Based on the results of the evaluation, the design is then modified. This might involve changing the shape, size, or material of certain parts of the structure to better meet the performance criteria and constraints. The modifications are typically guided by mathematical optimization techniques, which search for the design changes that will most improve the performance.
- Iteration: The evaluation, analysis, and modification steps are repeated, with each cycle using the modified design from the previous cycle as the starting point. With each iteration, the design should improve and get closer to meeting the performance criteria and constraints.
- Convergence: The iterative process continues until a satisfactory design is reached or until further iterations do not significantly improve the design. This is known as convergence.

Iterative structural optimization allows for a systematic and efficient approach to improving structural designs. It's particularly useful when dealing with complex structures and performance criteria, where intuitive or manual design approaches might struggle to find the best design.

Examples of Structural Optimization Applications

Numerical structural optimization has been used in various fields, such as aerospace, automotive, civil engineering, and product design. The present invention relates to using AI to propose initial designs for the optimization process. Some examples of structural engineering applications to which optimization has been utilized, and to which the present invention may be applied, include:

- Aerospace Engineering: In the design of aircraft and spacecraft, numerical structural optimization is used to minimize the weight of the structure while ensuring that it can withstand the stresses it will be subjected to. For example, this has been applied to optimize the design of wings, fuselage structures, and landing gear.
- Automotive Engineering: In the automotive industry, numerical structural optimization has been used to design components like chassis, car bodies, and suspension systems. The goal is usually to minimize weight (for fuel efficiency) and material usage (for cost), while ensuring safety (withstanding crash scenarios, for example).

Civil Engineering: In civil engineering, this technique has been applied to optimize the design of structures such as bridges, buildings, and dams. The goal is often to minimize the cost or use of materials while ensuring the structure can withstand various loads (such as wind, earthquakes, and the weight of the structure itself).

Energy Industry: In wind turbine design, structural optimization has been used to design turbine blades that are light, strong, and efficient. This can result in more efficient energy production.

Product Design: In consumer products, numerical structural optimization can be used to design products that are durable, lightweight, and use materials efficiently. This can be applied to a wide range of products, from furniture to electronics.

Biomedical Engineering: In the design of medical implants and prosthetics, numerical optimization can be used to design structures that mimic and/or incorporate the mechanical properties of biological tissues, leading to better patient outcomes.

Shipbuilding: In the marine industry, structural optimization has been applied to design ships'hulls and other components to minimize weight and maximize strength and durability. [00206] Manufacturing: In manufacturing processes, optimization techniques can be used to design tools and machinery that are efficient and durable.

Architectural Engineering: In the design of complex architectural forms, numerical optimization can be used to find structural solutions that are both aesthetically pleasing and structurally sound.

In all these cases, numerical structural optimization involves creating a mathematical model of the structure, defining an objective function (such as minimizing weight or cost), defining constraints (such as maximum allowable stress), and using an optimization algorithm to find the best design.

Other applications of optimization include: aerodynamic shape optimization (wings, etc.), machine components (driveshafts, brakes, gears), heat exchangers, steam condensers, and aircraft and ship synthesis.

Military and Hospital Systems

Our family member US Navy Commander Robert E. Hansen (ret.) is a former US Navy Seabee and hospital engineer. In his naval career, he participated in and led large construction projects globally. He also worked in the field of Navy public works, which typically includes constructing, developing, and managing facilities, roads, drinking water and sewage systems, and other civil engineering structures and systems. Later in his career he was a hospital engineer, leading teams relating to and overseeing hospital structures, power generation, medical devices, construction, and other physical aspects of hospitals and healthcare. Concerning optimization, structures relating to transporting and housing boats (trailers etc.), ships, submarines, construction equipment, and other naval civil and mechanical engineering-related structures may be optimized.

In the construction field, tools are important. Examples of tools that may be optimized are ladders (weight, stiffness, strength, torsion, balance, etc. are important), saws, scaffolding, power saws and other power tools (weight, balance), wheelbarrow (balance, weight, transmitting weight to wheel, etc.).

Hospital engineering includes, for example, devices and systems that have structural, fluid, and thermal aspects. For example, a whirlpool bath for rehabilitation and/or athletics includes a structure. And also fluid flow, heat transfer, insulation properties, among other things. A hot tub, generally, and other systems have a similar interaction of structural, thermal, fluidic, and/or other significant interacting influences on an optimal design.

In systems such as this, any of these aspects may be focused upon as the objective function, with other aspects treated as constraints, for example. The AI system might choose one initial design if the objective function relates to minimizing weight of the structure, whereas it might select a different starting design if the objective function is fluidic or thermal, for instance. [00233] In military applications, boat trailers are an example of a structure that may be optimized. The trailer should be lightweight, but also strong (the cost of damage to a boat can be high if the trailer structure fails). As it is used on roads, there are vibration and stability considerations. There may be fluid flow aspects concerning drag caused as the trailer is pulled at speed. There may be thermal aspects such as when the trailer is out in the hot sun, or used on a cold winter day. With a heavy boat or other load on it, balance is also an important consideration. And possibly acoustic considerations if the trailer is used in stealthy operations in which quiet operation is desired.

HDD's: Hard disk drives are electro-mechanical devices using electromagnetics and/or other technologies to store data. Numerous components of HDD's may be optimized, including structural and other aspects. HDD's may be used as a single unit, in clusters, and even in large-scale data centers, all of which provide engineers with applications for optimization.

Structural Optimization References

The following are provided for historical perspective in structural optimization. All of the following are incorporated by reference herein.

Hansen, S. R. & Vanderplaats, G. N. (1990). Approximation method for configuration optimization of trusses. AIAA Journal, 28(6), 1037-1044. doi: 10.2514/3.10364

Schmit, L. A (1960). Structural Design by Systematic Synthesis. Proceedings of the Second Conference on Electronic Computation, ASCE, New York, 105-122.

Vanderplaats, G. N. (1973). Method for Multidisciplinary Design Optimization. Journal of Aircraft, 10(4), 216-220.

Schmit, L. A, & Miura, H. (1966). Approximation Concepts for Structural Synthesis. Journal of the AIAA, 4(10), 1664-1670.

Vanderplaats, G. N., & Moses, F. (1972). Structural Optimization by Methods of Feasible Directions. Computers & Structures, 2(1), 165-189.

Vanderplaats, G. N. (1984). Numerical Optimization Techniques for Engineering Design: With Applications. McGraw-Hill.

Vanderplaats G N and Salajegheh E. A New Approximation Method for Stress Constraints in Structural Synthesis, AIAA Journal, Vol. 27, No. 3, pp. 352-358, March 1989.

Rozvany, G. I. N., Zhou, M., & Birker, T. (1992). Generalized Shape Optimization Without Homogenization. Structural Optimization, 4(3-4), 250-252.

BendsOe, M. P., & Sigmund, O. (2003). Topology Optimization: Theory, Methods, and Applications. Springer Science & Business Media.

Kirsch, U. (1989). Optimum Structural Design: A Unified Approach. McGraw-Hill. Haftka, R. T., & Gi. irdal, Z. (1992). Elements of Structural Optimization. Kluwer Academic Publishers.
Schmit, L. A, & Farshi, B. (1974). Some Approximation Concepts for Structural Synthesis. AIAA Journal, 12(5), 692-699.
Arora, J. S. (2012). Introduction to Optimum Design. Academic Press.
Papalambros, P. Y., & Wilde, D. J. (2000). Principles of Optimal Design: Modeling and Computation. Cambridge University Press.
Sigmund, O., & BendsOe, M. P. (2003). Topology Optimization: Theory, Methods, and Applications. Springer Science & Business Media.
Thierauf, G. (1995). Optimum Structural Design. Springer Science & Business Media. Eschenauer, H. A, & Olhoff, N. (1994). Topology Optimization of Structures: An Introduction. Springer Science & Business Media.
Rozvany, G. I. N. (2009). A Critical Review of Established Methods of Structural Topology Optimization. Springer Science & Business Media.
Kirsch, U. (1989). Structural Optimization: Fundamentals and Applications. Springer-Verlag.
Topping, B. H. V., & Zienkiewicz, O. C. (1997). Shape Optimization and Sequential Linear Programming. John Wiley & Sons.
G. N. Vanderplaats (1993), Thirty years of modern structural optimization, Advances in Engineering Software, Volume 16, Issue 2.
Afzal, M. et al (2020), Reinforced concrete structural design optimization: A critical review, Journal of Cleaner Production, Volume 260, I July 2020, 120623
Ide, T., Kitajima, H., Otomori, Leiva J P & Watson B (2016). Structural optimization methods of nonlinear static analysis with contact and its application to design lightweight gear box of automatic transmission of vehicles. Struct Multidisc Optim 53, 1383-1394 (2016)
Leiva J P (2004) Topometry optimization: a new capability to perform element by element sizing optimization of structures. In: Proceedings of I 0th AIAA/ISSMO symposium on multidisciplinary analysis and optimization Albany, New York, USA, 30 August-I September, 2004-4595
Leiva J P (2011) Structural optimization methods and techniques to design efficient car bodies. In: Proceedings of international automotive body congress 2011, Troy, Michigan, USA, 9-10 November
Juan Pablo Leiva, Hong Dong, Brian Watson (2019) Structural Optimization Methods and Techniques for Additive Manufacturing, The World Congress of Structural and Multidisciplinary Optimization, May 20-24, 2019, Beijing, China
Leiva J P, Watson, BC, and Kosaka I. Modem Structural Optimization Concepts Applied to Topology Optimization, Proceedings of the 40th AIAA/ASME/ASCE/AHS/ASC Structures, Structural Dynamics, and Material Conference. St. Louis, MO, pp. 1589-1596, April 12-15, 1999 GENESIS User's Manual, Version 17.0 VR&D, Inc., Colorado Springs, CO, May 2018.
DOT User's Manual, Version 7.2, VR&D, Colorado Springs, CO, 2017

Individualizing the AI System for Proposing Starting Designs

Considering our previous example further, an optimal boat trailer design in one region or for particular uses, might be different than an optimal boat trailer design in other regions or for different uses. Consequently, it can be helpful to "localize" an AI model for use by specific populations of users and by specific use cases and locales. This can be done, for instance, by having a local AI system proposing initial designs for one particular user or group of users, while proposing a different starting design for other users in other locations or operating conditions.

The "individualizing" may be triggered when the user enters certain information (e.g. the ZIP postal code in which the user operates, or other appropriate information for the purpose). Or it may be determined through data gathered from the optimized system or apparatus. For example, a user might provide the AI with a temperature range in which the trailer will be used or, alternatively, there may be sensors on a boat trailer logging the temperature over time so that the operating range may be determined through data from a sensor. Consequently, the AI system may take into consideration the particular use cases, locale, or other characteristics of a user in choosing a good initial design for that particular user or group of users. The AI system may be kept locally with the user, or it may be a unified AI system having many different users but tailoring its suggestions to each user depending on user profile, real-world data gathered from the user's systems and devices, or other information.

This concept of "individualizing" the AI model to suggest starting designs unique to particular users or groups of users may be applied generally to nearly all of the applications described in this patent application, as an optional feature. The individualization Retraining AI Systems in Optimization As noted, the optimization process starts with an initial design, then optimizes the design while satisfying constraints on the design. Once an optimal design has been reached, the process may further include:

- Validation of the Solution: Validate the obtained solution. Check if the optimal solution satisfies all the constraints and truly optimizes the objective function. This could involve physical experiments, simulations, or other types of validation.
- Implementation of the Optimal Design: After the optimization process, the optimal design parameters can be used to build the physical system or process.
- Post-Optimization Analysis: Often, once the optimal design has been implemented, there may be a need for further analysis or testing. This could involve stress testing, reliability analysis, or even a new round of optimization if the system's performance still isn't satisfactory. [00244] Once a physical version of the optimized design is built, data may be generated from it. For example, in the case of a civil structure, testing may include running tests on stress, deflection, natural frequency, and many other aspects. If desired, the design may be revised in light of the collected real-world data. The real-world data, the final design that the designers settle upon, revised optimal designs, and the like may be used to retrain the AI system. Thus, as the AI system is employed to propose initial designs in the future, it has the benefit of training on real-world data and experience.

Steps that may be used in retraining the AI initial design generation may begin with data collection. This first step involves gathering relevant data from real-world tests. This encompasses performance measurements under varying conditions, any encountered failures, and other significant observations. Following data collection, preprocessing is necessary to format the data for machine learning applications. This stage often includes cleaning the data, normalizing it, handling missing values, and formatting the data to match the input requirements of the generative design algorithm. With the preprocessed data, the generative design algorithm can be retrained. Depending on the specific algorithm used, this involves introducing the new data to the algorithm, which in turn adjusts its internal model accordingly. If employing a generative adversarial network (GAN), the new data would be input into the GAN, which subsequently trains to better generate designs that align with the updated data.

After retraining, the performance of the generative design algorithm may be evaluated. This could entail generating new designs and assessing how closely their performance matches the expectations based on the real-world test data. If performance falls short, alterations may be needed, such as tweaking the algorithm's parameters or gathering additional data.

The retrained generative design algorithm can then be used to generate novel initial designs, as just one example. These can be further optimized, built, and tested in the real world. The data from these tests can be used to retrain the algorithm, creating a cyclical, iterative design process.

AI Approaches

In one embodiment, and as just one example of how we propose incorporating AI into structural optimization, Generative Design Algorithms are employed to generate initial designs. Generative Design Algorithms learn and understand patterns from existing design data. Upon gaining sufficient knowledge, they are capable of generating novel designs that adhere to these learned patterns. This technique offers a systematic approach to generating initial designs based on historical success.

Other AI approaches may alternatively be employed, such as:

- Reinforcement Learning: This is a type of machine learning where an algorithm learns to make decisions by interacting with an environment. The algorithm improves iteratively, refining its decisions based on the feedback received from previous actions. In the context of design, reinforcement learning can be utilized to make a sequence of design decisions, progressively enhancing the quality of the design output.
- Evolutionary Algorithms: These algorithms employ techniques such as mutation, crossover, and selection to find optimal or near-optimal solutions. Starting with a set of initial designs, evolutionary algorithms evaluate and refine these designs through iterative processes, eventually converging on a design that meets the set criteria for success.
- Surrogate Modeling: Also known as metamodeling, this technique involves training a computationally efficient model to approximate the behavior of a more complex model. The surrogate model can rapidly evaluate a multitude of potential designs, thus providing a useful initial selection for further, more detailed analysis and optimization.

Variations and Modifications

The foregoing presents merely examples, and the invention is not limited thereto. Various variations and modifications may be made within the scope of the invention. For example, AI may take various forms. As further examples:

- AI Simulation: AI simulation relates to AI and simulation technologies to develop AI agents with respect to simulated environments in which they can be trained, tested, and deployed. This may enhance training and testing of AI systems. Further, AI trust, risk, and security management (AI TRISM) may help ensure governance, trustworthiness, fairness, reliability, robustness, efficacy, and data protection of AI models
- Causal AI: Causal AI focuses on identifying and utilizing cause-and-effect relationships to go beyond correlation-based predictive models. By understanding causal relationships, AI systems can prescribe actions more effectively and act more autonomously. This represents a shift towards more advanced AI systems that can make informed decisions based on causal reasoning
- Neurosymbolic AI: Neurosymbolic AI is a form of composite AI that combines machine learning methods with symbolic reasoning. This approach aims to leverage the strengths of both approaches to create more powerful AI systems. By integrating machine learning and symbolic reasoning, neurosymbolic AI can enhance capabilities of control systems in electro-mechanical devices.
- Multiagent Systems: AI systems having multiple, independent yet interactive agents. Each agent is capable of perceiving its environment and taking actions. Agents might be AI models, software, electo-mechanical devices/systems, and other entities that AI can play a role in controlling.

Some potential applications may include:

- Automation and Robotics: Developments in AI, like neurosymbolic AI, can improve automation and robotics. This type of AI combines machine learning with symbolic reasoning, making the control of electro-mechanical devices more intelligent and adaptive. It enhances efficiency, accuracy, and adaptability in fields such as industrial robotics and autonomous systems.
- Simulation and Testing: AI can create virtual environments to train and test electro-mechanical devices. This makes developing and optimizing control systems more efficient and cost-effective. It also helps in identifying and fixing potential issues before physical implementation.
- Enhanced Control and Decision-Making: AI, including generative AI and causal AI, enhances the decision-making and control of these devices. Generative AI can develop optimized control strategies and adapt to changes. Causal AI helps the systems understand cause-and-effect relationships, improving decision-making and performance.
- Predictive Maintenance: AI technologies like machine learning and deep learning are used for predictive maintenance. By analyzing sensor data and historical patterns, AI can foresee potential failures, allowing for timely maintenance and reducing downtime.
- Safety and Fault Detection: AI ensures the safety and reliability of these devices. By analyzing sensor data in real time, AI can spot anomalies, identify faults, and take measures to prevent accidents or damage, enhancing safety and reliability.
- Federated Learning: Embodiments may include federated learning to enable collective learning across multiple devices. Devices with a local AI system may learn from data encountered in its environment and updates a shared model optionally without sharing the data itself. This can help in situations that require privacy. Examples may include, for example, medical data, personal conversations, and the like. The local AI systems can share model updates, to be aggregated in a central server or a decentralized manner, for example. Sensitive data can stay on the local device.

- Reinforcement Learning: Embodiments of local AI systems may use reinforcement learning (RL) techniques. These may optimize performance through interactions with their environment. An agent learns to make decisions by performing actions and receiving feedback in the form of rewards or penalties. The AI system may iteratively adjust strategies to maximize cumulative rewards. This may be useful in adaptating to complex and dynamic scenarios. As examples only, tailoring surgical procedures or making irrigation schedules based on real-time data.
- Explainable AI (XAI): Embodiments may integrate explainable AI techniques. XAI provides insights into the AI's decision-making process, making the outcomes understandable to humans. In embodiments in which users have a need to trust and rely on AI decisions (e.g. in medical devices or safety-critical systems, for example only).
- Generative Adversarial Networks (GANs): AI simulated data generation system leverages GANs to create more realistic and diverse datasets for training the local AI systems. GANs consist of two networks, a generator and a discriminator, that work against each other to produce data instances that are indistinguishable from real data. This may assist local AI systems in progressing from simulated scenarios to real-world situations. It can expose them to a broader variety of data scenarios.
- Neurosymbolic AI: Embodiments may combine neural networks with symbolic AI to enhance the local AI system's capability to process and interpret both structured and unstructured data. Neurosymbolic AI combines the learning capabilities of neural networks with the reasoning and interpretability of symbolic AI, enabling the system to handle complex decision-making and natural language interactions.
- Edge AI: To minimize latency and reduce dependence on cloud-based processing, embodiments may implement edge AI principles. Data processing and AI model retraining are performed locally on the devices. This approach may have particular applicability in, for example only, surgical robots and construction tools, where delays can interfere with safety and/or performance.
- Quantum Machine Learning: Embodiments may introduce use of quantum machine learning techniques in training and retraining processes. The system may thereby process complex datasets and perform simulations more efficiently in some settings.
- Continuous Learning: Embodiments may include continuous learning. This may allow the local AI systems to adapt to new data and situations in real time. Continuous learning systems update their knowledge base as they encounter new data. This may be helpful when conditions change rapidly.

Embodiments of the present invention may include various other options such as, for example, one or more of:

- Extended Reality (XR): XR can include virtual reality (VR), augmented reality (AR), and mixed reality (MR). This helps facilitate immersive training, simulation, and operation environments for AI systems. May be useful in, as examples only, medical, educational, and/or industrial training.
- Blockchain: Blockchain can log and share data collected by AI systems across devices. This can help with data integrity, traceability, and secure sharing of AI training data while maintaining security.
- Bio-inspired Algorithms: Bio-inspired algorithms mimic the human brain's architecture. These can simulate natural selection processes in controlling electro-mechanical systems.
- Human-AI Collaboration Frameworks: Some embodiments may include collaboration between human operators and AI systems. Both may learn from each other and at least some decisions made collaboratively. This may be helpful in complex decision-making environments like healthcare, defense, and emergency response.
- AI Generalization: AI models may be developed to be generalized across different domains or applications. These AI systems may understand and adapt to various contexts and tasks.
- Sustainable Development: AI may be employed in environmental monitoring systems, for energy efficiency, the optimization of resources, and other devices and systems relating to sustainable development.
- Digital Twins: AI can create and/or manage digital twins (virtual replicas of physical devices). These digital twins can be used for simulation, analysis, real-time monitoring, and such. Applications include devices and systems for manufacturing, urban planning, healthcare, and numerous other fields. To some extent, the simulated data sets discussed herein are analogous to digital twins. The simulated data sets are sometimes created in the virtual world. But behavior of real-world systems can be different than predicted behavior in the virtual world. Hence a need to improve simulated data sets to be more in synch with real-world behavior of electro-mechanical systems.
- Vision-Language: This is an approach in which human language, images, sound etc. is translated into language that AI and/or machines can understand for training or other purposes, for example. The learnings from this approach can lead an AI-augmented machine to action and/or decision-making, for example. From what AI learns in this way, it can apply that knowledge to scenarios it's not specifically trained on.
- Simulator Training: AI can be trained on data collected from simulators in which an electro-mechanical device or a structure is placed in a simulator. Data collected from the simulator environment can be used to help train, in whole or part, an AI model.

These are merely examples. Further modifications and alternatives may be made. For example, as discussed above, machine vision may be a source of real-world data. Information obtained from machine vision may include object position, orientation, or measurement data, and such. This can be used as input for the control system of an electro-mechanical device. Real-world data provided by the machine vision system may be used to retrain AI systems, such as localized AI capable control systems and/or simulated data generators for AI Systems and devices to which the present invention applies includes those that are of various sizes. For example, Microelectromechanical Systems (MEMS) integrate mechanical and electrical components on a small microscale. MEMS devices can even be complex systems with moving elements. These devices can be controlled by integrated microelectronics, for example.

As noted, other various types of electro-mechanical systems to which the present invention may include cooling fans, heatsinks, blowers, power generators, precision machining components, thermal management solutions, and mechanical and electrical subassemblies. These are used in a wide range of industries, such as semiconductor, medical, health care, laser, aerospace, automotive, industrial, toys, entertainment, HVAC, brake systems, the military and defense companies, contract manufacturing, gambling machines, and other industries. As well as in a wide variety of devices and systems, including as examples only, MEMS, electronically commutated motors (ECM), electro-mechanical brake systems (EMB), and a great many others.

Concepts from the present invention may be extended to improving computer modeling of electro-mechanical systems and/or control systems, for example. The behavior of an electro-mechanical system in the virtual world may differ from the real-world behavior of its virtual twin in the physical world. Using real-world data from real-world electro-mechanical systems, the virtual world simulation may be updated to reduce differences in performance and such between virtual simulated models and the corresponding real-world systems. This can optionally be done utilizing AI systems, such as by retraining AI systems utilizing real-world data.

In some embodiments, a human may be provided with an AI-driven chat capability such that the human may ask the chat questions about one or more of AI local system, control system, actuators, AI simulated data generator, performance of the electro-mechanical system, and/or other topics of interest to a human. The chat function may be trained at least in part, for example, with real-time data obtained during operation of the electro-mechanical system.

Thus, it is noted that numerous electro-mechanical and other systems, as well as types of sensors and other components, have been identified herein in, for example, the BACKGROUND, DETAILED DESCRIPTION, and in any other part of this patent application. Embodiments of the invention may utilize different types and combinations of sensors, electro-mechanical devices and systems, control systems, types of AI, and so forth. And although embodiments of the present invention may include one or more of these, it should be understood that this is not an exhaustive recitation of electro-mechanical system, sensors, types of AI, control systems, and such to which the invention may apply. Therefore, they are non-limiting examples.

It is further noted that numerous optional features and embodiments are presented. It should be understood that the optional features may be combined in various ways, depending on the circumstances, user preferences, and such. Consequently, the examples of combined features presented herein are merely examples. Features discussed herein may be combined in various ways, even if the combination of features is not explicitly identified.

What is claimed is:

1. A method of training a local control system for controlling an electro-mechanical device while making social interaction suggestions to a user wearing an earpiece, the local control system having a local trainable AI that is trained initially with simulated data generated by an AI simulated data generation system located remotely from the local control system, and then retraining the local trainable AI with real-world data while also retraining the AI simulated data generation system to improve its generation of simulated data, the method comprising:

training the trainable AI of the local control system for an electro-mechanical device with a simulated data set generated by the AI simulated data generation system, the electro-mechanical device being an earpiece having a speaker and a microphone and having a trainable local AI system that is trained with simulated data;

performing a task with the earpiece as controlled by the local control system, the task comprising listening to a conversation in which the user is engaged with one or more other persons;

making AI-generated social interaction suggestions from the local AI system to the user about the conversation in real-time during the conversation via the earpiece speaker, the AI-generated social interaction suggestions configured to assist the user with a challenge experienced by the user in the user's social interaction with the one or more other persons;

during the step of performing a task, collecting real-life data with one or more sensors from the earpiece as the local control system controls the earpiece, the real-life data comprising real-world data gathered about the conversation during the conversation and about the user's social interaction patterns and challenges;

retraining the local AI system with the real-life data to improve local conversational performance, the retraining comprising iteratively retraining the local AI system on real-world data specific to the user's social interaction patterns and challenges;

retraining the AI simulated data generation system on the real-life data to improve simulated data sets about conversation and to improve performance of the AI simulated data generation system in generating simulated data sets; and wherein the local AI system is trained initially on a simulated data set and then subsequently retrained iteratively over time with real-world data, and the AI simulated data generation system that is located remotely to the local control system is also retrained with the real-world data to improve simulated data sets the AI simulated data generation system generates.

2. The method of claim 1, wherein the real-world data further comprises at least one of reactions of other persons to the AI-generated suggestions, comments made in response to the user during the conversation, and conversational outcomes resulting from the user following the AI-generated suggestions.

3. The method of claim 1, wherein the real-world data further comprises at least one of audio of the conversation, video of the environment in which the conversation takes place, demographic information about persons participating in the conversation, time of day, lighting conditions, and ambient audio of the room generally.

4. The method of claim 1, wherein the local AI system personalizes its suggestions over time to the specific style, speaking approach, personality, and usual audiences of the user based on the iterative retraining with real-world data.

5. The method of claim 1, wherein the retraining of the local AI system employs federated learning techniques, allowing the local AI system to learn from decentralized conversational data collected across a plurality of earpiece devices without transferring the conversational data itself to a central server.

6. The method of claim 1, further comprising employing reinforcement learning techniques for the local AI system, wherein the local AI system learns to improve its conversational suggestions based on feedback signals derived from real-world conversational outcomes.

7. The method of claim 1, wherein the user has autism spectrum disorder.

8. The method of claim 1, wherein the earpiece further communicates with a remote AI system, the earpiece transmitting conversational data to the remote AI system and receiving AI-generated suggestions from the remote AI system, and wherein the remote AI system is retrained over time with the real-world conversational data collected by the earpiece.

9. A method of making social interaction suggestions to a user wearing an earpiece, the earpiece having a speaker and a microphone and a local AI system, the method comprising:

training the local AI system with a simulated data set; listening, via the microphone, to a conversation in which the user is engaged with one or more other persons;

making AI-generated social interaction suggestions from the local AI system to the user about the conversation in real-time during the conversation via the earpiece speaker, the AI-generated social interaction suggestions configured to assist the user with a challenge experienced by the user in the user's social interaction with the one or more other persons;

collecting real-world data about the conversation during the conversation and about the user's social interaction patterns and challenges; and retraining the local AI system with the real-world data to improve future conversational suggestions, the retraining comprising iteratively retraining the local AI system on real-world data specific to the user's social interaction patterns and challenges.

10. The method of claim 9, wherein the simulated data set is generated by an AI simulated data generation system located remotely from the earpiece.

11. The method of claim 10, further comprising retraining the AI simulated data generation system with the real-world data to improve simulated data sets the AI simulated data generation system generates.

12. The method of claim 9, wherein the simulated data set is provided to a plurality of earpiece devices, and each earpiece device retrains on real-world data generated locally, thereby customizing each earpiece device to the specific conversational style, social context, and audience of its respective user.

13. The method of claim 12, wherein at least one of the plurality of earpiece devices retrains at least in part its local AI system with real-world conversational data from at least one other of the plurality of earpiece devices.

14. The method of claim 9, further comprising continuous learning, wherein the local AI system adapts to new conversational data and situations in real-time during conversations.

15. The method of claim 9, wherein the local AI system further provides the user with real-time feedback on how the conversation is progressing based on real-time analysis of the conversation.

16. The method of claim 9, wherein the user has autism spectrum disorder.

17. The method of claim 9, wherein the local AI system is trained initially on the simulated data set representing a general population of conversational scenarios, and is subsequently retrained on real-world data specific to the user, such that the local AI system becomes progressively customized to the individual user over time.

18. The method of claim 9, wherein the retraining of the local AI system is performed periodically or in response to specific triggers, including at least one of a threshold number of new conversations recorded, a detected change in the user's conversational environment, or availability of new real-world conversational data.

19. The method of claim 9, wherein the retraining of the local AI system employs federated learning techniques, allowing the local AI system to learn from decentralized conversational data collected across a plurality of earpiece devices without transferring the conversational data itself to a central server, and wherein the local AI system of each earpiece shares model updates derived from the conversational data, the model updates being aggregated at the central server or in a decentralized manner across the plurality of earpiece devices, while the conversational data is retained only on the respective earpiece device on which it was collected.

20. The method of claim 9, wherein the local AI system incorporates explainable AI techniques such that the basis for AI-generated conversational suggestions is transparent and interpretable.

21. A system for making real-time social interaction suggestions to a user during a conversation, the system comprising:

an earpiece configured to be worn by a user, the earpiece comprising a speaker, a microphone, and a local AI system;

the microphone configured to listen to a conversation in which the user is engaged with one or more other persons; the speaker configured to deliver AI-generated social interaction suggestions from the local AI system to the user in real-time during the conversation, the AI-generated social interaction suggestions configured to assist the user with a challenge experienced by the user in the user's social interaction with the one or more other persons;

the local AI system trained on a simulated data set and configured to generate the AI-generated social interaction suggestions based on the conversation listened to by the microphone; and the local AI system further configured to collect real-world data about the conversation and about the user's social interaction patterns and challenges during the conversation and to iteratively retrain itself on real-world data specific to the user's social interaction patterns and challenges to improve future social interaction suggestions to the user.

22. The method of claim 1, wherein the real-life data further comprises audio of the conversation captured by the microphone and video of the conversation captured by a camera, and wherein the iterative retraining of the local AI system incorporates both the audio and the video.

23. The method of claim 9, wherein the real-world data further comprises audio of the conversation captured by the microphone and video of the conversation captured by a camera, and wherein the iterative retraining of the local AI system incorporates both the audio and the video.

24. The system of claim 21, further comprising a camera configured to capture video of the conversation, and wherein the local AI system is further configured to process both audio captured by the microphone and video captured by the camera to generate the AI-generated social interaction suggestions and to iteratively retrain itself on both the audio and the video.

25. The method of claim 9, wherein the local AI system is trained to assist a user having a social-communication challenge by generating conversational-coaching suggestions.

26. The method of claim 9, further comprising storing aggregated statistics from a plurality of users to improve a shared conversational AI model.

27. The method of claim 9, wherein the local AI system operates within an extended-reality (XR) environment, providing the AI-generated social interaction suggestions in coordination with visual or virtual-reality cues.

28. The method of claim 9, further comprising adjusting retraining processes to minimize energy consumption and computing resources associated with operation of the local AI system.

29. The method of claim 9, further comprising integrating Internet-of-Things (IoT) connectivity, whereby environmental sensors or companion devices associated with the user provide contextual data to improve conversational understanding and retraining of the local AI system.

30. The method of claim 19, wherein retraining of the local AI system of one earpiece is based at least in part on model-update data or performance metrics received from another earpiece or device operating in communication therewith.

31. The method of claim 1, wherein the local AI system is trained to assist a user having a social-communication challenge by generating conversational-coaching suggestions.

32. The system of claim 21, wherein the local AI system is configured to assist a user having a social-communication challenge by generating conversational-coaching suggestions.

33. A system for making real-time social interaction suggestions to a user during a conversation, the system comprising:

an earpiece configured to be worn by the user, the earpiece comprising a speaker, a microphone, and a local AI system;

a camera configured to capture video of an environment in which the conversation takes place; the microphone configured to listen to the conversation in which the user is engaged with one or more other persons; the speaker configured to deliver AI-generated social interaction suggestions from the local AI system to the user in real-time during the conversation;

the local AI system trained initially on a simulated data set and configured to generate the AI-generated social interaction suggestions based on both audio of the conversation listened to by the microphone and video of the environment captured by the camera, the AI-generated social interaction suggestions configured to assist the user with a challenge experienced by the user in the user's social interaction with the one or more other persons; and the local AI system further configured to collect real-world data comprising both the audio of the conversation and the video of the environment during the conversation, and to iteratively retrain itself on both the audio and the video, the retraining comprising iteratively retraining the local AI system on real-world data specific to the user's social interaction patterns and challenges.

34. The method of claim 9 in which the social interaction suggestions are about one of: veterinary topics, construction, and soil science.

* * * * *